United States Patent [19]

Hawai et al.

[11] Patent Number: 5,220,370
[45] Date of Patent: Jun. 15, 1993

[54] DRIVING MECHANISM OF CAMERA AND FRICTION MECHANISM THEREFOR

[75] Inventors: Yasuo Hawai; Junichi Tanii, both of Osaka, Japan

[73] Assignee: Minolta Camera Kabushiki Kaisha, Osaka, Japan

[21] Appl. No.: 758,549

[22] Filed: Sep. 10, 1991

Related U.S. Application Data

[63] Continuation of Ser. No. 649,290, Jan. 30, 1991, abandoned, which is a continuation of Ser. No. 350,113, May 10, 1989, abandoned.

[30] Foreign Application Priority Data

| May 11, 1988 | [JP] | Japan | 63-115405 |
| May 13, 1988 | [JP] | Japan | 63-117193 |
| May 16, 1988 | [JP] | Japan | 63-116891 |
| May 16, 1988 | [JP] | Japan | 63-118665 |

[51] Int. Cl.$^5$ .................................................. G03B 17/00
[52] U.S. Cl. .................................. 354/173.1; 318/558
[58] Field of Search ............... 318/3, 4, 10, 280, 558; 354/170, 171, 172, 173.1, 206, 212, 213, 217, 173.11; 352/121; 414/750; 409/198, 221; 82/120, 121; 29/38 R, 38 A, 38 B, 38 C, 39, 40, 48.5 R, 48.5 A; 74/813 R, 813 C, 817, 818, 819, 820, 822, 826

[56] References Cited

U.S. PATENT DOCUMENTS

| Re. 32,558 | 12/1987 | Chan | 354/173.1 |
| 3,590,661 | 7/1971 | Chaven | 74/820 X |
| 4,171,892 | 10/1979 | Kozuki et al. | 354/173.1 |
| 4,239,166 | 12/1980 | Daitoku | 242/71.6 |
| 4,251,148 | 2/1981 | Stemme et al. | 354/173 |
| 4,271,378 | 6/1981 | Knauff | 318/10 |
| 4,416,525 | 11/1983 | Chan | 354/173.1 |
| 4,449,806 | 5/1984 | Wong et al. | 354/121 |
| 4,497,555 | 2/1985 | Akiyama | 354/173.1 |
| 4,693,578 | 9/1987 | Konno | 354/173.1 |
| 4,728,975 | 3/1988 | Ohara et al. | 354/173.1 |
| 4,766,452 | 8/1988 | Ohara et al. | 354/173.1 |
| 4,821,059 | 4/1989 | Nakanishi et al. | 354/173.1 X |
| 4,829,328 | 5/1989 | Tanaka et al. | 354/173.1 |
| 4,868,590 | 9/1989 | Yokota et al. | 354/173.1 X |
| 4,910,543 | 3/1990 | Kawamura et al. | 354/173.1 |
| 4,999,655 | 3/1991 | Fukahori et al. | 354/173.1 |

FOREIGN PATENT DOCUMENTS

| 55-98727 | 7/1980 | Japan . |
| 55-98728 | 7/1980 | Japan . |
| 55-98731 | 7/1980 | Japan . |
| 55-98733 | 7/1980 | Japan . |
| 55-103543 | 7/1980 | Japan . |
| 55-103544 | 7/1980 | Japan . |
| 55-103546 | 7/1980 | Japan . |
| 55-108421 | 7/1980 | Japan . |
| 55-103545 | 8/1980 | Japan | 354/173.1 |
| 62-8776 | 2/1987 | Japan . |
| 62-39379 | 7/1987 | Japan . |
| 62-143937 | 9/1987 | Japan . |
| 62-211628 | 9/1987 | Japan . |
| 62-240944 | 10/1987 | Japan . |

*Primary Examiner*—Bentsu Ro
*Attorney, Agent, or Firm*—Burns, Doane, Swecker & Mathis

[57] ABSTRACT

The operating mechanism according to the present invention is so constructed that an indexing mechanism moves by rotation of a reversible driving device in one direction and when the mechanism reaches a specified section corresponding to a selecting device, the mechanism drives a loading system, selected by the selecting device, by rotation thereof in the other direction at the section. The friction mechanism of a camera according to the present invention is so constructed that a spring for applying to a spool is attached to a spool driving gear. The electric film rewinding apparatus according to the present invention is so constructed that a planetary gear disengages from a driven gear in film rewinding gears by a driving force of a driving device. The driving control apparatus of a camera is so constructed that a single motor is driven for reversibly rotation in both of one direction and the other direction to execute only a necessary operation in loading and unloading a film, reversibly. The camera according to the present invention is so constructed that in the failure of an initial loading operation, after all of a film is rewound by a film rewinding device, the operation is executed again by a control device.

20 Claims, 31 Drawing Sheets rotation in one direction, the rotational power of the motor is transmitted through the mechanism R and the clutch X to a load system A including the loads A1, A2, and A3, so that the first load A1, the second load A2, the third load A3, the first load A1 . . . are sequentially driven in order. Then, when the motor M is driven for rotation in the other direction, the rotational power of the motor is transmitted through the mechanism R and the clutch Y to the load B1 or the loads B1 and B2 to drive the load B1 or the loads B1 and B2 to rotate in a specified direction. In the construction of the mechanism, since the load system A and a load system B including the loads B1 and B2 connect with the motor M through the clutches X and Y, the system A and the system B are changeable only by reversing the rotational direction of the motor without the limitation with respect to the order between the systems A and B and the operation amount of the loads.

DRIVING MECHANISM OF CAMERA AND FRICTION MECHANISM THEREFOR

This application is a continuation of application Ser. No. 07/649,290, filed Jan. 30, 1991, which is a continuation of application Ser. No. 07/350,113, filed May 10, 1989, both now abandoned.

BACKGROUND OF THE INVENTION

The present invention generally relates to a driving mechanism and a friction mechanism of a camera which independently drives plural loads with respect to a specified operation such as an aperture, a mirror, or a shutter cocking operation.

Conventionally, there has been proposed various kinds of operating mechanisms for driving plural loads by a single motor. In such mechanisms, the increase of the number of the loads has resulted in difficulty to selectively transmit the outputted power from the motor to each load. Therefore, as well as the selection has been carried out by using the power outputted from the motor, a specified amount of load set at a specified value has been sequentially carried out, plural loads have been driven by using a mechanism having one input portion and two output portions such as a differential gear mechanism, or a selection mechanism has been selected by other actuator or a manual operation from the outside of the mechanism.

In these mechanisms, in order to carry out plural loads by a single motor, the operation area of the loads is limited, a complex distributing mechanism with many limitation is required, an outside switching means is required. Then, such mechanism has a lot of disadvantages such as a complex, a heavier and a large size in the construction, a limited operation area, a higher manufacturing cost, and a higher failure rate. Hereinbelow, the disadvantages will be explained more concretely.

FIG. 29 shows a mechanism according to a first conventional example. In FIG. 29, reference M denotes a motor, R a specified reduction transmitting mechanism, and A a first load, B1, B2, and B3 a second load, a third load, and a fourth load, respectively. In this construction, the first load A is driven through the reduction transmitting mechanism R by the rotational power of the motor M. Then, after the second load B1, the third load B2, and the fourth load B3 are simultaneously driven thereby, the first load is driven again.

In the mechanism, the loads A, B1, B2, and B3 are generally driven within the respective limited operation area, after the load in the specified section has been driven, the load in the next section is driven. Therefore, there have been problems that operation amounts, operating directions, and operation orders of the loads are limited. In order to drive the plural loads by the mechanism, the number of the section is required to increase, so that the limitation further increases disadvantageously.

FIG. 30 shows a mechanism according to a second conventional example. In FIG. 30, reference M denotes a reversible motor, R a specified reduction transmitting mechanism, X and Y one-way clutches for respectively transmitting the power of the motor in only one direction in which are different with each other, and A1, A2, A3, B1, and B2 a first, a second, a third, a fourth, and a fifth load, respectively.

In the mechanism, when the motor M is driven for rotation in one direction, the rotational power of the However, in the mechanism, since both of the one and the other directions of the motor are used to drive the loads and the number of the rotational direction of the motor can not be increased, the number of the load system also can not be increased. Each load is driven in only one direction and can not be driven in the other direction.

FIG. 31 shows a mechanism according to a third conventional example. In FIG. 31, reference M denotes a reversible motor, R a reduction transmitting mechanism, D and G differential gears having one input portion and two output portions, A1, A2, and A3 a first load system A driven by a first outputted power of the differential gears D and G, B1 and B2 a second load system B driven by a second outputted power of the differential gears D and G, X a one-way clutch for transmitting the rotational power of the motor M to drive for rotation in only one direction, C a third load system driven through the clutch X, and P a switching signal for switching an output system of the differential gears D and G as required.

The mechanism has an advantage that both of the systems A and B can be driven by a driving force in one direction of the motor i.e. without reversing the rotational direction of the motor M and can be driven in a reverse direction only by rotating the motor reversely as compared with the second conventional example. The third load system C can be driven by the rotation of the motor M in the operational direction of the clutch X. In this case, the load system A or B is driven reversing.

However, in the construction of the mechanism, since in order to properly use the systems A and B, the signal P is required, the construction becomes complex and it is generally difficult to output the signal P from the systems A and B and it is required to execute the operation for returning the system to the original state after switching.

Furthermore, there has been proposed cameras for completely separating a film take up spool from a reduction gears mechanism connected with a motor in non-winding of a film. In such cameras, if no load applies to the spool for winding a film therearound, the spool conversely rotates by a bias force caused by the fact that the film wound around the spool intends to loose to loose the film, so that the film frame for phototaking is shifted from a specified position. In order to prevent such a problem, friction mechanisms for applying a friction torque to the spool have been proposed.

As one of the friction mechanisms, there have been mechanisms with various constructions. For example, as shown in FIG. 32, in a camera which the outer cylinder of a motor 181 is employed as the spool 181b, a friction mechanism is disposed on the upper of the spool 181b. The mechanism is generally so constructed that a spool gear 182 is relatively rotatably disposed on the upper surface of the spool 181b, a spool gear driving gear 183 is connected with the spool gear 182, and a spring 184 for spool friction is wound around the outer surface of the spool gear 182 while engaging one end of the spring 184 with the spool 181b. In the construction, the spool gear 182 is driven for rotation by the driving gear 183 to rotate the spool 181b through the spring 184, and only when the spool 181b is driven for rotation by a force over a specified value, the spool 181b can rotate with respect to the spool gear 182. Therefore, the film around the spool 181b is prevented from loosening by only applying a torque over the force for loosing the film to the spool 181b so as to become simple in construction. However, it is disadvantageously required to hold to prevent the rotation of the spool gear 182 in nonwinding of the film, and thus the mechanism becomes complex in construction.

However, in order to apply to the spool 181b itself the torque over the force for loosing the film, the friction mechanism must be located on the upper of the motor 181. The reason is that the driving shaft of the motor is protruded at the lower of the motor 181 to dispose a winding unit, i.e., a winding drive mechanism and if the friction mechanism is disposed at the lower thereof, the construction becomes complex. Then, a camera having a flexible circuit substrate and a liquid crystal display at the upper of the motor has the following disadvantages. That is, the arrangement of the friction mechanism on the upper portion causes the increase in height of the camera and results in limitation in the arrangement of the camera design. Furthermore, it is required to assemble the friction mechanism into the spool from the upper side of the motor after assembling the motor thereinto from the lower side of the camera, resulting in increasing the assembly manday thereof. It is also required to adjust the friction force after assembly because the friction mechanism is not constructed as a unit which is preadjustable before assembly and which is not required to adjust it after assembly.

Moreover, conventionally, there have been electric film rewinding apparatuses with various constructions. As one example of the apparatuses, there has been an apparatus in which a wound film is rewound into a film cartridge by using the rotational driving power of an electrical motor. The apparatus has a planetary gear mechanism in which a planetary gear rotates around a sun gear. In the apparatus, the planetary gear engages with or disengages from a film rewinding gear, serving as a driven gear, while rotating around the sun gear, and thereby the winding operation is changed into the rewinding operation. In this case, the planetary gear can not rotate in the sequential process to causes the trouble unless the planetary gear certainly disengages from the rewinding gear after completion of rewinding operation. Such a problem that the planetary gear can not rotate around the sun gear often arises in the case where the wound film intends to loose in the cartridge after the completion of the film rewinding operation so as to conversely rotate the rewinding gear through a rewinding folk and thus the planetary gear tightly engages with the rewinding gear.

As one of such an apparatus, there has been proposed a mechanism for certainly executing the operation for disengaging the planetary gear from the rewinding gear, as disclosed, for example, in Japanese Laid-open Utility Model Publication No. 55-42822. This apparatus is so constructed that the planetary gear rotates around a sun gear to engage with the rewinding gear in rewinding the film but can not rotate therearound to disengage therefrom. Therefore, in the apparatus, a special releasing member is arranged to forcedly disengage the planetary gear from the rewinding gear while interlocking opening and closing the back lid of the camera. Further, the engagement between a rewinding folk and the shaft of a cartridge is released while interlocking the operation of the releasing member for releasing the engagement between the planetary gear and the rewinding gear.

As stated the above, in the apparatus with the above construction, the releasing member interlocking the lid allows the planetary gear to rotate around the sun gear in a direction in which the engagement between the planetary gear and the rewinding gear is released. That is, the direction in which the planetary gear can rotate around the sun gear by the driving force of a motor driving system which is transmitted from a series of gears train is only the direction in which the planetary gear engages with the rewinding gear. Then, the planetary gear can not rotate in the reverse direction by the driving force thereof. Therefore, it is required to provide with a releasing member which allows the planetary gear to rotate in the reverse direction in which the planetary gear disengages from the rewinding gear at a desirable timing while interlocking the operation of the back lid of the camera. In other words, the mechanism can not return to the original condition by itself. Thus, since the additional driving means different from a driving means in the motor driving system, that is, a manual operation for releasing the engagement between the planetary gear and the rewinding gear, is required. If the releasing operation is executed at an undesirable timing, it is possible to cause a trouble. If another safety mechanism for preventing such a trouble is provided, the number of the parts in the mechanism further increases and the size of the construction thereof becomes bigger.

Furthermore, since the force for releasing the engagement is a bias force of a spring, it is difficult to set the bias force thereof to a specified value. When the planetary gear tightly engages with the rewinding gear not to rotate around the sun gear in the direction for releasing, some amount of the force for releasing is required to be applied to the releasing member, so that in the case where the mechanism of the disengagement interlocks the operation of the back lid of the camera, a larger force is required to close the lid and thus it becomes difficult to close it.

Moreover, there has been proposed a driving control apparatus of a camera which controls to drive a mechanism cocking system and a film winding system by a single motor. The apparatus is so constructed that a mechanism cocking operation and a film winding operation are always executed according to the drive of the motor. Then, for example, in a case where an initial film transporting operation for transporting a film to reach first frame thereof without exposure, i.e., the so-called initial loading operation, is executed when a film is loaded in the camera body, the mechanism cocking operation and the film winding operation are alternatively executed as a series of operations without a shutter releasing operation. Therefore, it causes a problem that the period of time required to execute the initial loading operation is larger than the period of time required to only wind the film. In such a camera with the single motor, film winding operation is executed uselessly when the release operation is executed in unloading the film. Then, conventionally, it has been proposed to provide a special motor for winding the film and a motor for executing the mechanism cocking operation, and thus, for example, the release operation can be executed by stop of the motor for the film winding operation without the film winding operation in unloading the film. Then, the operation to be executed originally can be done without unnecessary operation.

In a case where in order to miniaturize the size of the camera, it is required to execute a release, a mechanism cocking, a film winding, and a film rewinding operation by a single motor. Then, as well as the normal release operation, when only the release and the mechanism cocking operations are required in such a case as the release operation and the initial loading operation are executed in unloading the film, or when the film winding operation or the film rewinding operation is required only, the drive of the motor without unnecessary operation for the sake of energy saving and quick operation.

SUMMARY OF THE INVENTION

Accordingly, an essential object of the present invention is to provide a new operating mechanism to solve or reduce the problems, with respect to the proposed operating mechanism, caused in the case where plural loads are driven by a single motor.

Another object of the present invention is to provide a friction mechanism which can be assembled at the lower of the motor, prevent the higher shoulder of the camera and the limitation of the arrangement of the camera design, reduce the assembly manday thereof, and be constructed as a unit which is not required to adjust the friction force after assembly.

Still another object of the present invention is to provide an electric film rewinding apparatus of a camera to solve the problem, to be simple in construction, and to be capable of stably disengaging the planetary gear from the rewinding gear by a small force.

A further object of the present invention is to provide a driving control apparatus of a camera which can drive a single motor to execute the necessary operation without the unnecessary operation in order to save the energy and to quickly operate. That is, in the apparatus, the release, the mechanism cocking, the film winding, and the film rewinding operation can be executed by driving the single motor, and only the film winding operation can be executed without the release and the mechanism cocking operations in the initial loading operation, while the release and the mechanism cocking operations are executed without the film winding operation in the release operation during unloading the film. Then, the apparatus freely can change the operation order in the release process depending on loading and unloading the film.

In accomplishing these and other objects, there is provided an operating mechanism comprising:

a driving device for reversibly rotating;

an indexing mechanism driven by rotating in one direction of said driving device; and a selecting means for selecting a specified loading system by said indexing mechanism;

whereby a rotational power of said driving device to rotate in the other direction is selectively transmitted the loading system selected by said selecting means.

By the above construction of the present invention, since a specified load system is executed by rotation of the driving device in the other direction on the basis of selection of the selecting means in a specified section of the indexing mechanism, the above-described various problems can be resolved or reduced when plural loads are executed by driving the driving device such as a single motor. That is, any number of load can be set in each of sections divided by the indexing mechanism, a number of load to be driven is not limited, each load can be independently driven thereby, and an operation amount of each load is not limited. If loads are divided in correspondence with sections of the indexing mechanism, plural loads can be independently driven thereby. Thus, the operating mechanism according to the present invention can be smaller and simple in construction and execute plural loads.

In another aspect of the present invention, the friction mechanism of a camera in which a film is wound around a spool by rotation of a motor and rotation of the spool in a counter-clockwise direction is regulated by the mechanism, comprising:

a first gear for engaging with a spool gear fixed to the spool;

a second gear connected with the motor;

a spool driving gear having said second gear;

a friction spring attached to an outer surface of said spool driving gear, which specified portion is engaged with a camera body of the camera.

By the above construction of the present invention, since the friction spring is attached to the outer surface of the spool driving gear connected the motor with the spool gear of the spool to apply the friction torque to the spool driving gear, it is unnecessary to attach the spring to the spool itself. Then, since the spring is attached to spool driving gear of a film winding mechanism assembled at the lower of the motor, the friction mechanism can be assembled at the lower of the motor. Therefore, it is unnecessary to assemble the friction mechanism at the upper of the motor, preventing the higher shoulder of the camera and the limitation of the arrangement of the camera design even if a flexible substrate and liquid crystal display are arranged at the upper of the motor. According to the friction mechanism, since it is unnecessary to assemble the friction mechanism from the upper side of the motor after the motor is assembled from the lower side of the camera, the assembly manday can be reduced. Further, when the spring is preassembled at the spool driving gear in one unit of the film winding mechanism, the friction force can be easily controlled in the unit and it is unnecessary to adjust the force after assembling the friction mechanism. Additionally, when the spring is attached to the spool driving gear arranged at the side where the rotational speed thereof is higher than the rotational speed of the spool gear, the same effect as the conventional friction torque applied to the spool itself can be obtained by the smaller friction torque of the spool driving gear. Then, it is unnecessary to employ a larger friction spring so that the friction mechanism can be advantageously assembled in a smaller space. Moreover, as compared with the conventional friction mechanism with a reverse rotation preventing mechanism in order to prevent rotation in counter-winding direction of the spool, it is unnecessary to have complicated construction such as the reverse rotation preventing mechanism. Then, since the friction spring is only attached to the spool driving gear, the number of parts can be reduced and the construction becomes simple and is manufactured at lower cost.

In still another aspect of the present invention, the electric driving apparatus comprising:

a driving device for reversibly rotating in both of one direction and the other direction;

a sun gear interlocking rotation of said driving device;

a planetary gear for reversibly rotating around said sun gear and rotating around an own axis thereof in stopping rotation around said sun gear;

a driven gear for engaging with said planetary gear at a position in a rotary locus of said planetary gear around said sun gear;

a rotational direction of said planetary gear around said sun gear being changed into one of one direction and the other direction as well as the rotation of said driving device is changed reversely, said planetary gear rotating in the one direction to remove from said driven gear by rotation of said driving device in the one direction, and said planetary gear rotating in the other direction to engage with said driven gear by rotation of said driving device in the other direction, releasing member driven by a driving force in the one direction of said driving device to push said planetary gear toward the one direction around said sun gear in a case where an abnormality is caused in disengaging said planetary gear from said driven gear.

By the above construction of the present invention, since the planetary gear is disengaged from the driven gear in the film rewinding gears by the driving force of the driving device, it can be simple in construction and obtain the sufficient force for the certain disengagement without heavier operational force.

In still another aspect of the present invention, the driving control device of a camera, comprising:

a single motor for reversibly rotating in both of one direction and the other direction and controlled by a signal for rotating in the one direction, a signal for rotating in the other direction, and a stop signal;

a one-way rotation control means of a mechanism cocking system, which executes a release operation, a mechanism cocking operation, and a section change operation by rotation of said motor in the one direction; and a film transporting means of a film winding system, which executes one of a film winding operation and a film rewinding operation by rotation of said motor in the other direction.

In a further aspect of the present invention, the driving control apparatus of a camera, comprising:

a single motor for reversibly rotating in both of one direction and the other direction and controlled by a signal for rotating in the one direction, a signal for rotating in the other direction, and a stop signal;

a one-way rotation control means of a mechanism cocking system, which is driven by rotation of said motor by the one direction;

a film transporting means of a film winding system, which is driven by rotation of said motor in the other direction;

a first motor control means for executing a release operation, an exposure operation, a mechanism cocking operation, a film winding operation, and a section change operation in order in a normal release process while loading a film; and a second motor control means for executing the section change operation, the release operation, the exposure operation, and the mechanism cocking operation in order in a release process while unloading the film.

By the above construction of the present invention, the driving control apparatus can drive a single motor to execute the necessary operation without the unnecessary operation in order to save the energy and to quickly operate. That is, in the apparatus, the release, the mechanism cocking, the film winding, and the film rewinding operation can be executed by driving the single motor, and only the film winding operation can be executed without the release and the mechanism cocking operations in the initial loading operation, while the release and the mechanism cocking operations are executed without the film winding operation in the release operation during unloading the film. Then, the apparatus freely can change the operation order in the release process depending on loading and unloading the film.

In still further aspect of the present invention, the camera for winding a specified amount of a film loaded in a camera body of the camera in an initial loading operation, comprising:

a detecting means for detecting whether or not the initial loading operation is completed;

a film rewinding means for rewinding the film according to an information outputted from said detecting means when a failure of the initial loading operation is detected by said detecting means; and a control means for executing the initial loading operation again after a film rewinding operation is completed by said film rewinding means.

In still further aspect of the present invention, the camera for executing a film winding operation and a film rewinding operation by driving for rotation of a motor in one direction and a shutter cocking operation by driving for rotation of the motor in the opposite direction, comprising:

a film winding mechanism connected with the motor, which winds all of a film by driving for rotation of the motor in the one direction in loading the film;

a film rewinding mechanism connected with the motor, which rewinds by a one frame of the film at a specified timing by driving in the opposite direction of the motor after winding the film by said film winding mechanism.

BRIEF DESCRIPTION OF THE DRAWINGS

These and other objects and features of the present invention will become apparent from the following description taken in conjunction with the preferred embodiment thereof with reference to the accompanying drawings, in which:

FIG. 10 (B) is a sectional side view of the friction mechanism;

FIG. 10 (C) is a schematic perspective view of another spring in the friction mechanism;

DETAILED DESCRIPTION OF THE INVENTION

Figure 1:
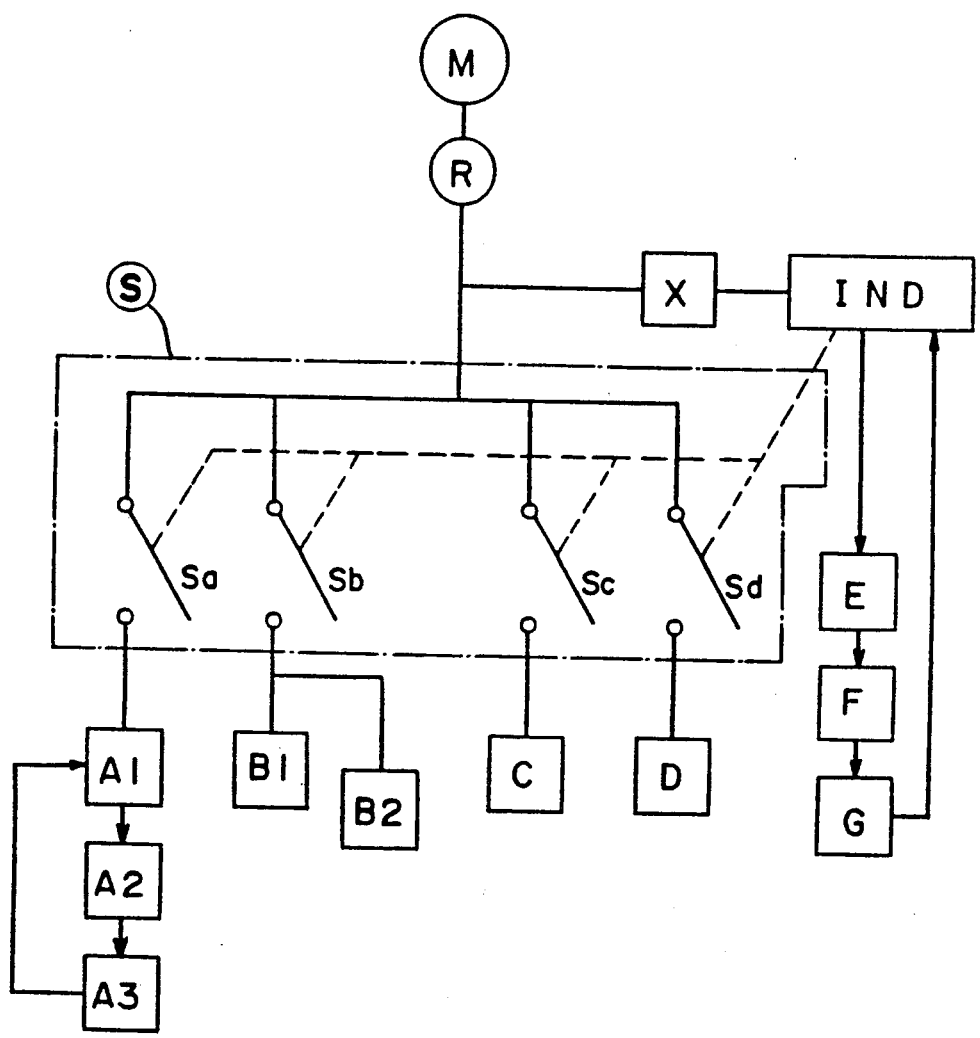
FIG. 1 is an explanatory view of a friction mechanism according to one preferred embodiment of the present invention.

Before the description of the present invention proceeds, it is to be noted that like parts are designated by like reference numerals and symbols throughout the accompanying drawings.

FIG. 1 shows one preferred embodiment of the present invention. In FIG. 1, reference character M represents a reversible motor as drive device for selectively rotating in both of one direction, i.e. normal direction and the opposite direction, i.e. reverse direction; R represents a reduction transmission mechanism; X represents a one-way clutch for transmitting the rotary power of the motor M only while the motor M rotates in the normal direction; IND represents an indexing mechanism; S represents a selecting means; A1, A2, and A3 each represent a first load, a second load, and a third load which comprise a load system (A) having the loads to be operated; B1 and B2 each represent a forth and a fifth load which comprise a load system (B) having the loads to be operated; C represents a load which comprises a load system (C) having the load to be operated; D represents a load which comprises a load system (D) having the load to be operated; (E), (F), and (G) each represent loads which comprise a load systems having the loads to be operated only while the motor M rotates in the normal direction.

In the embodiment, when the motor M rotates in the normal direction, the rotary power of the motor is transmitted to the indexing mechanism IND through the oneway clutch X. However, when transmission mechanisms Sa, Sb, Sc, and Sd in the selecting means S through which the rotary power of the motor M is transmitted to each load system are, respectively, maintained in a state separating from the corresponding load system, the rotary power of the motor M is not transmitted to the load systems (A), (B), (C), and (D).

Now, if the indexing mechanism IND has been positioned at a specified section [A] by the rotation of the motor M in the normal direction, the following operation be executed. This position means a position of the load system (A) waiting to be driven. In this state, the motor M stops rotating and the motor M is driven for rotation in the reverse direction to connect the transmission mechanism Sa of the selecting means S corresponding to the section [A] of the indexing mechanism IND with the load system A so that the load system (A) is driven by the motor M. The load system (A) is driven during a specified driving amount, that is, for example, while the loads A1, A2, and A3 are completely driven in order. Then, when the drive of the load system (A) completes, the motor M stops rotating. After that, the motor M is driven for rotation in the normal direction to separate the transmission mechanism Sa from the load system (A). Thus, the transmitting connection for driving the load system (A) is disconnected so that the indexing mechanism IND which has been maintained in a state stopping driving is driven again for movement toward another section again.

In this operation, by the reverse rotation of the motor M, the load system (A) is independently driven at the section [A] of the indexing mechanism IND, the load system (B) at a section [B], the load system (C) at a section [C], and the load system (D) at a section [D].

When the motor M rotates in the normal direction, the indexing mechanism IND not only selects the selecting means S, but also drives the load systems (E), (F), and (G). In this case, driving amounts, driving directions and driving orders of the load systems (E), (F), and (G) are restricted. The operating sections of the load systems (E), (F), and (G) can be independent of the sections [A], [B], [C], and [D], but can be entirely and partly overlapped with them. For example, the sections [A] and [B] can be set between the sections of the load systems (E) and (F), the section of the load system (F) can be overlapped with the section [C] entirely and a part of the section [D] can be partially overlapped with the sections for (G) and (E), i.e. the section in which the indexing mechanism IND moves from the section for the load system (G) to the section for the load system (E).

In a case where it is constructed so that the sections [A] and [B] are set between the load systems (E) and (F), since the load can be independent of the section, the drive of the load systems (E) and (F) can be completed independently during driving the load systems (A) and (B) at the sections [A] and [B]. In such a case where it is constructed that the load system (F) is overlapped with the section [C], the indexing mechanism IND and the peripheral mechanism can be more simple in construction because the indexing mechanism IND is not necessary to be divided into two sections. If the section [D] is designed to be partially overlapped between the load systems (G) and (E), the construction can be more free in design. Thus, for example, the section [D] can be started driving by being interlocked a switchover mechanism to change the section into another one during driving the load system (G), and then the mechanism in the load system (G) can also serve as the transmission mechanism Sd which the selecting means S comprises. In the construction, the mechanism can be more simple and smaller in construction.

The order and the arrangement of the sections [A], [B], [C], and [D] can be applied in other various forms, and can be constructed in correspondence with the desired friction mechanism.

In the operation, if the indexing mechanism IND is positioned to any section, for example, the section [A], the load system (A) is driven only by the reverse rotation of the motor M. Thus, without changing the construction of the mechanism, the following operation can be executed: for example, the load system (B) can be driven after the driving of the load system (D) without driving the load system (A) by the motor M, some of the load systems (A), (B), (C), and (D) are driven in any order at any timing during a required driving amount thereof, and are stopped driving at any time, or the mechanism can wait at a specified section without driving other load systems after the load systems only (E), (F), and (G) are driven.

Though the above-described first embodiment shows four load systems capable of being selected by the selecting means S and three kinds of loads capable of being driven with the indexing mechanism IND, if the indexing mechanism IND and the selecting means S are divided into smaller or larger sections as required, the numbers of the systems and the kinds of the load are not limited to the embodiment; they can increase or decrease corresponding to requirement; the indexing mechanism IND can be driven only to index the required section without driving the loads By the arrangement of the first embodiment, the friction mechanism employing the indexing mechanism IND and the selecting means S can be simple and small in construction and since it can selectively or unlimitedly drive plural loads, it is very useful.

Figure 2:
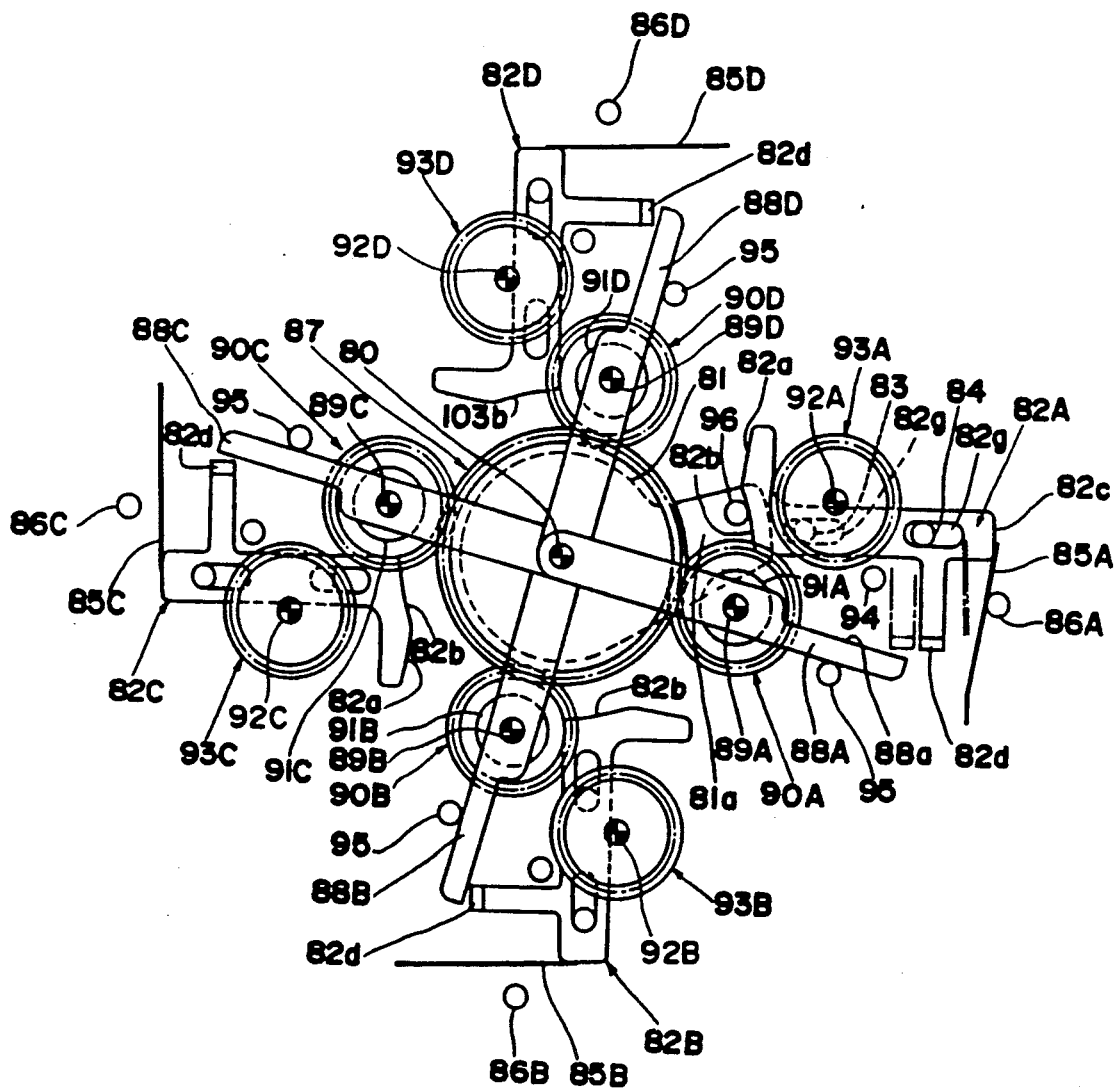
FIG. 2 is a more concrete plan view of an indexing mechanism and a selecting means in the friction mechanism shown in FIG. 1.

Next, FIG. 2 shows a concrete embodiment including the indexing mechanism IND and the selecting means S in the first embodiment. In FIG. 2, numeral 80 denotes a center axis; 81 an indexing plate; 96 an indexing pin fixed to an arm portion 81a of the indexing plate 81; 82A, 82B, 82C, and 82D each denote a change plate; 83 and 84 guide pins; 85A, 85B, 85C, and 85D spring-like switching armatures each which a first switch S1, a second switch S2, a third switch S3, and a fourth switch S4 comprise; 86A, 86B, 86C, and 86D contacts each which the first switch S1, the second switch S2, the third switch S3, and the fourth switch S4 comprise; 87 an input gear; 88A, 88B, 88C, and 88D each a first planetary lever, a second planetary lever, a third planetary lever, and a fourth planetary lever; 89A, 89B, 89C, and 89D each a first, a second, a third and a fourth planetary gear axis; 90A, 90B, 90C, and 90D each a first, a second, a third and a fourth planetary gear; 91A, 91B, 91C, and 91D friction washers; 92A, 92B, 92C, and 92D each a first, a second, a third and a fourth transmission gear axis; 93A, 93B, 93C, and 93D each a first, a second, a third and a fourth transmission gear each connecting with each load system (A), (B), (C) and (D); 94 and 95 planetary stoppers. Each of the change plates 82 has a pair of longitudinal-extending slots 82g and 82g so that the guide pins 83 and 84 are movably engaged into the slots 83 and 83. Thus, each change plate 82 is always biased towards the center axis 80 by the bias force of each of the switching armatures 85, as shown in FIG. 2.

An outputted rotary power of the motor M (not shown) is transmitted through the reduction transmission mechanism R (not shown) to the input gear 87 supported by the center axis 80.

Figure 3:
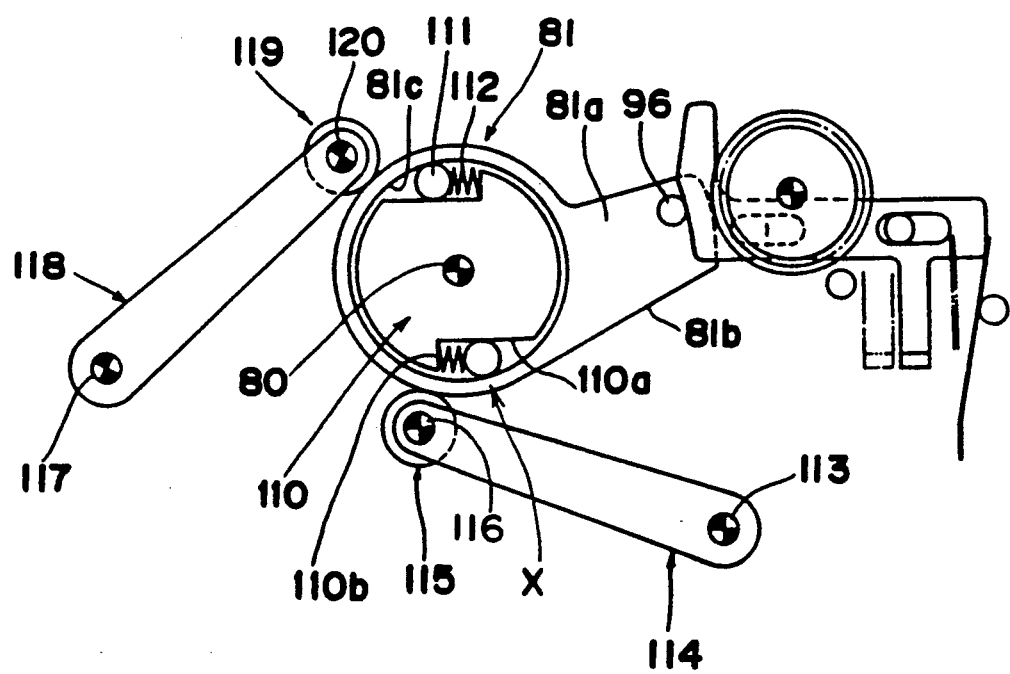
FIG. 3 is a plan view showing a one-way clutch and a driving transmission unit for loads according to the embodiment.

When the motor M rotates in the normal direction, the input gear 87 turns clockwise to rotate the indexing plate 81 clockwise through the one-way clutch X, as shown in FIG. 3. On the other hand, since the indexing plate 81 has the arm portion 81a and the indexing pin 96 for indexing each section, the indexing pin 96 orbits the center axis 80 clockwise by the rotation of the motor M in the normal direction. A cam portion 82a of each change plate 82 is set at each position confronting the orbital path of the indexing pin 96. Thus, after the pin 96 contacts with any cam portion, for example, the cam portion 82a of the change plate 82A, the change plate 82A moves in a rightward direction in FIG. 2 against the bias force of the switching armature 85A while being guided by the guide pins 83 and 84, by the contact between the pin 96 and the cam portion 82a.

Then, when the indexing pin 96 contacts with a cam portion 82b of the change plate 82A, the switching armature 85A is urged in a most-rightward direction in FIG. 2 to contact with the contact 86A. Then, the first switch S1 is turned on. By an ON signal of the first switch S1, a control circuit (not shown) detects that the indexing mechanism IND has indexed the section [A], and the motor M is stopped rotating in the normal direction. FIG. 2 shows a complete stop position where the change plate 82A moved in a rightward direction to maintain.

The input gear 87 always engages with four planetary gears 90A, 90B, 90C, and 90D. The planetary gears 90A, 90B, 90C, and 90D each are supported by the first, the second, the third and the fourth planetary gear axis 89A, 89B, 89C, and 89D fixed to the first, the second, the third and the fourth planetary lever 88A, 88B, 88C, and 88D pivotably supported by the center axis 80. A frictional force serving as a binding power between each of the first, the second, the third, and the fourth planetary gear 90A, 90B, 90C, and 90D and each of the first, the second, the third, and the fourth planetary lever 88A, 88B, 88C, and 88D is produced therebetween through each friction washer 91A, 91B, 91C, and 91D. Thus, the first, the second, the third, and the fourth planetary lever 88A, 88B, 88C, and 88D is urged to pivot in the same direction as rotary direction of the input gear 87 by the specified frictional force and thus pivots clockwise to contact with each stopper 95 so as to stop by the rotation of the motor M in the normal direction.

According to the arrangement as described above, when the motor M rotates in the reverse direction to drive the load system (A), the input gear 87 starts to rotate counterclockwise. In this case, as shown in FIG. 3 as described below, the one-way clutch X is maintained in nontransmission rotary direction to keep the indexing plate 81 at a position shown in FIG. 2.

On the other hand, the first, the second, the third, and the fourth planetary lever 88A, 88B, 88C, and 88D attempt to pivot counterclockwise by the frictional force, according to the rotation of the input gear 87 counterclockwise. In this case, since the indexing pin 96 is positioned at an operating position in respect to the load system (A), a bent portion 82d of the change plate 82A moves by the indexing pin 96 to a position where the bent portion 82d can not contact with a stopper face 88a of the first planetary lever 88A to stop the pivot of the lever. Thus, the first planetary lever 88A moves to such a position that the stopper face 88a of the change plate 82A contacts with the planetary stopper 94. At this time, the first planetary gear 90A moves to a position for engaging with the first transmission gear 93A supported by the first transmission gear axis 92 to maintain thereat, so that the rotary power of the motor M is transmitted to the load system (A) through engagement between the gears 90A and 93A. The mechanisms to selectively transmit the rotary power thereof to the other load systems (B), (C), and (D), are generally similar to that as described above. However, since when the power is transmitted to the load system (A), the indexing pin 96 is not positioned in each section for respectively operating the change plates 82B, 82C, and 82D, each bent portion 82d of the change plates 82B, 82C, and 82D stops all counterclockwise pivots of the planetary levers 88B, 88C, and 88D. Then, each of the planetary gears 90B, 90C, and 90D in the other load systems (B), (C), and (D) rotates idly not to engage with each of the transmission gears 93B, 93C, and 93D while separating therefrom, and thus only the load in the load system (A) is driven in the section [A] by the rotation of the motor M in the reverse direction.

When an instruction that a specified driving amount of the load in the load system (A) has been done is transmitted to a control circuit (not shown), a counterclockwise rotation stop signal is inputted from the circuit to the motor M to stop the motor M and to complete the driving of the load in the load system (A).

Sequentially, in a case where it is desirable that the load in the load system (B) is driven, the indexing plate 81 which has stopped is rotated clockwise by the rotation of the motor M in the normal direction, and the indexing pin 96 is turned to a position for contacting with the cam portion 82b of the change plate 82B. Then, when an ON signal of the second switch S2 which is produced in a case where the switching armature 85B contacts with the contact 86B is detected, the motor M is stopped. Sequentially, the motor M is driven for rotation in the reverse direction. Thus, the second planetary gear 90B engages with the second transmission gear 93B by the counterclockwise pivot of the second planetary lever 88B, and the second transmission gear 93B is driven for rotation by the motor M to drive the load in the system (B). In this case, the other systems (A), (C), and (D) are not driven thereby because the planetary gears 90A, 90C, and 90D are positioned at positions not to engage with the transmission gears 93A, 93C, and 93D, the rotary power of the motor M is not completely transmitted, respectively. In another case where it is desirable that the load in the system (D) is driven without driving the load in the system (C) after driving the load system (B), the motor M is driven for rotation in the normal direction to advance the indexing pin 96 in the normal direction. Then, consequentially, the indexing pin 96 contacts with the cam portion 82b of the change plate 82D, and after an ON signal of the fourth switch S4 which is produced in a case where the switching armature 85D contacts with the contact 86D is detected, the motor M is stopped.

In this case, after the indexing pin 96 passes through a position for contacting with the cam portions 82a and 82b of the change plate 82C, an ON signal of the third switch S3 which is produced in a case where the switching armature 85C contacts with the contact 86C is detected. However, the control circuit substantially ignores the ON signal thereof as a confirmation signal for passing through the section [C] to continue to rotate the motor M in the normal direction. Therefore, the indexing pin 96 can pass through the section [C] entirely without driving the load in the system (C) and the load in the system (D) can be driven.

As shown in FIG. 2, by employing the indexing mechanism and the selecting means according to the first embodiment of the present invention, plural loads can be independently and unlimitedly driven under any combination of the loads by a combining of the simple mechanisms.

FIG. 3 shows the one-way clutch X and a driving transmission unit for the loads E, F, and G, which are located on the opposite side to the mechanism shown in Fig. 2 in an axial direction of the center axis 80, according to the first embodiment, as shown in FIG. 1, of the present invention. The description of parts overlapping the parts of the mechanism in FIG. 2 will be omitted.

In FIG. 3, reference numeral 110 denotes a one-way clutch plate generally integrally combining with the input gear 87 shown in FIG. 2; 111 a roller which the one-way clutch X comprises; 112 a spring for always urging the roller 111 in a specified direction; 114 a lever EF pivotably supported by an axis 113; 115 a roller rotatably supported on the lever EF by an axis 116; 118 a lever G pivotably supported by an axis 117; 119 a roller rotatably supported on the lever G 118 by an axis 120.

This arrangement is constructed so that when the lever 114 pivots counterclockwise at specified angles, the loads E and F shown in FIG. 1 are driven in order, and when the lever 118 pivots counterclockwise at specified angles, the load G is driven.

Now, FIG. 3 shows a state where the indexing plate 81 is positioned at a position where the load in the system (A) is driven in the section [A] as shown in FIG. 2. If it is desirable that the loads E and F are driven, the motor M is first driven for rotation. Then, the input gear 87 rotates clockwise as described above, so that the one-way clutch plate 110 generally integrally combining with the input gear 87 also rotates clockwise therewith. At this time, each of the rollers 111 is always urged between a cam face 110a of the one-way clutch plate 110 and an inner face 81c of the indexing plate 81 in a specified direction by the spring 112. Therefore, the roller 111 maintaining in an wedge-like space defined by the cam face 110a and the inner face 81c serves such a self-locking function that the roller 111 contacts with the cam face 110a and the inner face 81c. Thus, the one-way clutch X becomes in a state connecting the input gear 87 with the indexing plate 81 to rotate the indexing plate 81 clockwise. The roller 115 is pushed by a cam portion 81b formed on the indexing plate 81 rotated in a clockwise direction and thus the lever 114 is pivoted counterclockwise around the axis 113 to drive the loads E and F.

Similarly, the load G is also driven by counterclockwise pivot of the lever 118 around the axis 117 by the contact between the cam portion 81b and the roller 119.

When the arm portion 81a of the indexing plate 81 passes through positions contacting with the rollers 115 and 119, respectively, the drive for the loads E, F, and G is designed to complete.

In this case, there is no special mutual relation between the loads E, F, and G and the sections [A], [B], [C], and [D], but a special mutual relation therebetween can be built up according to purposes as described above.

The construction shown in FIG. 3 is described as one example and other known construction of the one-way clutch and the driving mechanism can be employed. Though the loads E, F, and G are driven by the common portion of the indexing plate 81 i.e. the cam portion 81b in the arrangement shown in FIG. 3, each load can be independently driven by independent respective portions thereof.

Figure 4:
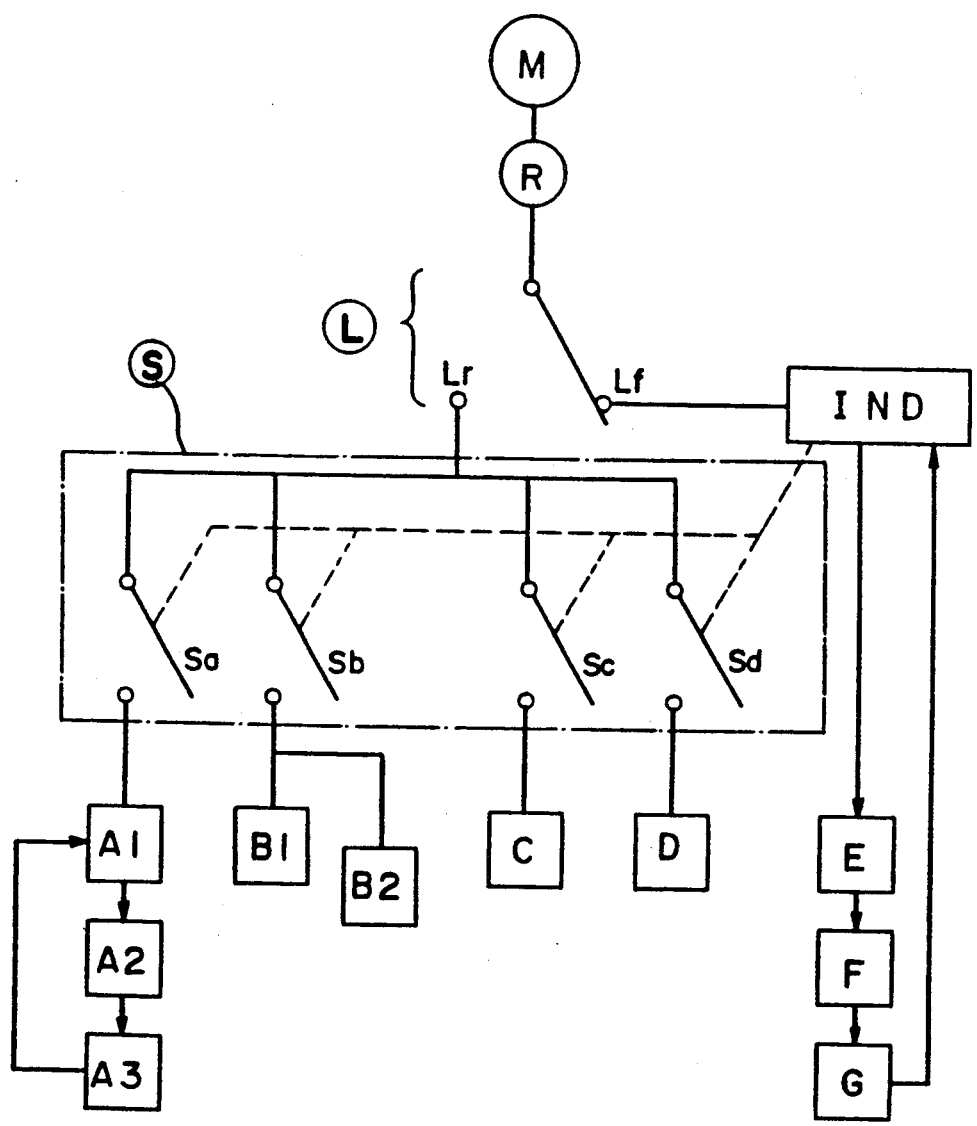
FIG. 4 is an explanatory view of a friction mechanism according to the second embodiment of the present invention.

Next, FIG. 4 shows a second embodiment of the present invention in which a change mechanism L for selectively connecting with and transmitting a driving force of the motor M to one of load systems Lf and Lr according to the rotary direction of the motor M without the one-way clutch X is employed and the operation and function after transmission of the driving force are similar to that of the first embodiment.

In this second embodiment, when the motor M rotates clockwise, no driving force is completely transmitted to other loads sequentially arranged after the load Lr. Thus, each of the planetary gears 90A, 90B, 90C, and 90D shown in FIG. 2 can not be driven for rotation. Therefore, loss of the frictional force can reduce only such an amount that the gears rotate by the driving force. Furthermore, when the motor M is driven for rotation in the reverse direction after selecting the specified section, the load system Lf including the indexing mechanism dose not connect with the motor M. Therefore, for example, such an operation that the part of the indexing mechanism IND reverses to a position where the mechanism IND has already passed through can be executed according to driving the load in the load system e.g. (C).

Figure 5:
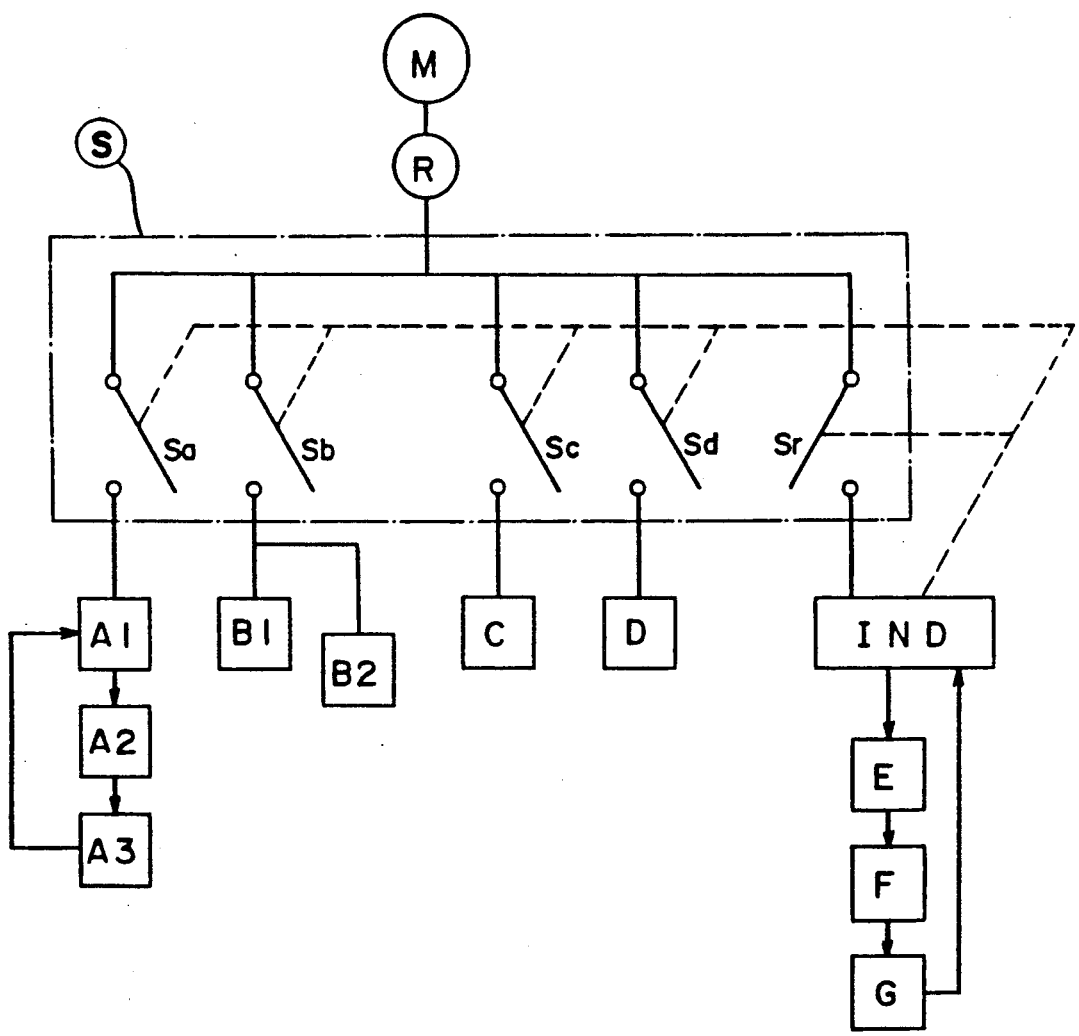
FIG. 5 is an explanatory view of a friction mechanism according to the third embodiment of the present invention.

FIG. 5 shows a third embodiment of the present invention in which the concrete construction of the selecting means S is modified to perform the similar function without a special construction such as the one-way clutch x and the change mechanism L. That is, it is so constructed that the selecting means S includes a transmission mechanism Sr which transmits the rotary power of the motor M to the indexing mechanism IND while connecting, only in a case where the rotary direction of the motor M is opposite to a direction in which transmission mechanisms Sa, Sb, Sc, and Sd transmit the rotary power of the motor M. The indexing mechanism IND is driven by the outputted power through the mechanism Sr.

In this case, the transmission mechanism Sr only becomes in the connecting state by the rotation of the motor M in the normal direction to drive the indexing mechanism IND so that selection operation of the section and to drive operation of the loads E, F, and G are executed. When a specified section, namely, the section [C], is selected by the indexing mechanism IND, the motor M stops. Then, the motor M starts to rotate in the reverse direction, and thus the transmission mechanisms Sa, Sb, and Sd each maintain in non-connecting state and only the transmission mechanism Sc selectively becomes in a connecting state, as described in the above first and second embodiments. Therefore, the rotary power of the motor M in the reverse direction is transmitted to the load system (C) through the transmission mechanism Sc. Then, the load in the load system (C) can be freely driven and stopped until the next rotation of the motor M in the normal direction. In the case, if the motor M rotates in the reverse direction, the transmission mechanism Sr is moved from a connecting position to a non-connecting position to maintain the indexing mechanism IND in the section [C].

By the arrangement as described above, since it is unnecessary to employ the one-way clutch X and the change mechanism L, the mechanism can be simple, compact in construction and cheeper in production, as a whole.

One example of a concrete construction of the third embodiment is as follows: in FIG. 2, the one-way clutch X between the input gear 87 and the indexing plate 81 is removed therefrom; there is provided a transmission mechanism Sr which comprises a fifth planetary gear engaged with the input gear 87, a planetary lever, both of which are, respectively, rotatably or pivotably supported by the center axis 80, and a fifth transmission gear arranged so that it can engage with the fifth planetary gear when the input gear 87 rotates clockwise; furthermore, the mechanism is constructed so that a rotary power of the fifth transmission gear is transmitted to the indexing plate 81; thus, when the motor M rotates in the normal direction, the fifth planetary gear engages with the fifth transmission gear to rotate the indexing plate 81 clockwise.

Figure 6:
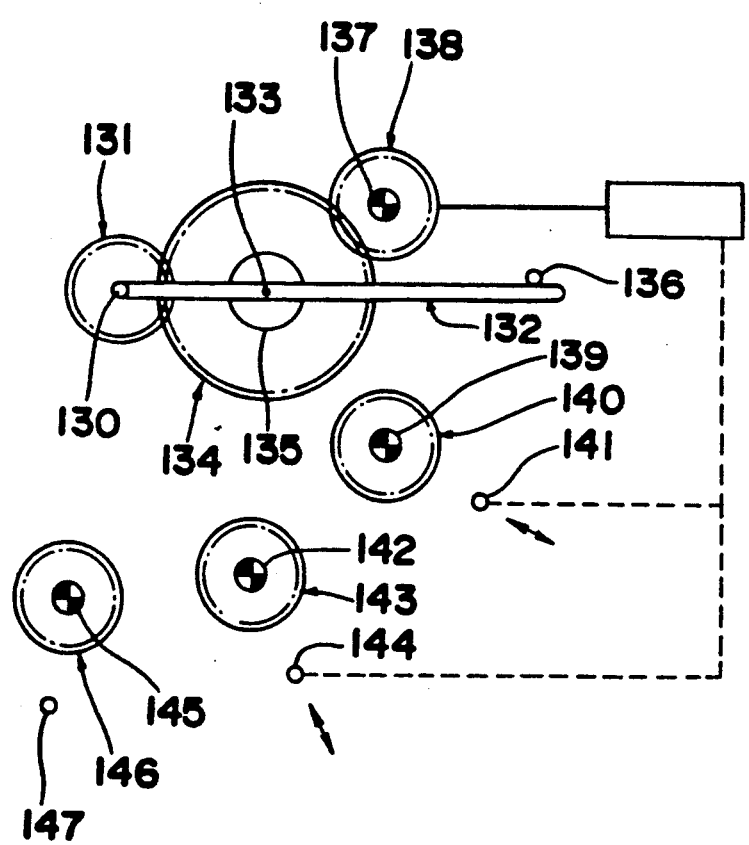
FIG 6 is a concrete plan view of another friction mechanism according to the third embodiment.

As another concrete mechanism of the third embodiment, for example, it can be constructed by a single planetary mechanism as shown in FIG. 6.

That is, in FIG. 6, numeral 130 denotes a center axis; 131 an input gear into which the rotary power of the motor M is inputted from the reduction transmission mechanism R; 132 a planetary lever supported by the center axis 130; 133 a planetary gear axis fixed to the planetary lever 132; 134 a planetary gear rotatably supported by the planetary gear axis 133 and always engaged with the input gear 131; 135 a friction washer arranged between the planetary lever 132 and the planetary gear 134 to produce a specified frictional force therebetween; 136 a stopper for stopping counterclockwise pivot of the planetary lever 132 to position it at a specified position; 138 a transmission gear TR rotatably supported by an axis 137; 140 a transmission gear A rotatably supported by an axis 139; 141 a stopper A for advancing and retreating in directions shown by arrows according to the position of the indexing mechanism IND and capable of stopping the clockwise pivot of the planetary lever 132 at a specified position or passing therethrough; 143 a transmission gear B rotatably supported by an axis 142; 144 a stopper B for advancing and retreating in directions shown by arrows according to the position of the indexing mechanism IND and capable of stopping the clockwise pivot of the planetary lever 132 at a specified position or passing therethrough; 146 a transmission gear C rotatably supported by an axis 145; 147 a stopper C for stopping the clockwise pivot of the planetary lever 132 at a specified position.

In FIG. 6, when the motor M rotates in the normal direction, the input gear 131 rotates counterclockwise. Then, the planetary lever 132 attempts to pivot with the input gear 131 in the same direction, counterclockwise direction, as that of the input gear 131 according to the function of the friction washer 135, but is stopped by the stopper 136 to maintain at a position shown in FIG. 6. In this case, a good relation in engagement between the planetary gear 134 and the transmission gear 138 is maintained. Therefore, the rotary power of the motor M in the normal direction is transmitted as the counterclockwise rotation of the transmission gear 138 through the counterclockwise rotation of the input gear 131 to advance the indexing mechanism IND. Then, when it is desirable that the load in the load system (A) connected with the transmission gear 140 is driven, the indexing mechanism IND is first advanced by the rotation of the motor M in the normal direction to select the section [A] and to stop the motor M. At that time, the stopper 141 waits while being entered the rotary locus of the planetary lever 132, by the selecting means S (not shown in FIG. 6) specified by the indexing mechanism IND. After that, when the motor M is driven for rotation in the reverse direction, the input gear 131 rotates clockwise and the planetary lever 132 pivots clockwise by the friction function of the friction washer 135. Then, when the planetary lever 132 contacts with the stopper 141, the lever 132 stops pivoting by the stopper 141. At this time, the planetary gear 134 and the transmission gear 140 are maintained in suitable positions in which there is a good relation in the engagement therebetween. Then, the rotary power of the motor M in the reverse direction is transmitted as the clockwise rotation of the transmission gear 140 thereto through the clockwise rotation of the input gear 131 to drive the load in the load system (A). Thus, the load in the load system (A) can be freely driven and stopped until the next normal rotation of the motor M.

Hereinafter, the operation in a case where the load in the load system (B) is driven will be described. First, the motor M is driven for rotation to remove the mechanism from the load system (A). Then, the input gear 131 rotates counterclockwise to pivot the planetary lever 132 counterclockwise by the frictional force until the lever 132 contacts with the stopper 136 to stop. Thus, the planetary gear 134 disengages from the transmission gear 140 to keep in engagement with the transmission gear 138. After that, the motor M continues to rotate in the normal direction to drive to rotate the transmission gear 138 counterclockwise and to advance the indexing mechanism IND. By the advance of the indexing mechanism IND, the mechanism IND removes from the section [A] and comes into the section [B]. Then, a control circuit (not shown) detects by a signal of a switch S2 (not shown) etc. that the mechanism IND comes into the section [B] and the motor M is stopped. When the mechanism IND selects the section [B], the stopper 141 retreats to a position where the planetary lever 132 is not stopped pivoting by the stopper 141, and the stopper 144 enters the rotary locus of the planetary lever 132 to wait so as to stop moving in the clockwise direction over the position contacting with the lever 132. In this state, when the motor M is driven for rotation in the reverse direction, the planetary lever 134 and the planetary gear 134 remove from the transmission gear 138 to pivot and rotate clockwise around the center axis 130. Then, the planetary lever 132 contacts with the stopper 144 and the planetary gear 134 engages with the transmission gear 143 at the same time. Further, by the further clockwise rotation of the input gear 131, the transmission gear 143 is driven for clockwise rotation to drive the load in the load system (B).

In this case, the planetary gear 134 temporarily passes through a position for engaging with the transmission gear 140 during the clockwise pivot of the planetary lever 132. Here, when the driving load of the load system (A) in its reverse direction is small, the transmission gear 140 is rotated slightly counterclockwise (the direction for driving the load in the load system (A) reversely) by engagement between the transmission gear 140 and the planetary gear 134. When the driving load of the load system (A) in its reverse direction is large, the transmission gear 140 continues to stop and the planetary gear 134 contacts with the transmission gear 140 to pivot the planetary gear 134 clockwise around the center axis 130 while rotating counterclockwise around the planetary gear axis 133 as rolling, by the slip of the friction washer 135.

Anyway, even if the planetary gear 134 temporarily engages with the transmission gear 140, the gear 134 removes from the gear 140 at once to keep in engagement between the planetary gear 134 and the next transmission gear 143 and to drive the load in the load system (B).

When the drive of the load system (B) completes and the next operation is executed, the motor M is driven for rotation in the normal direction and the input gear 131 rotates counterclockwise. Then, by the above-described friction function, the planetary lever 132 removes from the stopper 144 to pivot counterclockwise to a position contacting with the stopper 136. According to further counterclockwise rotation of the input gear 131, the indexing mechanism IND advances to the next section. At this time, the planetary gear 134 temporarily engages with the transmission gear 140 on the way to pivot counterclockwise around the center axis 130. However, the operation is similar to that described above except for clockwise rotation of the transmission gear 140 for driving the load system (A).

The operation in a case where the load in the load system (C) is driven will be briefly explained because it is similar to that described above. First, the indexing mechanism IND selects the section [C] by driving for rotation of the motor M in the normal direction. In this case, the stoppers 141 and 144 maintain at positions where they are located out of the rotary locus of the planetary lever 132 by the indexing mechanism IND. Then, when the motor M is driven for rotation in the reverse direction, the planetary lever 132 pivots clockwise around the center axis 130 to contact with the stopper 147. Further rotation of the motor M allows the transmission gear 146 engaged with the planetary gear 134 to rotate clockwise and to drive the load in the load system (C). When the indexing mechanism IND removes from the position for driving the load system (C), the motor M needs to rotate in the normal direction, as described above.

When the indexing mechanism IND moves to and removes from the load system (C), the planetary gear 134 temporarily engages with the transmission gears 140 and 143.

According to the arrangement shown in FIG. 6 and described above, since plural loads are selectively driven by a single planetary mechanism and a change transmission means for changing the power transmission channel from the load systems (A); (B), and (C) into the indexing mechanism IND is comprised by the use of the part of the planetary mechanism, the mechanism for perform purposes can be simple in construction. Specially, according to the embodiments of the present invention, without an operation from the outside of the camera, it can be constructed so that each or both of the stoppers 141 and 144 can be advanced or retreated by the rotary power of the motor itself. Therefore, it is preferable that in a case where it is constructed so that the planetary gear 134 passes through the transmission gear unit with respect to the load system which is not intended to drive on the way to pivot around the center axis 130 as shown in FIG. 6, an unstable factor to be considered and complicated mechanisms and operations accompanying with the outside operation can exclude suitably therefrom.

In FIG. 6, if in a case where the planetary gear 134 passes through the unit with respect to the load system which is not intended to drive on the way to pivot around the center axis 130, a temporary engagement between the planetary gear 134 and the transmission gear unit is inconvenient, it may be constructed so that when the stoppers 141 and 144 for stopping the lever 132 are advanced or retreated by the indexing mechanism IND, each of the transmission gears 140 and 143 is advanced or retreated with the stoppers 141 and 144 at the same time, and thus the temporary engagement can remove.

In the indexing mechanism IND shown in FIG. 6, though other loads does not depend on it and three kinds of loads system are indexed by it, the number of the load systems can be increased or decreased and the load can be driven by the indexing mechanism IND, as shown in FIG. 5.

Hereinbefore, the principle idea according to the present invention is described above. Sequentially, concrete examples, according to the present invention, in correspondence with purposes will be explained hereinbelow.

(1) VIDEO CASSETTE DECK

Load systems selected by the selecting means are as follows:

[1] Loading of a cassette;
[2] Drawing of a tape or winding of the tape for a wind cylinder;
[3] Winding of the tape;
[4] Fast forwarding of the tape;
[5] Rewinding of the tape;
[6] A cassette ejecting.

Since these load systems are freely and independently driven by a single motor, the whole construction of the deck can be simple and small. An also cassette tape deck can be simple and small in construction by the similar way. In this case, other operation such as automatically reversing operation, in which after a completion of a playback for one side of the tape-cassette (or real), a playback for the other side thereof is started automatically by changing over the moving direction of the tape, can be included.

(2) WIPER DRIVING MECHANISM OF VEHICLE SUCH AS AUTOMOBILE

Load systems selected by the selecting means are as follows:

[1] Drawing of a wiper;
[2] Accommodation of the wiper;
[3] Slow speed driving of the wiper;
[4] Middle speed driving of the wiper;
[5] Fast speed driving of the wiper.

Since these load systems are freely and independently driven by a small motor, the whole construction of the mechanism can be simple. Mechanisms for moving the wiper back and forth can be constructed in every load system. It can be constructed so that as shown in the example, the same load can be driven by connecting with a load system selected from load systems each having a different gear ratio, and thus the load to be driven can be freely driven at slow speed by a strong driving power or high speed. Therefore, an optimum condition for driving the load can be set by a simple and small construction according to purposes. In this case, the mechanism can include any load system in each different direction in which a load to be driven is driven and the system has a gear ratio different from that of the other load system.

(3) DRIVING MECHANISM OF CAMERA (EXAMPLE 1)

This motor operating mechanism is more preferable for a camera and will be concretely explained. In the example 1, a case where it is applied to a camera other than a single lens reflex camera (i.e. so called point-and-shoot camera) will be explained.

Load systems selected by the selecting means are as follows:

[1] Winding of a film;
[2] Rewinding of the film;
[3] Forward moving of a lens (for focusing);
[4] Backward moving of the lens (for focusing);
[5] Zooming operation;
[6] Projecting and retracting of an electronic flash;
[7] Cocking of a shutter mechanism.

The operation for driving each of these load systems can independently be executed. In the indexing mechanism, it can be constructed so that not only the operation for indexing a section with respect to the load system, but other operation such as a release operation can be executed.

In this case, though there are seventh kinds of load systems in the selecting means in this example, it is not limited to the example; the number of the load systems can take any value and other load system can be performed thereby.

According to the arrangement of the example as an embodiment of the present invention, since plural independent loads can be driven by the simple mechanism, the camera can be small and light in weight. Further, since various operations performed by a manual operation in the conventional camera can be easily automated, it can be provided for users with easy-to-use camera.

(4) DRIVING MECHANISM OF CAMERA (EXAMPLE 2)

Figure 7:
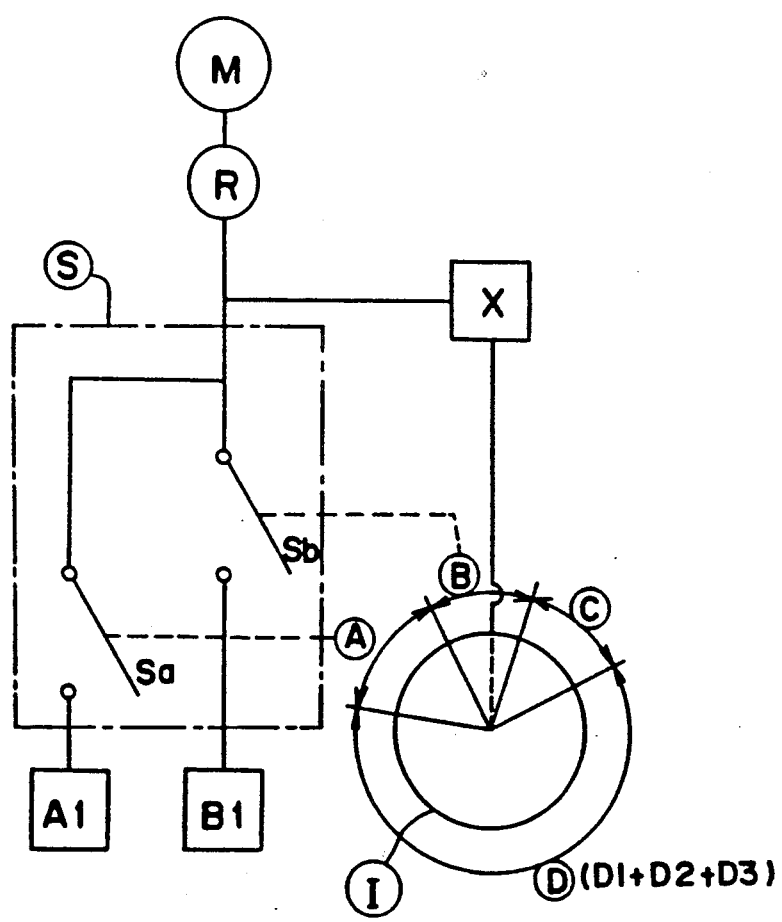
FIG. 7 is an explanatory view of a friction mechanism according to another embodiment of the present invention which is applied to a single-lens reflex camera as a driving friction mechanism thereof.
Figure 8:
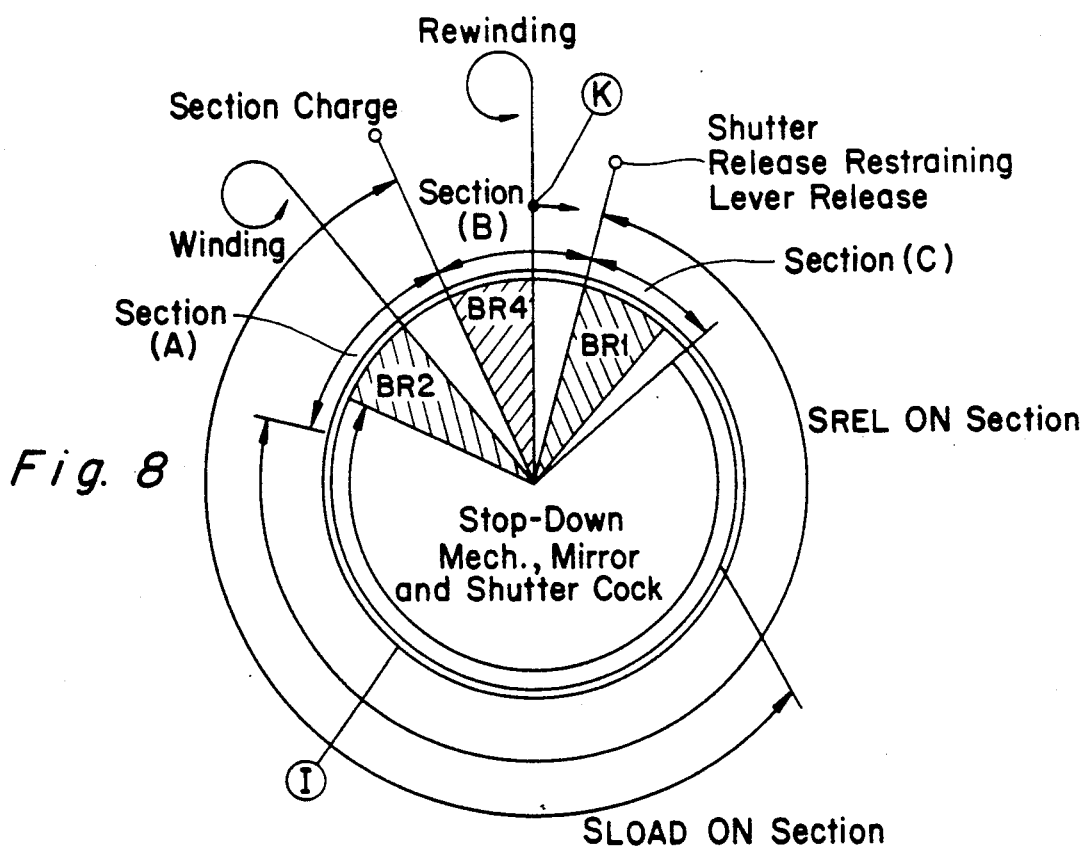
FIG. 8 is an explanatory view showing a concrete construction of an indexing mechanism shown in FIG. 7.

Next, an example 2 showing a single-lens reflex camera according to another embodiment of the present invention, as shown in FIGS. 7 and 8, will be explained.

In FIG. 7, reference character M represents a reversible motor for selectively rotating in both of a one direction, i.e. normal direction and the other direction, i.e. reverse direction; R represents a reduction transmission mechanism for transmitting a rotary power of the motor M to a load; X represents a one-way clutch for transmitting the rotary power of the motor M only while the motor M rotates in the normal direction; I represents an indexing mechanism which is driven by the rotary power of the motor M in the normal direction through the one-way clutch X; S represents a selecting means; A1 and B1 represent loads in load systems (A) and (B), respectively. The indexing mechanism I is comprised of a rotary mechanism having sections [A], [B], [C], and [D] as described below in FIG. 8, which performs the specified operation in one rotation.

In FIG. 7, when the motor M is driven for rotation in the reverse direction in a state where the indexing mechanism I stops in the section [A], only a transmission mechanism Sa in the selecting means S selectively becomes in a transmission state, and the load A1 is driven by the rotary power of the motor M in the reverse direction. At this time, the one-way clutch X is in a nontransmission state and the indexing mechanism I keeps in the section [A].

Sequentially, when the motor M is driven for rotation in the normal direction, the transmission mechanism Sa is in the nontransmission state to complete the driving of the load A1 and to remove therefrom. At the same time, the one-way clutch X is in the transmission state, and the indexing mechanism I rotates clockwise in FIG. 7 to move to the section [B]. In the section [B], the motor M rotates in the reverse direction, the indexing mechanism I stops and drives the load B1. By the rotation of the motor M in the normal direction, the release operation of the camera starts executing in the section [C] as described below, and an aperture diaphragm stop-down mechanism, a mirror, and a shutter are returned to original positions and simultaneously cocked, respectively, in the section [D].

In this case, the example in which the load A1 corresponds to a film winding operation, and the load B1 corresponds to a film rewinding operation will be explained.

FIG. 8 shows a concrete construction of the indexing mechanism I shown in FIG. 7. In FIG. 8, the indexing mechanism I stops at a position K corresponding to an end point in a brake section BR4 under normal condition where the film is set in the camera.

Here, if an user depresses a release button (not shown), the motor M is driven for rotation in the normal direction to start the release operation by a control circuit (not shown). Then, the one-way clutch X becomes in the transmission state, so that the indexing mechanism I starts to rotate clockwise from the position K. At this time, though the indexing mechanism I indicates the section [B], since a transmission mechanism Sb keeps in nontransmission state during the rotation of the motor M in the normal direction, the rotary power of the motor M in the normal direction is not transmitted to the load system (B), and the film rewinding operation is not executed.

At the next moment, the indexing mechanism I releases a shutter release restraining lever described later to enter the section [C]. By the release of the aperture open engaging lever, the release operation of the camera is executed as described later to expose an object image onto the film. At this time, a switch $S_{REL}$ is turned on to output a stop instruction from the control circuit to the motor M and to advance in the brake section BR1, resulting in stop. When the exposure of the film has been completed, the motor M starts to rotate in the normal direction again by the control circuit and the indexing mechanism I removes from the section [C] to enter the section [D]. In the section [D], by the rotation of the motor M in the normal direction, the aperture diaphragm stop-down mechanism, the mirror, and the shutter (not shown) are returned to original positions and simultaneously cocked, respectively. At this time, another switch $S_{LOAD}$ is turned on during the operation. When the above returning and cocking operation of the aperture diaphragm stop-down mechanism, the mirror, and the shutter almost completes, the switch $S_{REL}$ is turned off. Thus, the control circuit detects that the indexing mechanism I enters the section [A] to input the stop instruction into the motor M.

In this case, the brake operation can be started to execute immediately when the switch $S_{REL}$ is turned off, or, after a time for completing the returning and cocking operation of these mechanisms is calculated by counting etc., the brake operation can be started to execute from the calculated time. The first method can obtain the an effective angular distribution of the indexing mechanism I. The second method can obtain the advantageous that the cocking operation of the specified mechanisms can be certainly executed.

Though the embodiment with respect to FIG. 8 to which the second method is applied is explained, the concrete embodiment as described later to which the first method is applied will be explained.

The motor M has been stopped rotating at the end position of the brake section BR2 in the section [A]. Then, the motor M is driven for rotation in the reverse direction by the control circuit to wind the film. By the rotation of the motor M in the reverse direction, the one-way clutch X is in the nontransmission state and the indexing mechanism I stops while maintaining the section [A]. On the other hand, the transmission mechanism Sa is constructed so as to be capable of connecting with the load system in the section [A]. Then, by the rotation of the motor M in the reverse direction, the transmission mechanism Sa is connected with the load system A1 to wind the film by the rotary power of the motor M in the reverse direction.

In the arrangement shown in FIG. 7, since the film winding operation and the film rewinding operation can be executed independent of the other loads, the amount for winding or rewinding the film is not limited, the winding or rewinding amount of the film and the stop position of the film can be freely controlled. That is, for example, after temporary stop operation, the film can be wound or rewound again. In the description described later, the winding or rewinding amount of the film is detected by other means, and the rotation of the motor M is controlled to control the film winding or rewinding amount by a signal indicated the result of the detection which is outputted from the other means. However, by the use of a sprocket or a mechanism having a cam which rotates in one revolution by one frame film winding and a cam stopper for stopping the rotation of the cam in every one revolution, the amount can be controlled.

On the other hand, when a specified amount of the film has been transported by the rotation of the motor M in the reverse direction, the motor M is stopped rotating. After that, the motor M is driven for rotation in the normal direction to be ready for the next release operation by the control circuit, whereby the transmission mechanism Sa removes from the load system A1 and the film winding operation stops while maintaining in the state. At the same time, the indexing mechanism I rotates clockwise to transfer to the next section [B]. Then, since the switch $S_{LOAD}$ is turned off, the control circuit can detect that the indexing mechanism I enters the section [B] and thus inputs the stop instruction into the motor M. Thus, the indexing mechanism I passes through the brake section BR4 and stops at the original release waiting point K.

When a film rewinding instruction is inputted into the control circuit from the outside of the mechanism at the waiting point K in the section [B], the motor M starts to rotate in the reverse direction. In this case, the indexing mechanism I stops while be maintained in the section [B] by the one-way clutch X. The transmission mechanism Sb becomes in the state connecting with the load system B1 by the rotation of the motor M in the reverse direction and the rotary power of the motor M in the reverse direction is transmitted to the load system B1 to rewind the film. Then, it is detected by a film transporting amount detection means etc. described later that rewinding of the film completes, and thus the motor M stops.

When the film is tensed at the end thereof in normally winding of the film in the section [A] after the last frame of the film is transported, the motor M is forced to stop rotating in the reverse direction. Therefore, a specified signal for detecting the transport of the film or a one frame film transport detection signal is not inputted into the circuit. In this case, it is preferable to provide with a buffer for preventing the driving mechanisms from overloading.

After the above operation, the circuit detects the end of the film and after the motor M stops, the motor M is driven for rotation in the normal direction to separate the transmission mechanism Sa from a film winding system. Thus, the indexing mechanism I rotates clockwise to reach the section [B] and to stop the motor M again. Then, since the circuit has already detected that the last frame of the film is transported, a reverse instruction is inputted into the motor M under the instruction of the circuit. After that, the film is rewound in the same manner as the rewinding operation by outside instruction described above.

After the film has been rewound, the motor M continuously rotates in the normal direction so that the indexing mechanism I is advanced clockwise from the section [B] to set in the section [A] and then the motor M stops rotating, before the user sets a new film into the camera body. When the user sets the new film into the camera body and closes a camera back lid (not shown), the motor M is driven for rotation in the reverse direction by the control circuit so that the transmission mechanism Sa connects with the load system A1 to wind the film, causing to execute an initial loading operation. Thereby, when first frame of the film is set to a specified position, the motor M stops rotating in the reverse direction. Then, when it is detected that the initial loading operation is completely executed, the motor M is driven for rotation in the normal direction to remove the indexing mechanism I from the section [A] and to stop at the point K in the section [B]. Thus, a preparation operation for photographing with respect to the first frame of the film completes, resulting in waiting for the release operation by the user. If the film transporting signal has not been inputted into the circuit during a specified period in the initial loading operation, the circuit judges that the initial loading operation has been failed. Then, the motor M is stopped to wait for an opening operation of the back lid by the user. According to this arrangement, a re-starting operation for the next initial loading operation can be effectively executed.

Figure 26:
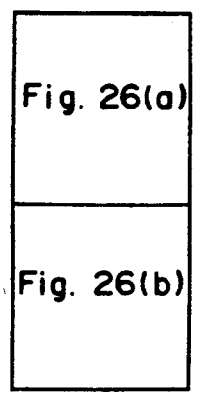
FIG. 26 (*a* and *b*) is a flow chart of a modified embodiment of the present invention.
Figure 26A:
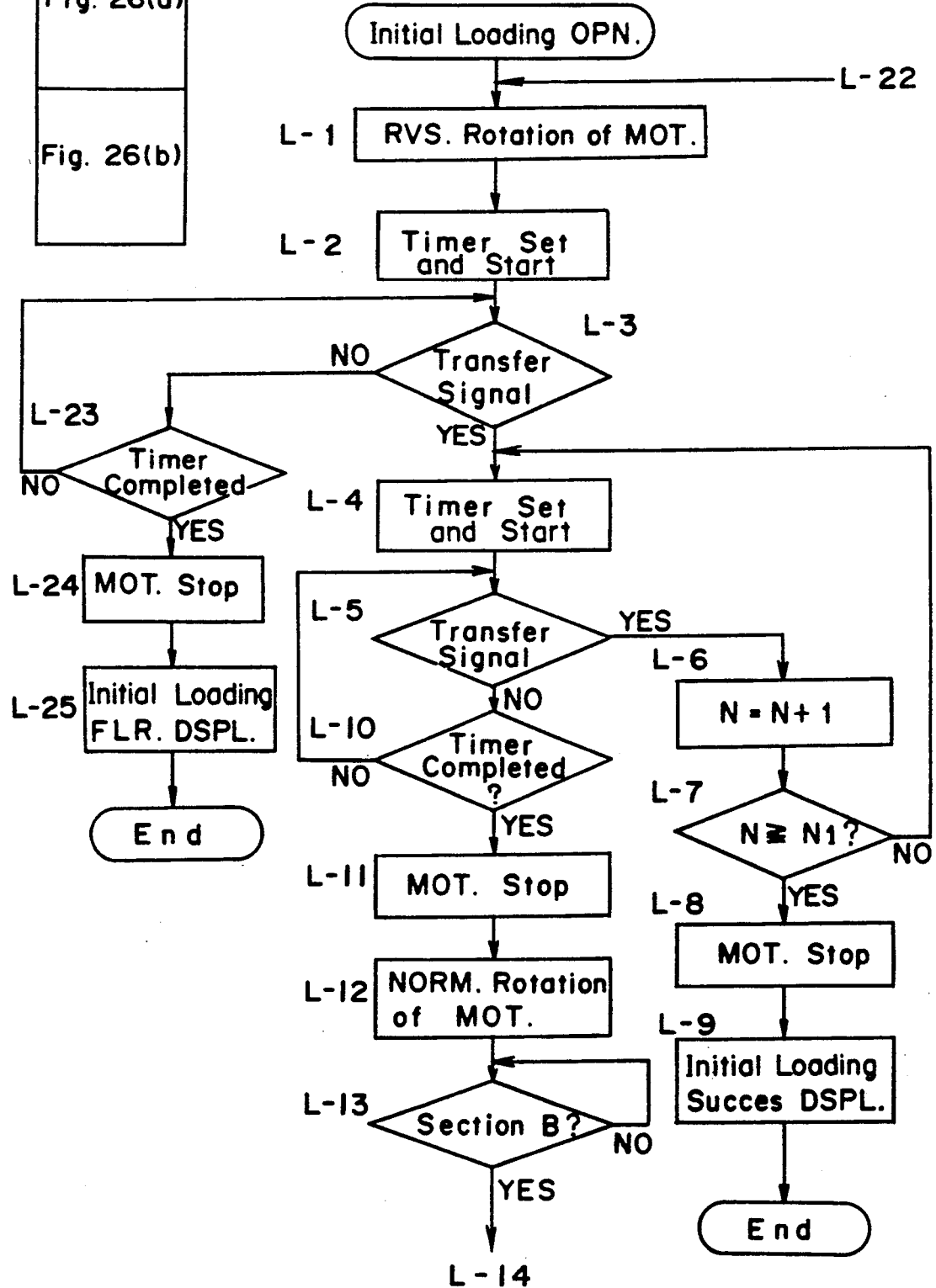
Figure 26B:
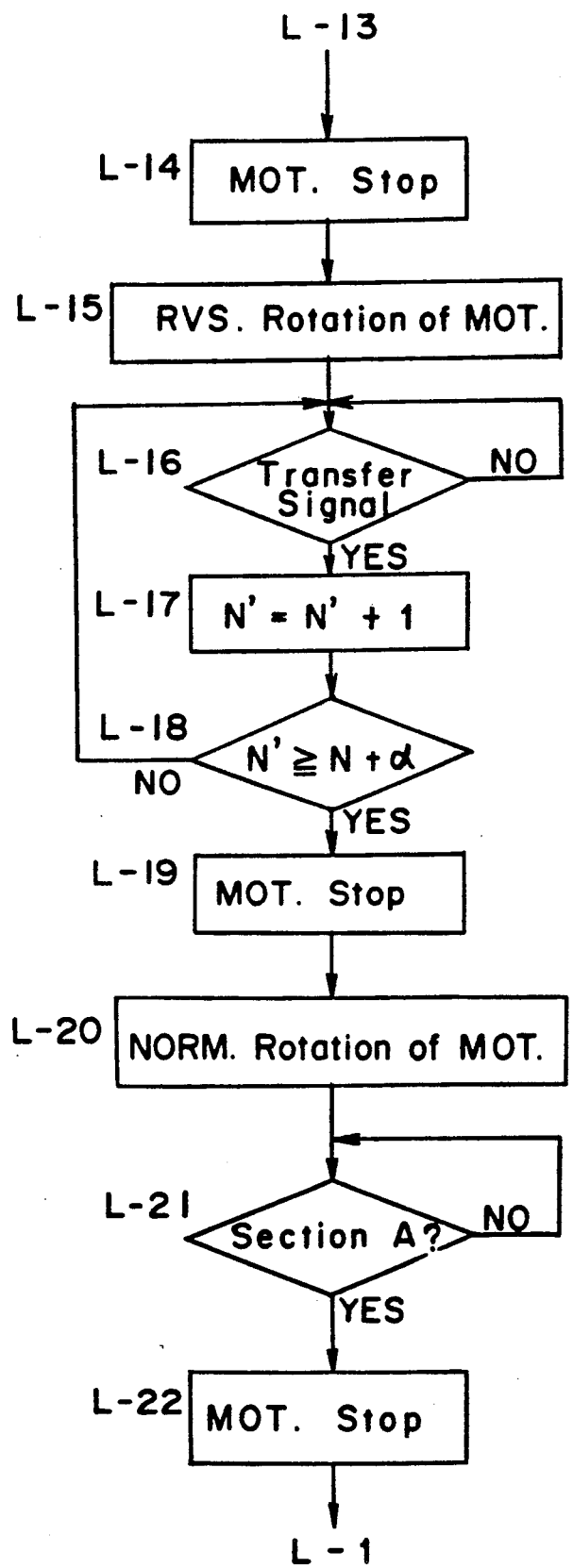

Since the film winding operation and the film rewinding operation can be freely and independently executed in the embodiment, when the initial loading operation has been failed, as shown in FIG. 26, after a specified amount of the film is rewound, or the film is rewound at a specified period or to a specified position, the film winding operation can be executed to attempt to execute the initial loading operation again. Hereinbelow, one example of such an operation is explained.

In FIG. 26, as step L-1, first, the motor is driven for rotation in the reverse direction corresponding to the start operation of the initial loading operation to execute the film winding operation. When a signal for detecting the film transportation, for example, a signal outputted from the sprocket following the film, has not been detected in a specified period of time at steps L-2, L-3, and L-23, the motor is stopped as step L-24 to display the initial loading failure at step L-25. At step L-3, when the signal has been detected in the period of time, the timer is reset at step L-4, the motor continuously rotates until the number N of the signal reaches a value over a specified value $N_1$, that is, the first frame of the film is transported to a position capable of confronting the image plane of the camera at steps L-3, L-4, L-5, L-6, and L-7. Thereafter, the motor is stopped at step L-8 before the initial loading success is displayed at step L-9. When the number N of the signal has not reached the value $N_1$ in a specified period of time at steps L-4, L-5, and L-10, the motor is stopped at step L-11 before the motor is driven for rotation in the normal direction to move the indexing mechanism I to the section [B], and then the motor is stopped at steps L-13 and L-14. After that, the motor is driven for rotation in the reverse direction to rewind the film at steps L-15, L-16, L-17, L-18, and L-19. After the number N of the signal has been counted a value N', which is slightly larger than the value N counted at steps L-4 - L-7 by a value $a$, in the operation at these steps L-16 - L-19, the motor is stopped. Then, after the motor is driven for rotation in the normal direction until the indexing mechanism I moves to the section [A], the motor is stopped at steps L-20, L-21, and L-22. Then, the program returns at step L-1, and the motor is driven for rotation in the reverse direction to execute the initial loading operation again.

Thereby, the tip end of the film leader of the film can be generally positioned at a position different from that set by the user or a position specified in the camera body. Thus, the possibility for catching the tip end of the film leader of the film is improved, resulting in success of the initial loading operation.

Figure 27:
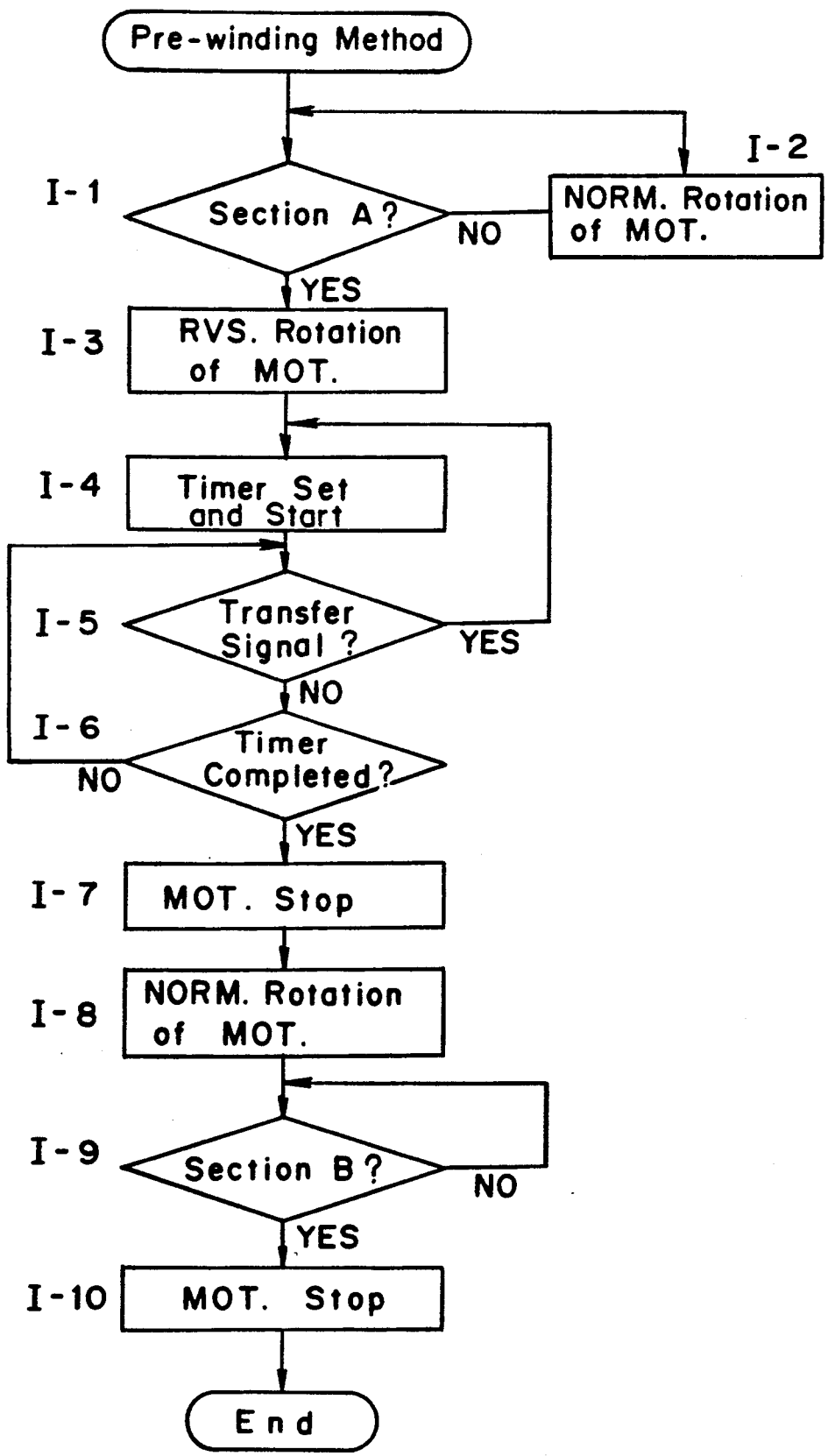
FIGS. 27 and 28 are flow charts of further modified embodiments of the present invention, respectively.
Figure 28:
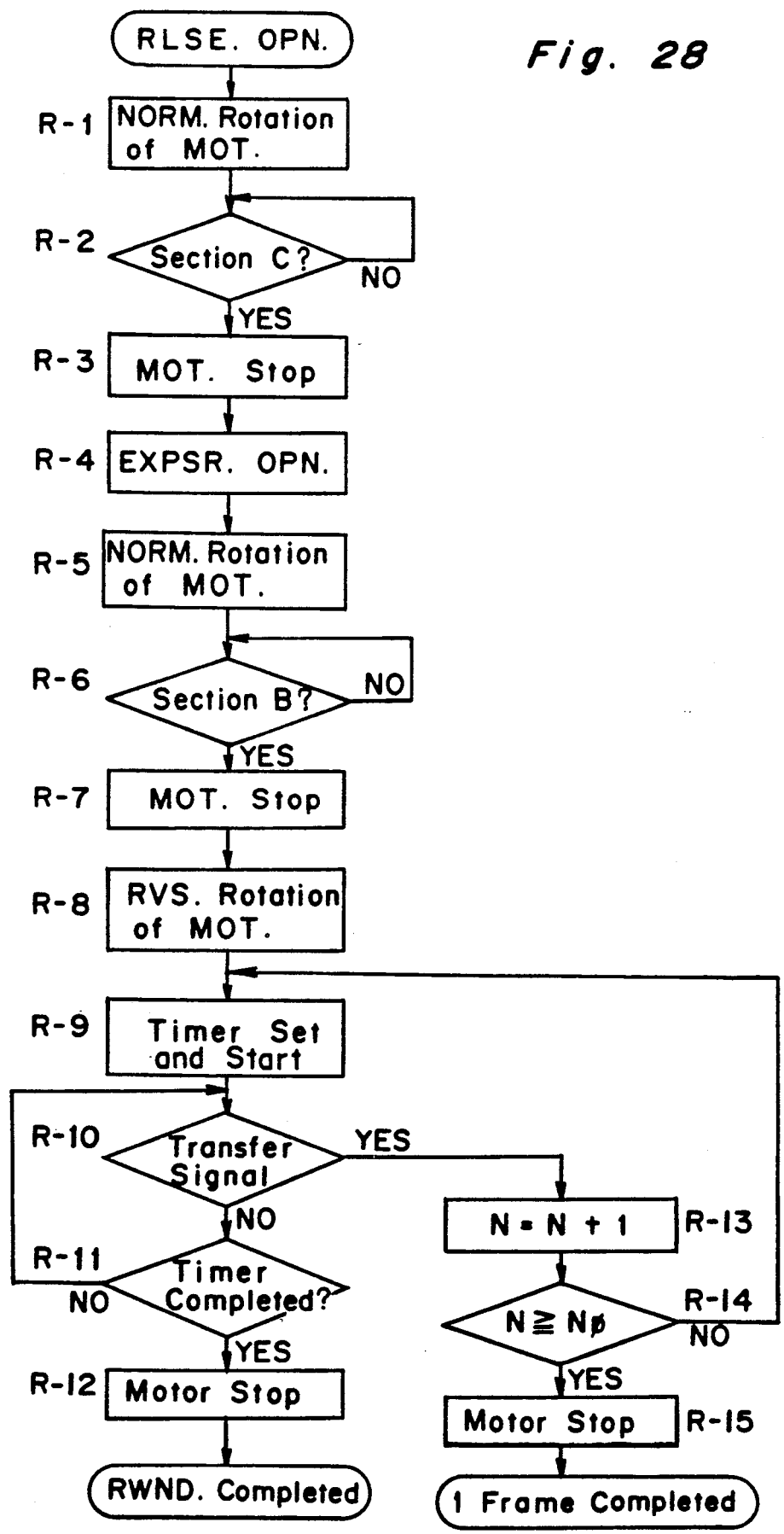
Figure 29:
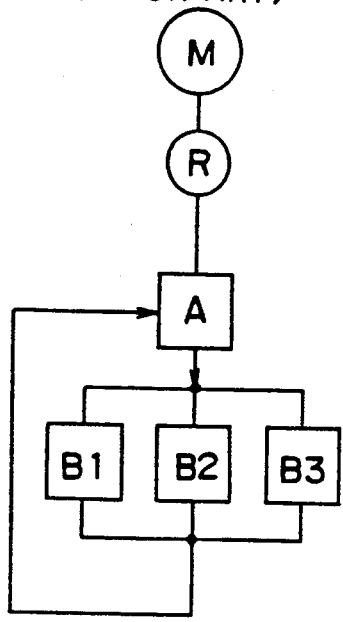
FIGS. 29, 30, and 31 are, respectively, views showing conventional different mechanisms.
Figure 30:
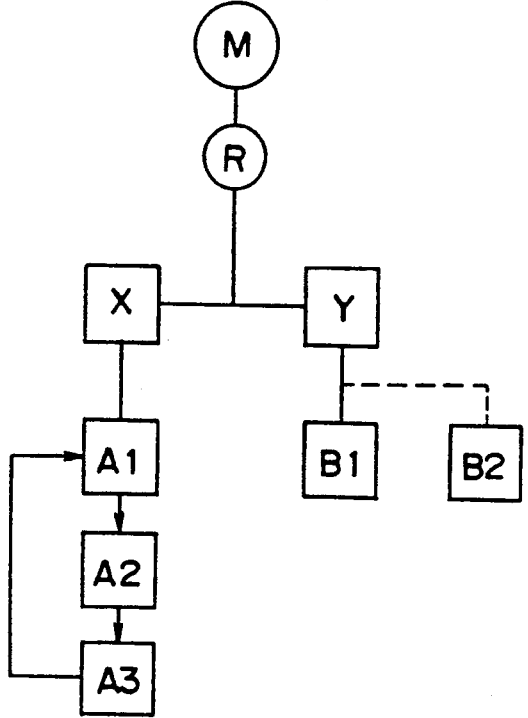
Figure 31:
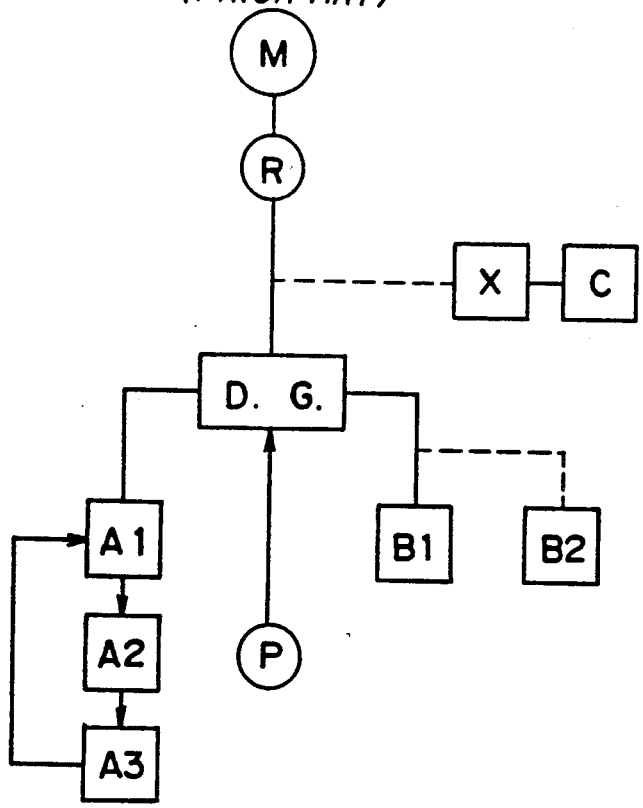

Furthermore, since the film winding operation and the film rewinding operation can be freely and independently executed in the embodiment, the camera can be so constructed that the initial loading operation is continuously executed as shown in FIGS. 27 and 28, and after the film is completely wound by a spool etc. in the section [A], a photographing operation is executed while each one frame of the film is rewound from the spool to a film cartridge in the section [B]. Then, consequentially, the tip end of the film is rewound in the cartridge. Such a method, namely, film pre-winding method, can be easily executed in the embodiment.

One example of the method shows in FIGS. 27 and 28. In FIGS. 27 and 28, first, it is detected whether or not the indexing mechanism I is held in the section [A] on the basis of the start of the pre-winding operation in the pre-winding method. When the indexing mechanism I has not been in the section [A], first, the motor M is driven for rotation in the normal direction to move the mechanism I to the section [A] at steps I-1 and I-2. When the mechanism I has been in the section [A], or after the mechanism I has moved thereto by the rotation, the motor M is driven for rotation in the reverse direction to execute the film winding operation at step I-3. The operation at steps I-1–I-3 is the same as the initial loading operation described above. Then, the initial loading operation is executed. When the film is tensed after all of the film has been wound, for example, it can be detected by the fact that the signal for detecting the film transportation has not been detected in a specified period of time at steps I-4, I-5, and I-6, the motor M is stopped at step I-7. Then, the motor M is driven for rotation in the normal direction until the indexing mechanism I moves to the section [B] at step I-8, before the motor M is stopped at steps I-9 and I-10. These operations at steps I-4 - I-10 are the same as the film winding operation and the operation to be executed when the end of the film has been detected as described above, excepting for stopping the film at every one frame. Next, the release operation in the pre-winding method is executed as described below. When a release button (not shown) is depressed, the motor is driven for rotation in the normal direction while the indexing mechanism I moves from the section [B] to the section [C]. Then, the release operation described previously is executed at steps R-1, R-2, R-3, and R-4 in FIG. 28. After the exposure operation to the film has been completed, the motor starts rotating in the normal direction. The motor continuously rotates in the normal direction until the indexing mechanism I reaches the section [B] to execute the cocking operation of the mechanisms such as the shutter at steps R-5, R-6, and R-7. The motor is driven for rotation in the reverse direction in the section [B], so that the film is rewound by the one frame thereof while counting the signal for detecting the film transportation at steps R-8, R-9, R-10, R-13, and R-14. After that, the motor is stopped at step R-15. When the signal is not outputted after all of the film has been rewound, the motor is stopped at steps R-9, R-10, R-11, and R-12. That is, the operation corresponds to the operation replacing the film winding operation with the film rewinding operation.

In any embodiment, if the indexing mechanism I passes through the section [A] or [B] by the rotation of the motor M in the normal direction without stop in the section, the indexing mechanism I can be set to the section for the release operation or the cocking operation entirely without transporting the film. Therefore, a multiple exposure operation can be easily executed.

Figure 9:
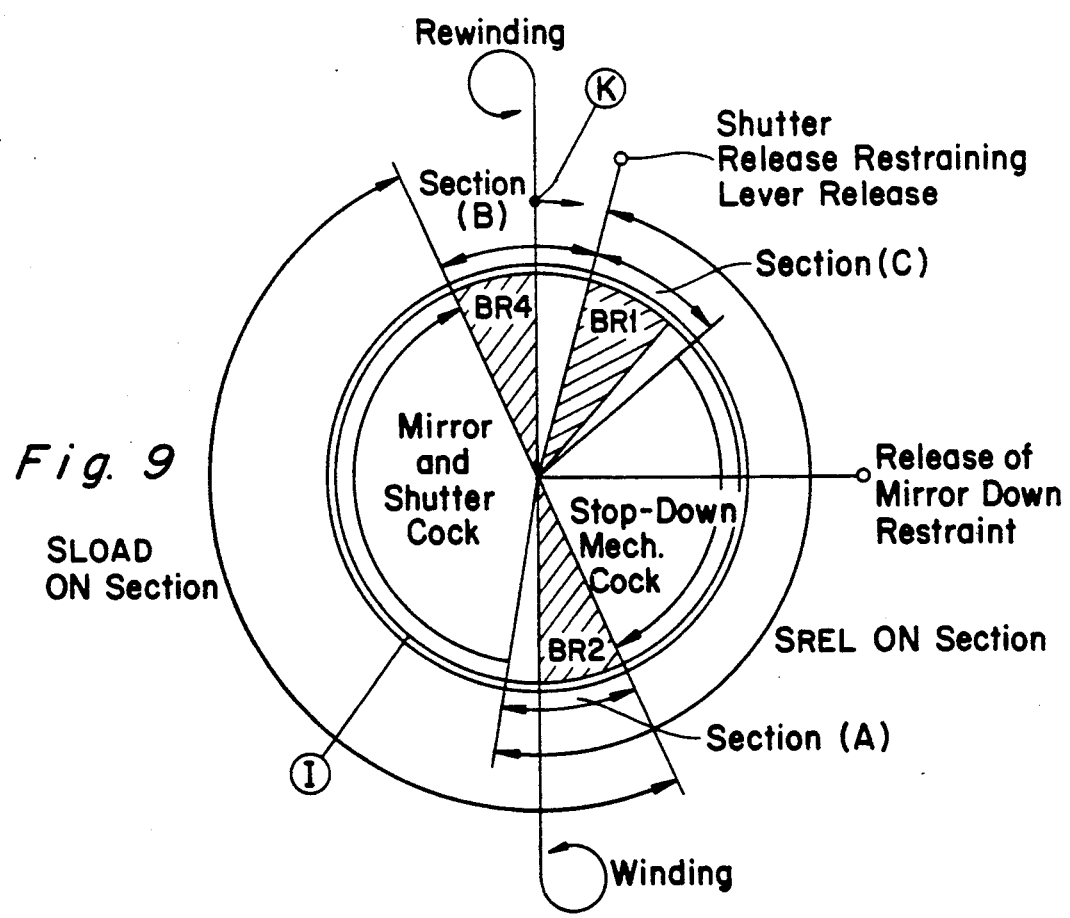
FIG. 9 is an explanatory view of another indexing mechanism according to the embodiment shown in FIG. 8.

FIG. 9 shows another embodiment with respect to the indexing mechanism I shown in FIG. 7. This arrangement is suitable for employing the motor M with a small outputted power.

In this embodiment, the motor M is driven for rotation in the normal direction by a control circuit (not shown) according to the release operation by the user and the indexing mechanism I is driven for clockwise rotation from the point K to release the shutter release restraining lever, causing the indexing mechanism I to enter the section [C]. Then, the switch $S_{REL}$ is turned on and the motor M stops at an end point in the brake section BR1 under the brake instruction outputted from the circuit. On the other hand, the serial release operation is executed to expose the object image onto the film. After completion of the exposure operation, the motor M starts to rotate in the normal direction again and the indexing mechanism I enters the section for cocking the aperture diaphragm stop-down mechanism, so that the stop-down mechanism is returned to the original position and simultaneously is cocked. Then, during this operation, a restraining mechanism for the mirror system is released to return the mirror to the original position by a spring. The switch $S_{LOAD}$ is turned on at a time when the stop-down mechanism cocking operation has completed, and after the circuit detects by detection of turning-on of both of the switch $S_{LOAD}$ and the switch $S_{REL}$ that the indexing mechanism I enters the section [A], the motor M is stopped rotating in the normal direction.

If the motor M is driven for rotation in the reverse direction to wind the one frame of the film, the transmission mechanism Sa connects with the load system A1, thereby to transmit the driving force outputted from the motor M to the system A1, thereby winding the film. Then, the indexing mechanism I stops while be maintained in the section [A] by the one-way clutch X. After completion of transport of a specified amount of the film, the motor M stops rotating in the reverse direction and then is driven in the normal direction. Then, the transmission mechanism Sa removes from the load system [A], the mechanism I starts rotating clockwise again to remove from the section [A] and enters the process for cocking the mirror and the shutter. Then, by turning-off of the switch $S_{REL}$, the circuit detects that the indexing mechanism I enters the process for cocking the mirror and the shutter. After the mirror and the shutter have been cocked, the switch $S_{LOAD}$ is turned off, and thus the circuit detects that the indexing mechanism I enters the section [B]. Then, the motor M is stopped rotating in the normal direction. Thus, the motor M stops at the end position in the brake section BR4. Since the other operation is similar to that shown in FIG. 8, the description thererof will be omitted.

According to the above embodiment, it is constructed so that the rotary power of the motor M is transmitted to only the load system for returning and cocking the aperture diaphragm stop-down mechanism after a film exposure operation has been executed. Therefore, even if the outputted power of the motor M is smaller comparing with the system shown in FIG. 8, the aperture does not open or close slowly and thus it prevents the user from feeling strange. Though the restraint for preventing the mirror downward movement is released in stop-down mechanism return process in FIG. 9, the stop-down mechanism and the shutter can be cocked after the mirror moves downwardly by the motor M and the restraint of the stop-down mechanism is released to return by a spring to an original position, or the shutter can be cocked after the mirror and the stop-down mechanism return to the original positions by the motor while cocking.

Since the film transporting operation can be freely executed by the construction shown in FIG. 9 as well as that in FIG. 8, the re-starting operation of the initial loading operation, the film pre-winding method and the multiple exposure operation can be executed in the same manner as that in FIG. 8.

As described above, since many functions can be independently performed by the single construction comparing with the motor driving system in the conventional single-lens reflex camera, it can be manufactured smaller and more simple in construction as a whole, resulting in very effective.

The embodiments according to the embodiments applied to the single-lens reflex camera is not limited to the embodiments shown in FIGS. 7 and 8; as described above after FIG. 1, if more plural loads such as a focusing operation for a lens, a zooming operation for a lens, a projecting-retreating movement operation of an electronic flash, or a stop-down and opening and returning operation of an aperture diaphragm stop-down mechanism can be arranged at another sections therefor in the indexing mechanism I, so that selecting means corresponding to each load are arranged, thereby easily driving the loads.

Though the release operation of the camera is executed by the motor M in the arrangement shown in FIGS. 7, 8, and 9, it can be executed by a known means such as means using a magnetic force.

Next, a concrete embodiment applied to a single-lens reflex camera shown in FIGS. 7 and 8 will be explained in detail.

Figure 10A:
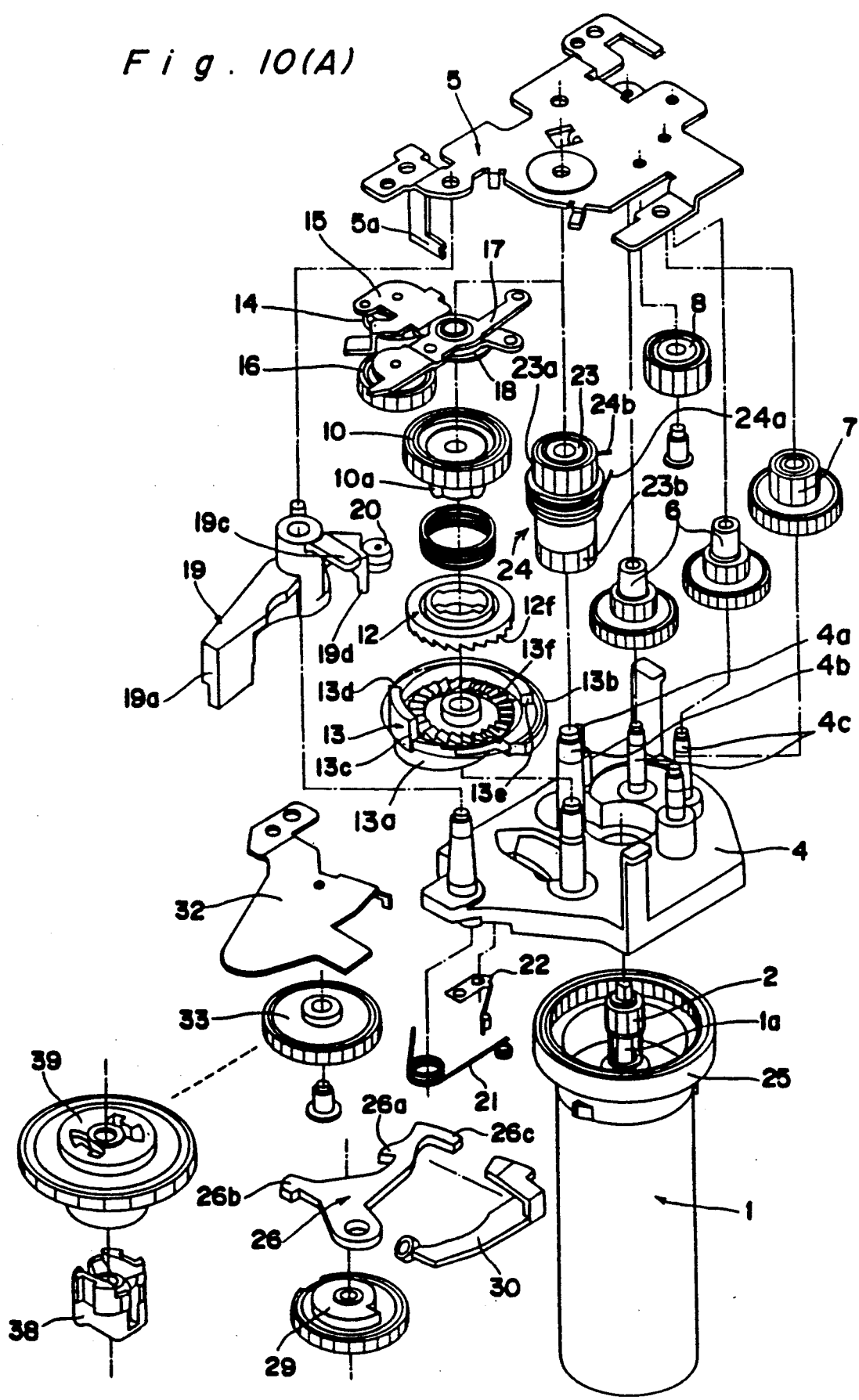
FIG. 10 (A) is an exploded perspective view of a friction mechanism according to another embodiment of the present invention which is applied to a winding and cocking mechanism of a camera.
Figure 10B:
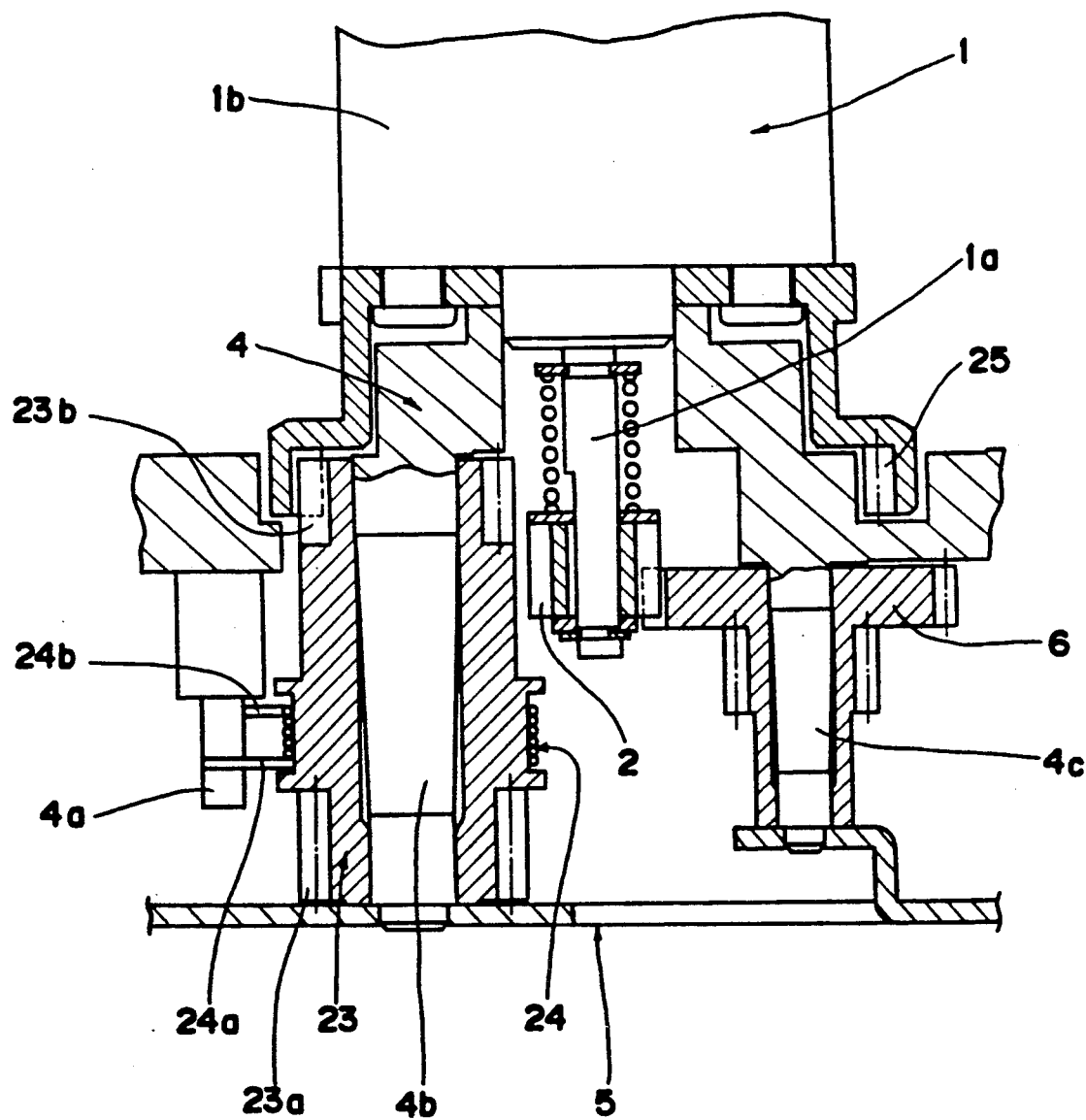
Figure 10C:
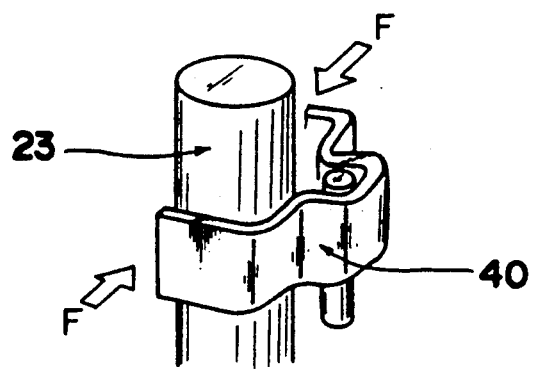
Figure 32:
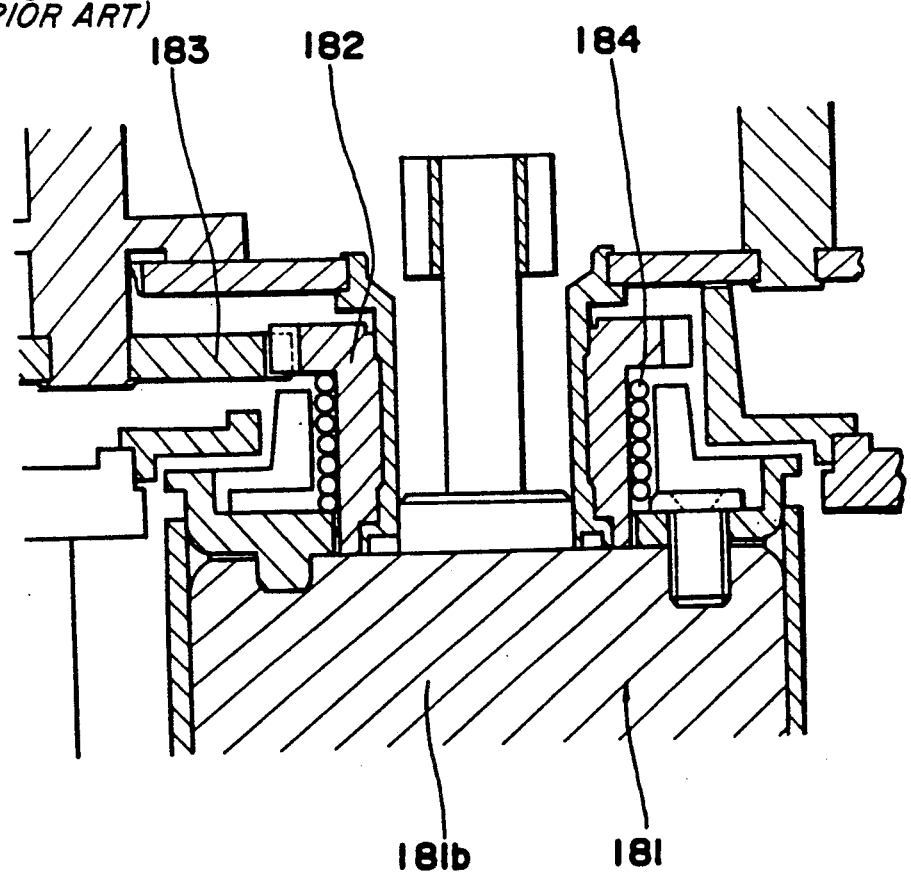
FIG. 32 is a view showing another conventional mechanism.

FIG. 10 (A) shows a winding and cocking mechanism according to the concrete embodiment.

A driving motor 1 for winding a film and cocking a mirror, a shutter, etc. has a motor gear 2 on its axis 1a through a known friction mechanism so that the transmission between the motor axis 1a and the motor gear 2 is released when overloads are applied to the motor gear 2.

In this embodiment, a spool gear 25 is fixed to the inner circumferential surface of the casing 1b, and thus the film is wound by the outer cylindrical casing 1b, functioning as a spool, of the motor 1. However, it can be constructed so that the casing 1b of the motor 1 is fixed to the other member and a spool gear rotates with a spool member around the casing 1b on the outer surface thereof. The motor gear 2 engages with one of reduction gears 6 rotatably supported by a gear support plate 4, respectively. The rotary speed of the motor 1 is reduced through the reduction gears 6 and a gear 7 and is transmitted through an idle gear 8 rotatably supported by a winding bed plate 5 to an input gear 10 for performing a specified operation in one rotation thereof.

A key portion 10a is constructed at the lower portion of the input gear 10. A torque outputted from the motor 1 is transmitted to a one-way clutch 12 engaging with the key portion 10a which is capable of going up and down.

The one-way clutch 12 and a cam gear 13 for performing a specified operation in one rotation have plural inclined surfaces 12f, 13f, respectively. Thus, the rotary torque of the input gear 10 is transmitted from the the one-way clutch 12 to the cam gear 13 when the input gear 10 rotates in a release and cocking direction, namely, when the motor 1 rotates in an normal direction. The torque is not transmitted from the one-way clutch 12 to the cam gear 13 when the input gear 10 rotates a film winding and rewinding direction, namely, the motor rotates in the reverse direction.

The input gear 10 engages with planetary gears 14 and 16. The planetary gears 14 and 16 are rotatably supported by planetary carriers 15 and 17 through a known friction mechanism.

The planetary carrier 17 is fixed to a carrier bearing 18, but the planetary carrier 15 is rotatably arranged on the bearing 18. Then, the planetary carriers 15 and 17 are arranged to be relatively capable of rotating.

Each of the planetary carriers 15 and 17 has projections at portions where are located on both sides of the rotary center and on the side confronting the winding bed plate 5. Then, the projections contact with the plate 5 to prevent from inclining the carriers 15 and 17 in rotating around an axis of the bearing 18.

When the carrier 15 rotates around the axis of the bearing 18, the planetary gear 14 brings into engagement with a spool driving gear 23. The spool driving gear 23 engages with the spool gear 25, and thus the film winding spool rotates to wind the film.

Therefore, when the input gear 10 rotates clockwise, the planetary carrier 15 also rotates clockwise so that the planetary gear 14 supported by the planetary carrier 15 brings into engagement with the spool driving gear 23.

The spool driving gear 23 engaged with the spool gear 25 is rotatably supported by a support axis 4b of the gear support plate 4. As shown in FIG. 10 (B), the spool driving gear 23 has a first gear 23b engaging with the spool gear 25 on the outer circumferential surface of the upper end thereof of FIG. 10 (B) and a second gear 23a capable of engaging with the planetary gear 14 on the outer circumferential surface of the lower end thereof. Each bottom face of the first and second gears 23b and 23a is positioned on the inside of the outer circumferential surface of the middle portion of the gear 23 in a radial direction thereof to make the gears 23b and 23a have a rigidity. A friction spring 24 is wound around the outer circumferential surface of the middle of the spool driving gear 23. Then, both ends 24a and 24b of the spring 24 each engage with a projection 4a of the gear support plate 4 to act a friction torque, which is larger than a loose torque for eliminating the looseness of the film wound around the spool 1b, on the middle portion by the spring 24. In this embodiment, since the friction torque is acted on the spool driving gear 23 arranged on the "speed up" side with respect to the spool 1b to prevent the film from loosing, the small friction torque is acted on the spool driving gear 23 to obtain a large friction torque on the spool 1b as that in a conventional case where a friction torque is directly acted on a spool itself.

On the other hand, when the planetary carrier 17 rotates around the axis of the bearing 18, the planetary gear 16 engages with a rewinding gear 33. Then, a rewinding system is driven for rotation so as to rotate a rewinding fork gear 39 in a rewinding direction. A rewinding fork 38 is attached to the fork gear 39 so as to be capable of moving upwardly and downwardly. When the fork 38 engages with a film cartridge axis (not shown), the cartridge axis rotates to wind the film into the cartridge.

The cam gear 13 comprises a cocking cam portion 13a (referred to FIG. 11) for moving a mirror cocking lever 31 for cocking a mirror system, a cutout gear portion 13b (referred to FIG. 14) for moving an aperture diaphragm stopdown cocking gear 29 for cocking an aperture diaphragm stopdown system, a release cam portion 13c (referred to FIG. 13) for moving a restraining lever 26 for releasing the restraint of the aperture diaphragm stop-down system and the mirror system, and a reset cam portion 13d (referred to FIG. 14) for driving an aperture diaphragm reset lever 30 for switching between an operable state and a cocking enable state of the aperture diaphragm stop-down system.

Figure 15:
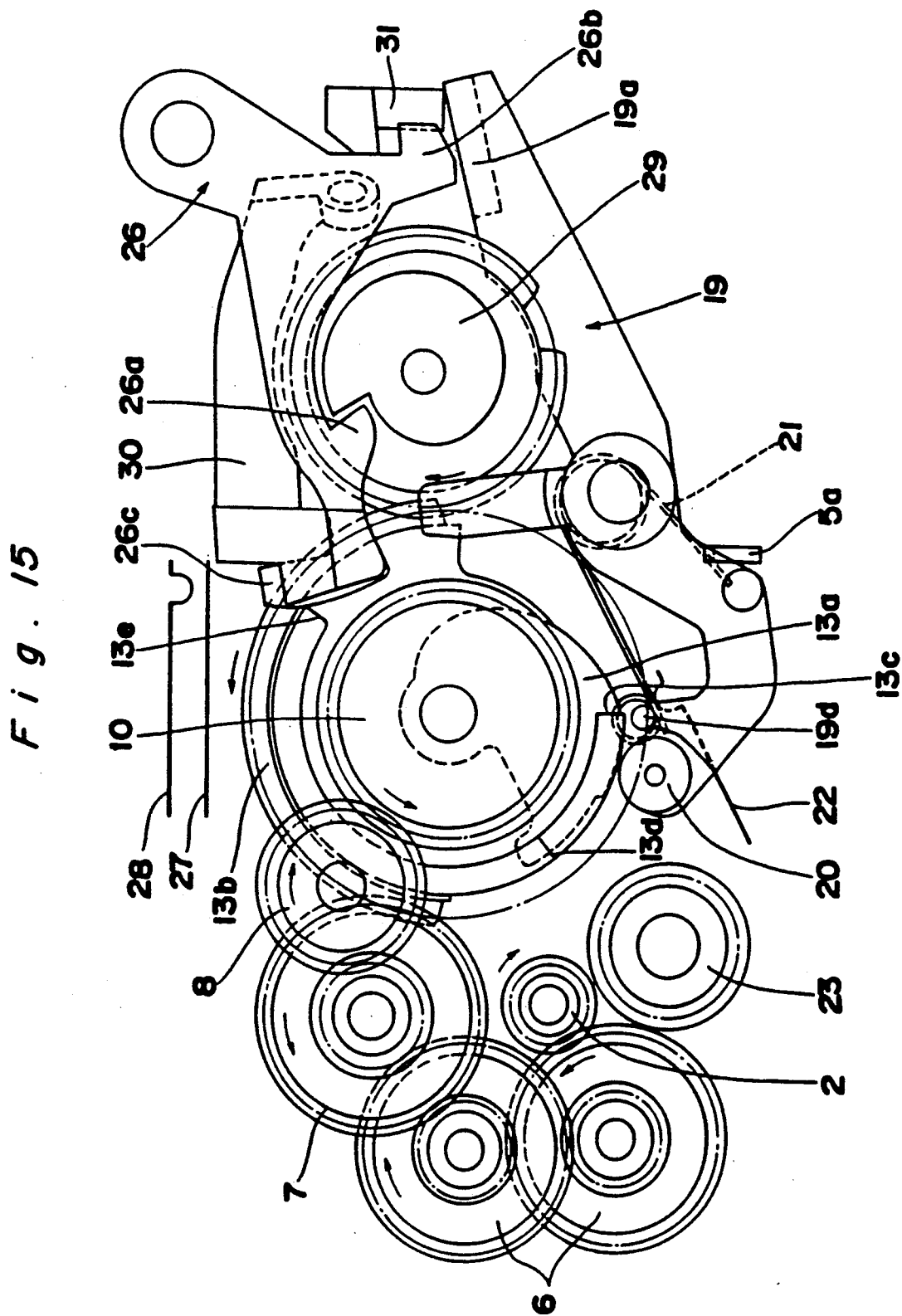

A return spring 21 of the cocking lever 19 for cocking the mirror system (not shown) is assembled between a bent portion 5a of the winding bed plate 5 and a pin portion 19d of the cocking lever 19 to urge the lever 19 in a return direction thereof. The winding bed plate 5 is electrically grounded. Then, when the cocking operation has been executed, the one end of the return spring 21 contacts with an armature 22, and thus the armature 22 is electrically connected with the winding bed plate 5 through the spring 21 to be grounded, so that a signal condition of a sequence switch $S_{LOAD}$ is in a low level, as shown in FIG. 15. After the cocking operation has been done, when the cocking lever 19 returns to an original position by the spring 21, the signal condition of the sequence switch $S_{LOAD}$ is in a high level. As describe above, since the sequence switch $S_{LOAD}$ is controlled by movement of the lever 19, the performance of the camera depends on the return speed of the lever 19, that is, a slow return speed of the lever 19 affects a bad influence for the performance. Therefore, the lever 19 is made of high rigid plastic to make for lightweight.

Figure 11:
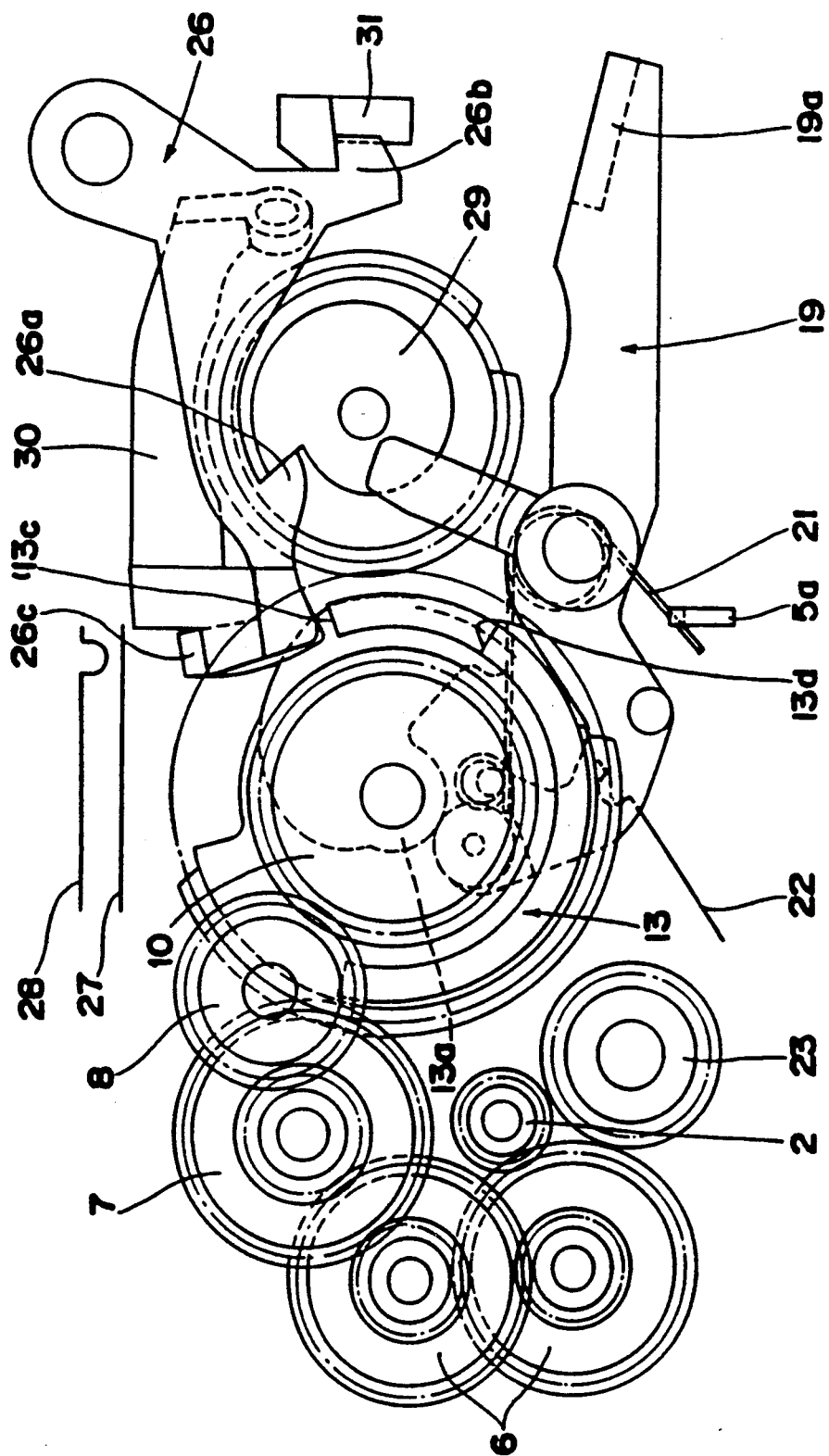
FIG. 11 is a view showing a relation with respect to a position of a cam gear for executing a specified operation in one rotation during a state waiting for a release operation in the embodiment shown in FIG. 10.

FIG. 11 shows a cam position of the cam gear 13 in a state waiting for the release operation.

Figure 12:
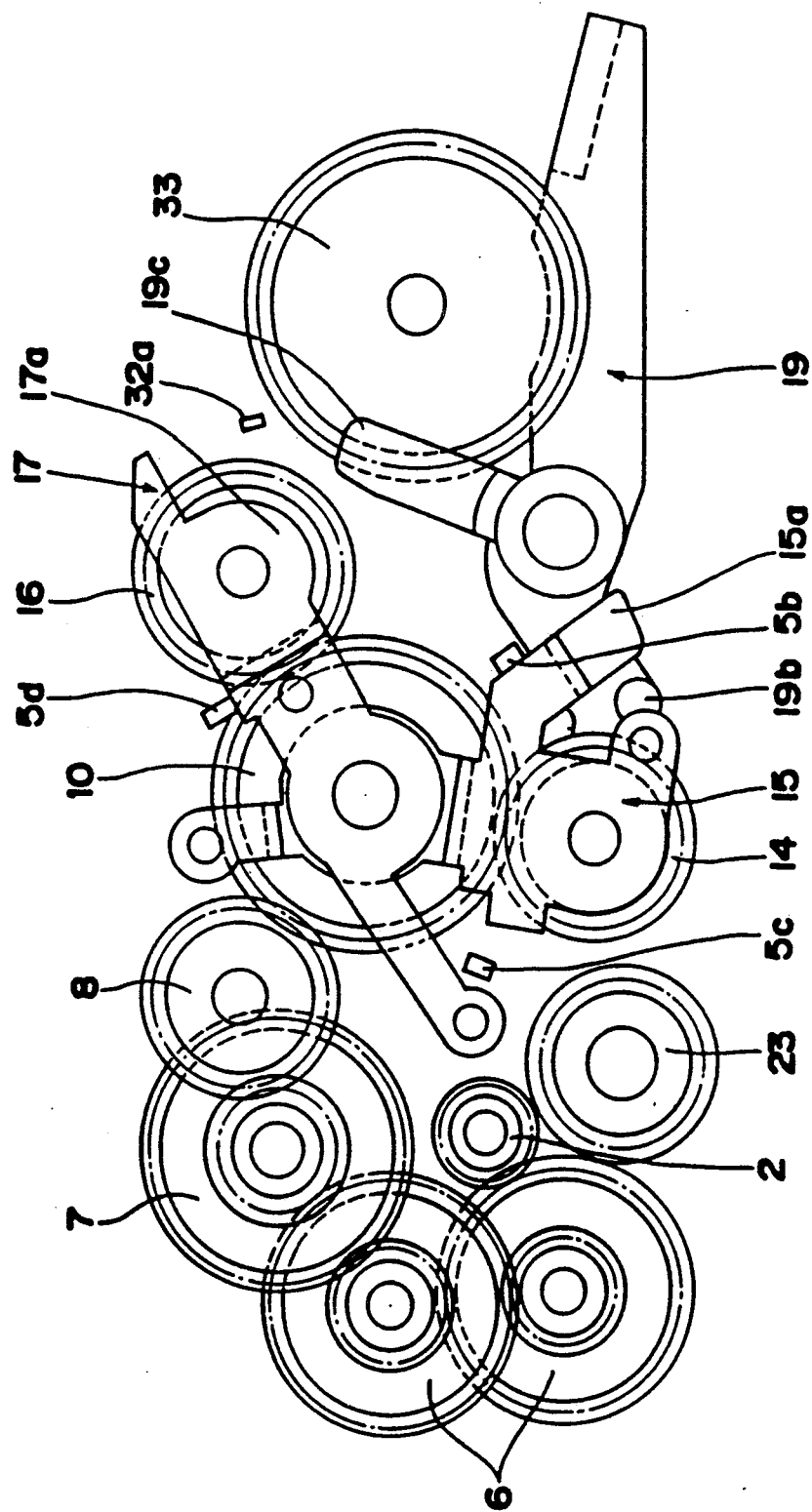
FIG. 12 is a view showing a relation with respect to positions of planetary carriers in the state waiting for the release operation in the embodiment shown in FIG. 10.

FIG. 12 shows positions of the planetary carriers 15 and 17 in the state waiting for the release operation.

Engaging portions 26a and 26b of the restraining lever 26 each engage with the aperture diaphragm stop-down cocking gear 29 and the mirror cocking lever 31 to hold an aperture diaphragm stop-down mechanism (not shown) in an aperture diaphragm opening state and to hold the mirror mechanism at a position capable of observing an object image through a viewfinder system not shown.

The aperture diaphragm reset lever 30 is supported on a bed plate (not shown) rotatably in a plane inclined with respect to the rotation plane of the cam gear 13 so that the lever 30 is elongated with striding over the restraining lever 26 as shown in FIG. 11. Then, by the movement of the lever 30, the aperture diaphragm stop-down mechanism is switched between the operable state, namely, a set state and the cocking enable state, namely, a reset state.

The planetary carrier 15 contacts with a stopper 5b of the winding bed plate 5, the planetary carrier 17 contacts with a stopper 5d thereof, and thus counterclockwise rotation of each of the carriers 15 and 17 around the axis of the bearing 18 is limited by the contact between each carrier and each stopper.

Normal release operation

Figure 18:
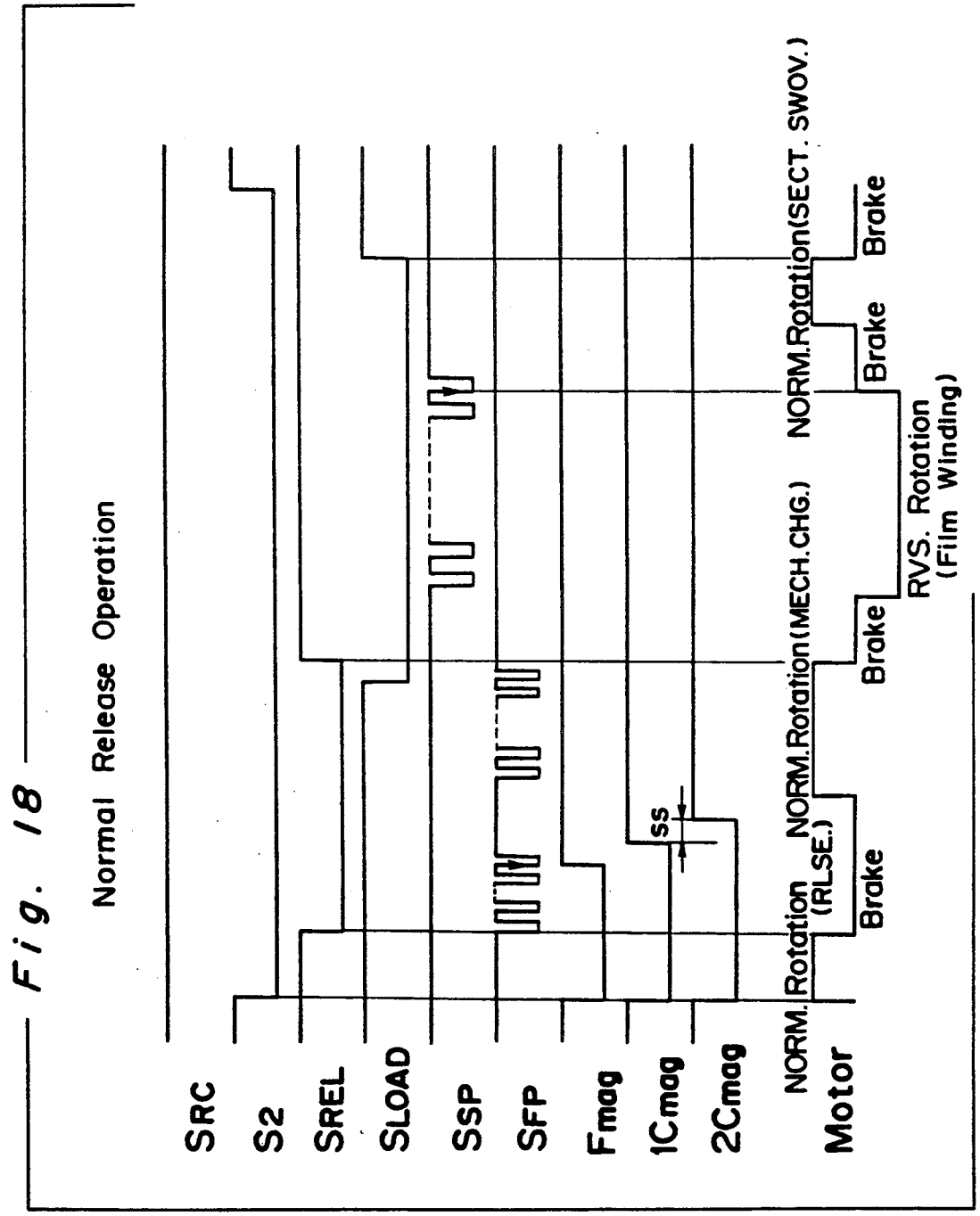
FIG. 18 is a time chart of the camera according to the embodiment in a normal release operation.

FIG. 18 shows a time chart of the camera according to the embodiment in a normal release operation.

Figure 21:
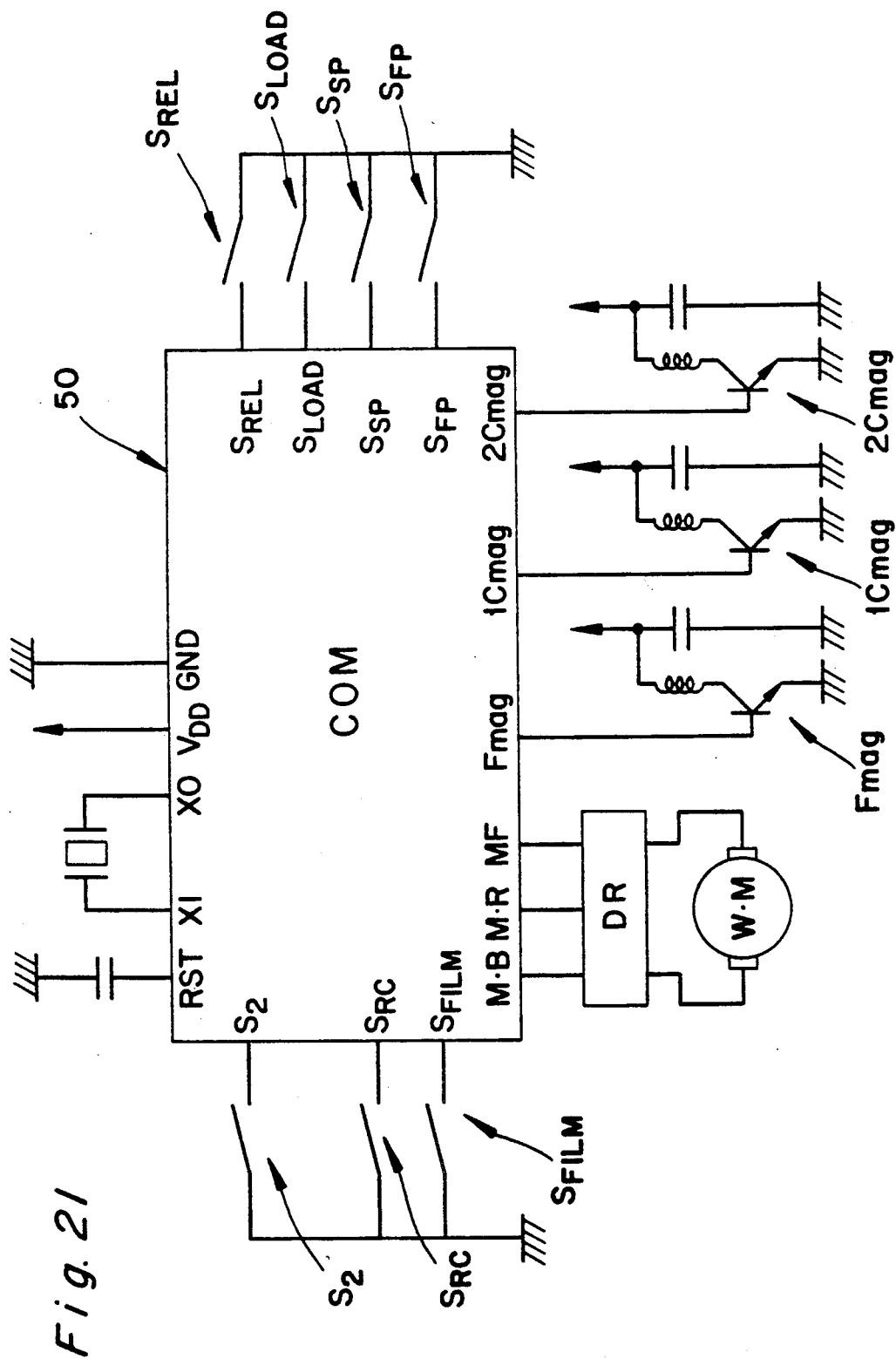
FIG. 21 is a wiring diagram showing a wiring relation among a microcomputer, a motor, and switches.
Figure 22:
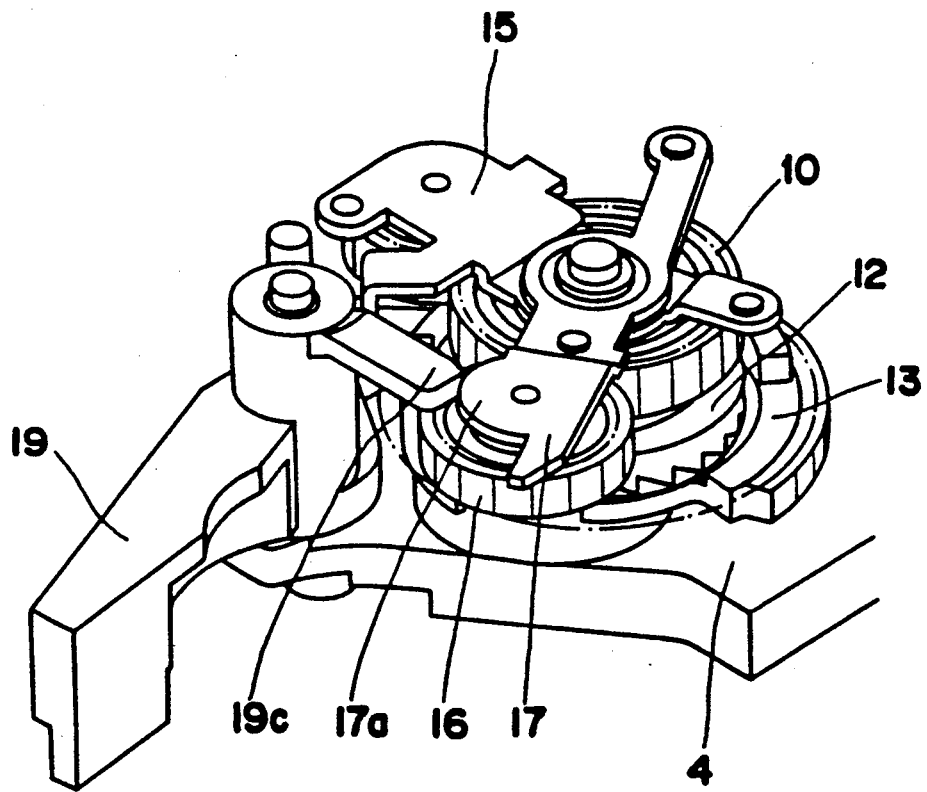
FIG. 22 is an enlarged perspective view showing the assembled friction mechanism shown in FIG. 1.

When a release button (not shown) is depressed, a signal condition of a switch $S_2$ for starting a shutter release operation is in a low level. The switch $S_2$ is connected with an input terminal of a microcomputer 50 as shown in FIG. 21. Then, when the signal condition of the switch $S_2$ is in a low level, a signal for driving for rotation of the motor 1 in the normal direction, namely, clockwise direction, is inputted from the microcomputer 50 into a motor drive device DR. When the motor 1 rotates clockwise, the cam gear 13 rotates counterclockwise in FIG. 13, the restraining lever 26 pivots clockwise by the release cam portion 13c, and thus the engagement between the restraining lever 31 and the aperture diaphragm stop-down cocking gear 29, and the engagement between the restraining lever 31 and the mirror cocking lever 31 are released. At this time, an arm portion 26c of the restraining lever 26 presses an armature 27 of the switch $S_{REL}$ to contact with an armature 28 thereof. Then, the signal condition of the release switch $S_{REL}$ is in a low level and a brake signal for braking the motor 1 is inputted from the microcomputer 50 to the motor drive device DR. Both terminals of the motor 1 are short-circuited each other to make for an electric magnetic brake and thus the motor 1 stops. This operation corresponds to the release operation.

The horizontal rotary power from the aperture diaphragm stop-down cocking gear 29 is converted into the vertical rotary power through a bevel gear (not shown) in the aperture diaphragm stop-down system. The rotary power is transmitted to a rotary driving member for driving the aperture diaphragm on the lens side through engagement between the gears. The aperture diaphragm stop-down system is urged in an aperture stop-down direction by a spring. Then, when the engagement between the aperture diaphragm stop-down cocking gear 29 and the restraining lever 26 is released, gears in a gear train in the aperture diaphragm stop-down system start to rotate in the aperture stop-down direction to rotate the aperture diaphragm stop-down cocking gear 29 counterclockwise. The gear train in the aperture diaphragm stop-down system includes rotary base for a F-number pulse switch $S_{FP}$ to output a pulse signal in proportion to an amount of an aperture stop-down, of the aperture diaphragm of the lens, executed by the aperture diaphragm stop-down driving member.

The gear train in the aperture diaphragm stop-down system includes an stop-down stopping ratchet (not shown) for controlling by any value of the aperture stop-down amount. A stop-down stopping pawl engages with the ratchet to stop the rotation of the gear train in the aperture diaphragm stop-down system. The stopping pawl is normally pressed against a stop-down stopping magnet $F_{mag}$ by the aperture reset lever 30 so as not to move. Then, by the rotation of the cam gear 13 in the release operation, the reset lever 30 is moved by the release cam portion 13c and retreated from the stopping pawl to be capable of engaging the stopping pawl with ratchet. At this time, the stopping pawl is held in a state to be ready for engagement when the magnet $F_{mag}$ is excited, and the stopping pawl engages with the ratchet when the magnet $F_{mag}$ is not excited.

The mirror system comprises a reflecting mirror (not shown) for observing an object in a viewfinder, to be urged in a retreat direction. A cocking member of a shutter mechanism for controlling an exposure to the film is connected with the mirror system. Then, the shutter mechanism can be held in a state where the cocking operation has been done.

Figure 13:
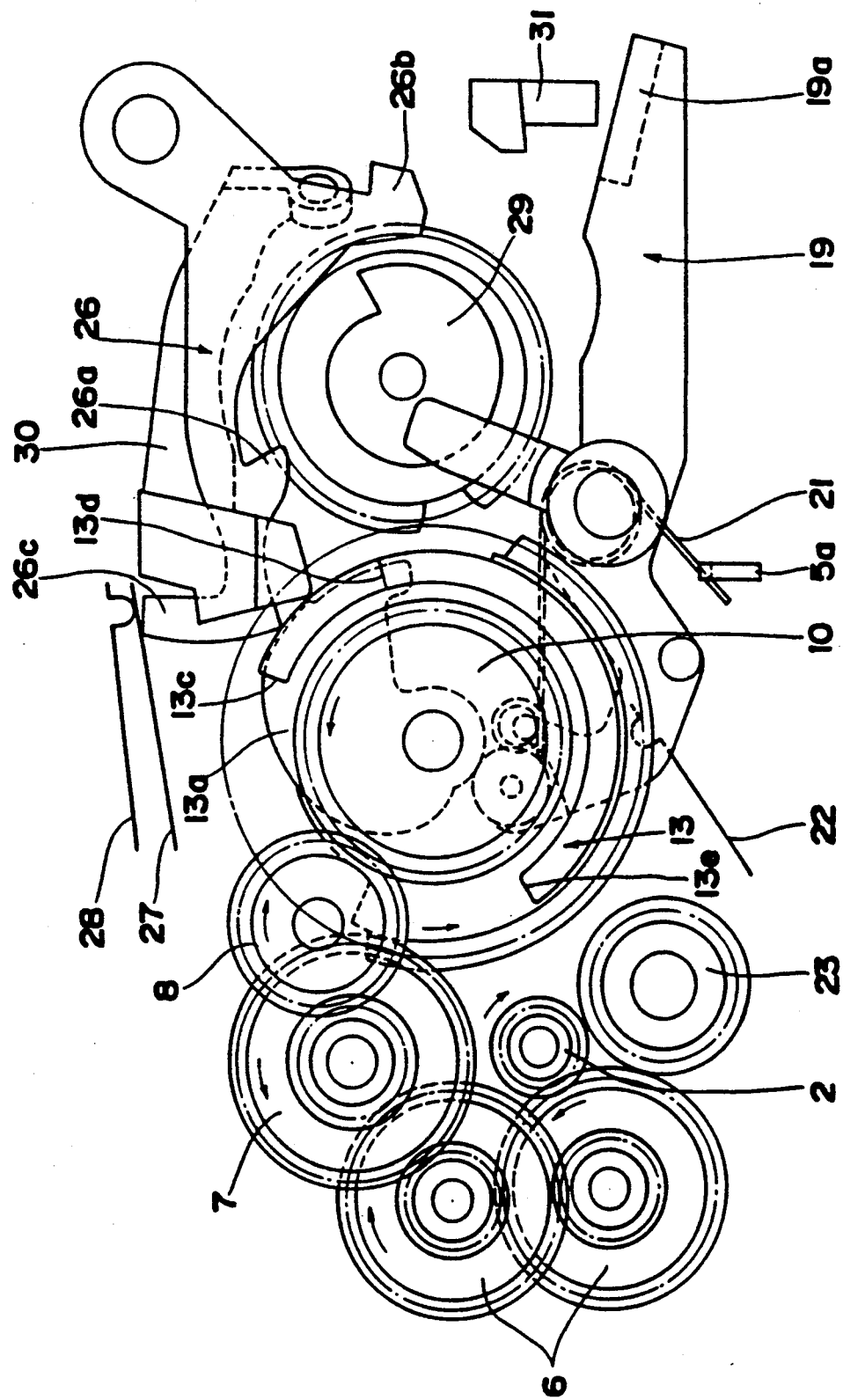
FIGS. 13, 14, and 15 are views showing the cam gear and relations with respect to a position of a cam of the cam gear.

When the engagement between the mirror cocking lever 31 and the restraining lever 26 is released, the mirror cocking lever 31 runs as shown in FIG. 13 and the reflecting mirror retreats. At this time, the hold of the shutter mechanism is released. Then, though the hold of the shutter mechanism is released, if a leading curtain magnet $1C_{mag}$ and a trailing curtain magnet $2C_{mag}$ in the shutter mechanism are excited, a leading shutter curtain and a trailing shutter curtain are held in the cocking state. The leading shutter curtain starts to run when the leading curtain magnet $1C_{mag}$ is turned off not to excite, the trailing shutter curtain starts to run when the trailing curtain magnet $2C_{mag}$ is turned off not to excite, and thus the film is exposed through a gap formed by separation between the leading and trailing shutter curtains while controlling.

In this embodiment, when the signal condition of the switch $S_2$ becomes to a low level in an initial term during the release process, the stop-down stopping magnet $F_{mag}$, the leading curtain magnet $1C_{mag}$, and the trailing curtain magnet $2C_{mag}$ are electrically energized so that each attracts to hold the stopping pawl, the leading curtain and the trailing curtain magnetically by the time the engagement of the restraining lever 26 is released.

As described above, when the engagement of the aperture diaphragm stop-down cocking gear 29 is released, the gear 29 starts to rotate counterclockwise so that the aperture diaphragm stop-down mechanism starts executing the aperture stop-down operation. Then, a signal corresponding to the aperture stop-down amount is produced to input into the microcomputer 50. In the microcomputer 50, when it is judged that the aperture stop-down amount is in a desired value, the stop-down stopping magnet $F_{mag}$ is turned off not to excite. Then, when the attraction force of the stop-down stopping magnet $F_{mag}$ is lost and the stop-down stopping pawl engages with the stop-down stopping ratchet, the aperture diaphragm stop-down mechanism stops executing the aperture diaphragm stop-down operation to obtain a desired aperture diameter.

As described above, when the engagement of the mirror cocking lever 31 is released, the reflecting mirror starts to retreat from the position capable of observing the object in the viewfinder, so that the shutter mechanism becomes in an operable state. After a specified period from when the switch $S_{REL}$ is turned on, the leading curtain magnet $1C_{mag}$ is turned off to start the leading shutter curtain running. Then, after pre-calculated exposure time, the trailing curtain magnet $2C_{mag}$ is turned off to start the trailing shutter curtain running so as to terminate the exposure to the film.

Figure 14:
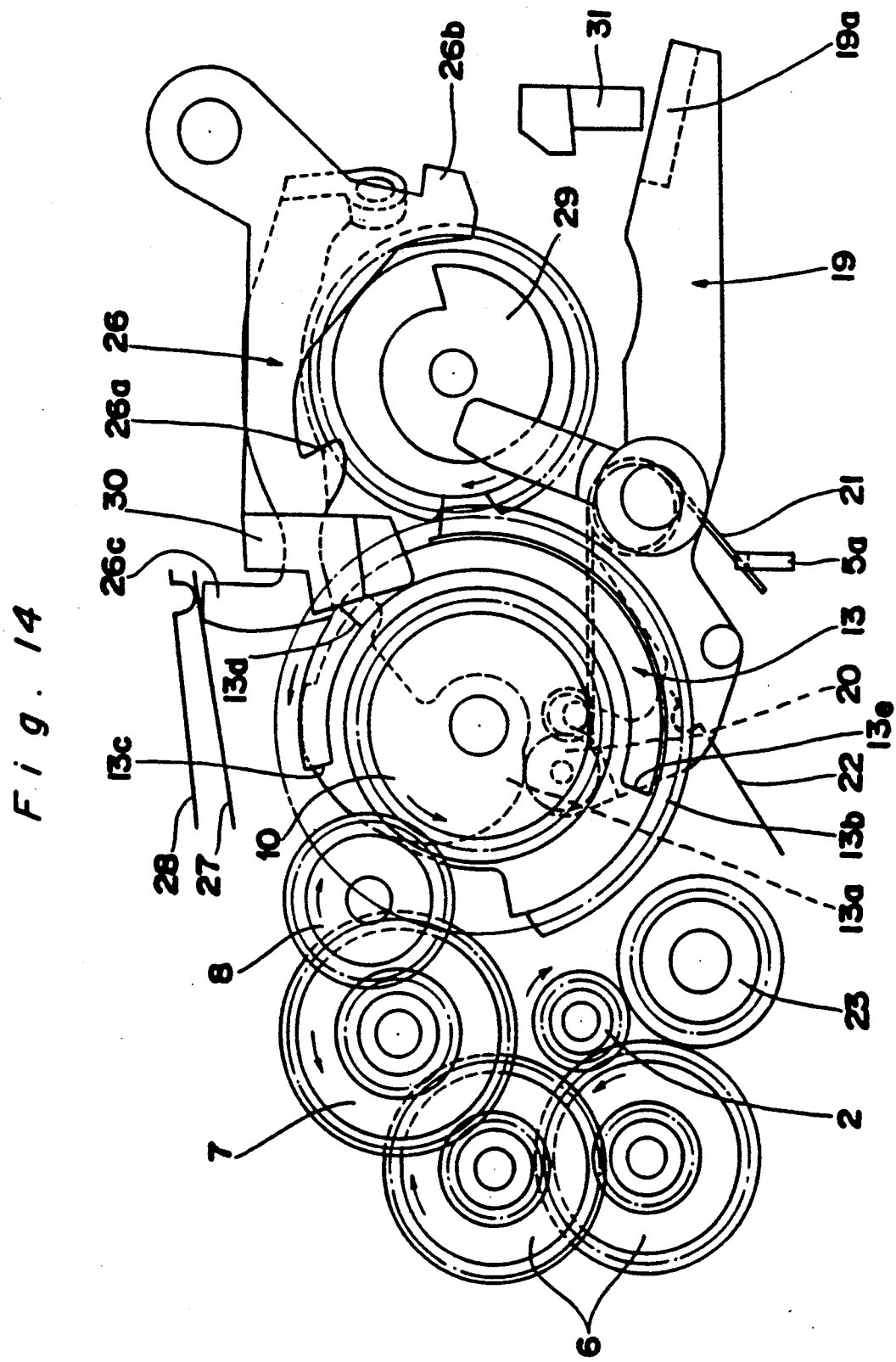

After the termination of the running of the trailing shutter curtain, the motor 1 is driven for rotation in the normal direction again to rotate the cam gear 13 counterclockwise (referred to FIG. 14). When the cam gear 13 starts to rotate, the restraining lever 26 is held in the state released from the engagement against the gear 29 and the lever 31 while the lever 26 contacts with the outer circumferential surface of the cam. Then, when the aperture diaphragm reset lever 30 is disengaged from the outer circumferential surface of the cam by a reset portion 13d of the cam gear 13 to return to the original position, the aperture diaphragm stop-down system becomes in the cocking enable state.

This reason is that the gear train in the aperture diaphragm stop-down system may be damaged by the overload acted thereon in cocking of the aperture diaphragm stop-down system unless a stop-down stopping device operated is released, that is, the engagement between the stop-down stopping pawl and the stop-down stopping ratchet is released, and the stop-down stopping device is required to certainly release before cocking of the aperture diaphragm stop-down mechanism. In the embodiment, since the release operation of the stop-down stopping device is executed by the reset cam portion 13d formed on the cam gear 13 for cocking the aperture diaphragm stop-down mechanism, the certain release operation of the stop-down stopping device can be easily executed before cocking of the aperture diaphragm stop-down mechanism.

After the release operation of the stop-down stopping device, when the cam gear 13 rotates further counterclockwise, the gear portion 13b partially formed at the outer circumference of the gear 13 for cocking the aperture diaphragm stop-down mechanism engages with the aperture diaphragm stop-down cocking gear 29 to rotate it clockwise and to start the aperture diaphragm stop-down mechanism (not shown) charging. The mirror cocking cam portion 13a of the cam gear 13 contacts with a cocking roller 20 of the cocking lever 19 to rotate the cocking lever 19 counterclockwise. Then, the bent portion 19a of the cocking lever 19 presses the mirror cocking lever 31 to cock the mirror and shutter mechanism (not shown).

When the cam gear 13 rotates counterclockwise (referred to FIG. 15), the restraining lever 26 is released from an engaging cam 13e to pivot counterclockwise, so that the engaging portions 26a and 26b thereof become in states capable of engaging with the aperture diaphragm stop-down cocking gear 29 and the mirror cocking lever 31, respectively. At this time, the arm portion 26c of the restraining lever 26 is separated from the armature 27 of the switch $S_{REL}$, so that the signal condition of the switch $S_{REL}$ is in a high level. Therefore, the electromagnetic brake is acted on the motor 1 to stop it by the microcomputer 50. This operation corresponds to "mechanism cocking operation".

The cocking roller 20 is located on the upper-most portion of the mirror cocking cam portion 13a and the mirror cocking lever 31 is held in a state of completion of cock. At this time, the one end of the spring 21 contacts with the armature 22 so that the signal condition of the sequence switch $S_{LOAD}$ is in a low level.

A cam portion located lower than a cock completion position is formed on the mirror cocking cam portion 13a. This reason is that since the cocking lever 19 is required to hold in a cock completion state, as described later, such an arrangement prevents a maximum stress from acting on the lever 19 in its holding state.

During the release and the cocking operation, it is because the motor 1 rotates in the normal direction that the input gear 10 rotates counterclockwise. Therefore, the planetary carriers 15 and 17 continuously rotate counterclockwise around the axis of the bearing 18 (referred to FIG. 12) to maintain in a state where the carriers 15 and 17 contact with the stoppers 5d and 5d of the winding bed plate 5, respectively.

Figure 16:
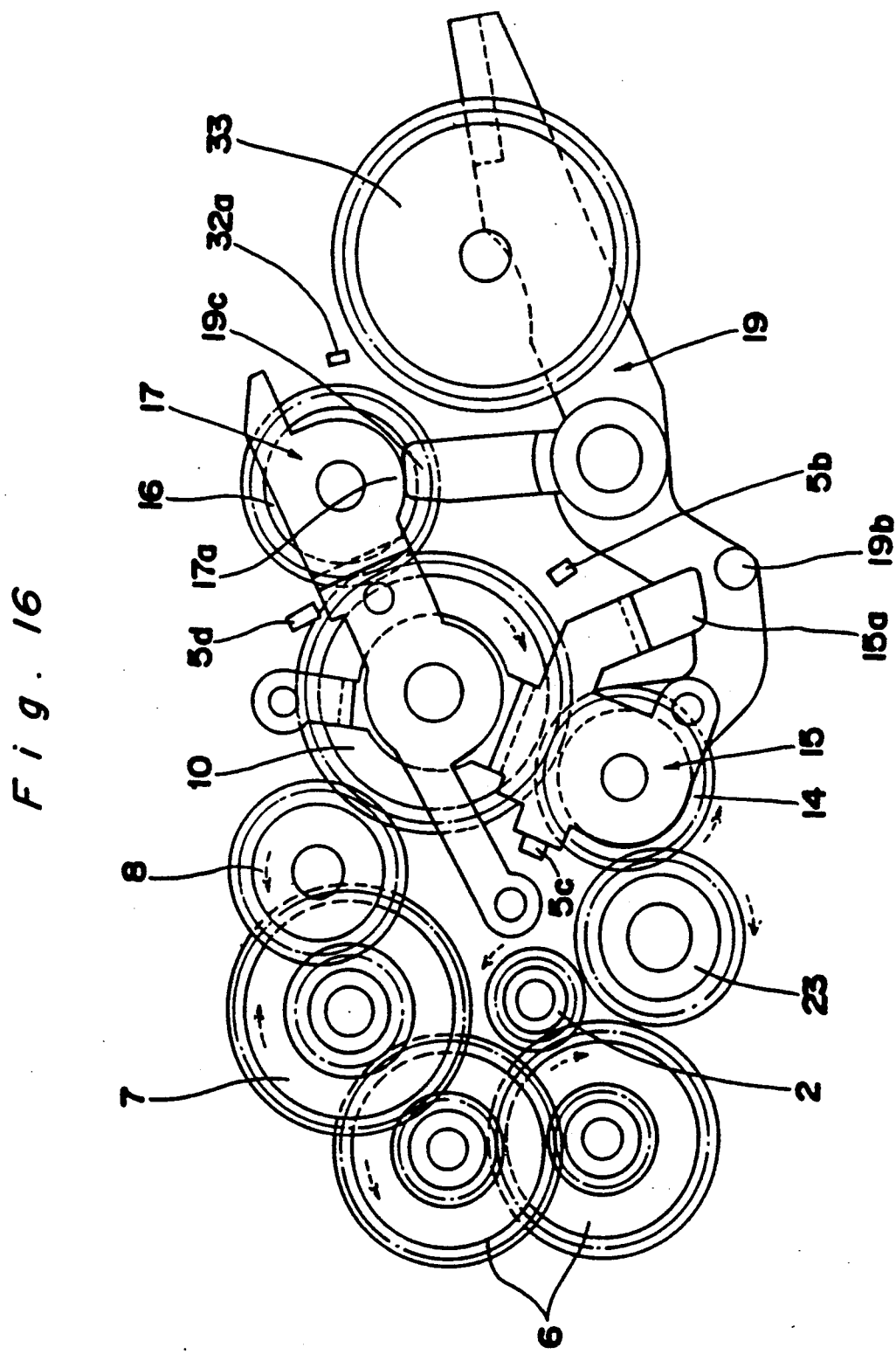
FIGS. 16 and 17 are respectively views showing relation with respect to positions of the planetary carriers.

When the motor 1 rotates counterclockwise in the cock completion state, the input gear 10 rotates clockwise (referred to FIG. 16). As described above, since the torque transmission from the input gear 10 to the cam gear 13 is performed through the one-way clutch 12, the cam gear 13 is prevented from rotating clockwise.

By the clockwise rotation of the input gear 10, the planetary carrier 15 is rotated clockwise to engage with the stopper 5c of the bed plate 5, and consequently the planetary gear 14 is engaged with the spool driving gear 23. After that, since the planetary carrier 15 is prevented from rotating, the rotating force is transmitted to the spool driving gear 23, so that the film take up spool is rotated to wind the film until unexposed portion thereof is transported to an exposure aperture frame.

When the motor 1 rotates in the reverse direction, the planetary carrier 17 also rotates clockwise around the axis of the bearing 18. However, it is because the cocking lever 19 is held in the cock completion state that the arm portion 19c of the cocking lever 19 is designed to protrude from a position confronting the cam 17a of the planetary carrier 17. Then, when the planetary carrier 17 rotates around the axis of the bearing 18, the carrier 17 stops rotating at a position contacting with the arm portion 19c of the lever 19 so that the planetary gear 16 can not engage with the rewinding gear 33, as shown in FIG. 16.

Then, a signal $S_{SP}$ related to the film transporting amount is inputted into the microcomputer 50 by means for detecting film transporting amount (not shown). When it is judged that the one frame of the film has been transported, the motor 1 is stopped by the electromagnetic brake. This operation corresponds to "film winding operation".

After that, when the motor 1 is driven for rotation in the normal direction to rotate the cam gear 13 counter-clockwise, the cocking roller 20 removes from the cam surface of the cam portion 13a so that the cocking lever 19 returns to the initial position by a bias force of the armature 21 of the sequence switch $S_{LOAD}$ (referred to FIGS. 11 and 15). When the signal condition of the sequence switch $S_{LOAD}$ is in a high level, the electromagnetic brake is acted on the motor 1 by the microcomputer 50 to stop the motor 1. Thus, the camera returns in a state waiting for a signal outputting from the switch $S_2$. This operation corresponds to "section switchover operation".

Here, the film wound around the spool tends to loosen by its elasticity so that the spool is urged to rotate by the film, and on the other hand, the spool driving gear 23 is released from the engagement with the planetary gear 14 so that the spool and the spool driving gear 23 are forced to rotate. However, a friction torque larger than the urging force of the film for eliminating the looseness of the film wound around the spool 1b is acted on the spool 1b through the spool driving gear 23, so that the spool 1b is prevented from rotating in a counter-winding direction to prevent from loosing the film.

AUTOMATIC RETURN OPERATION

Figure 19:
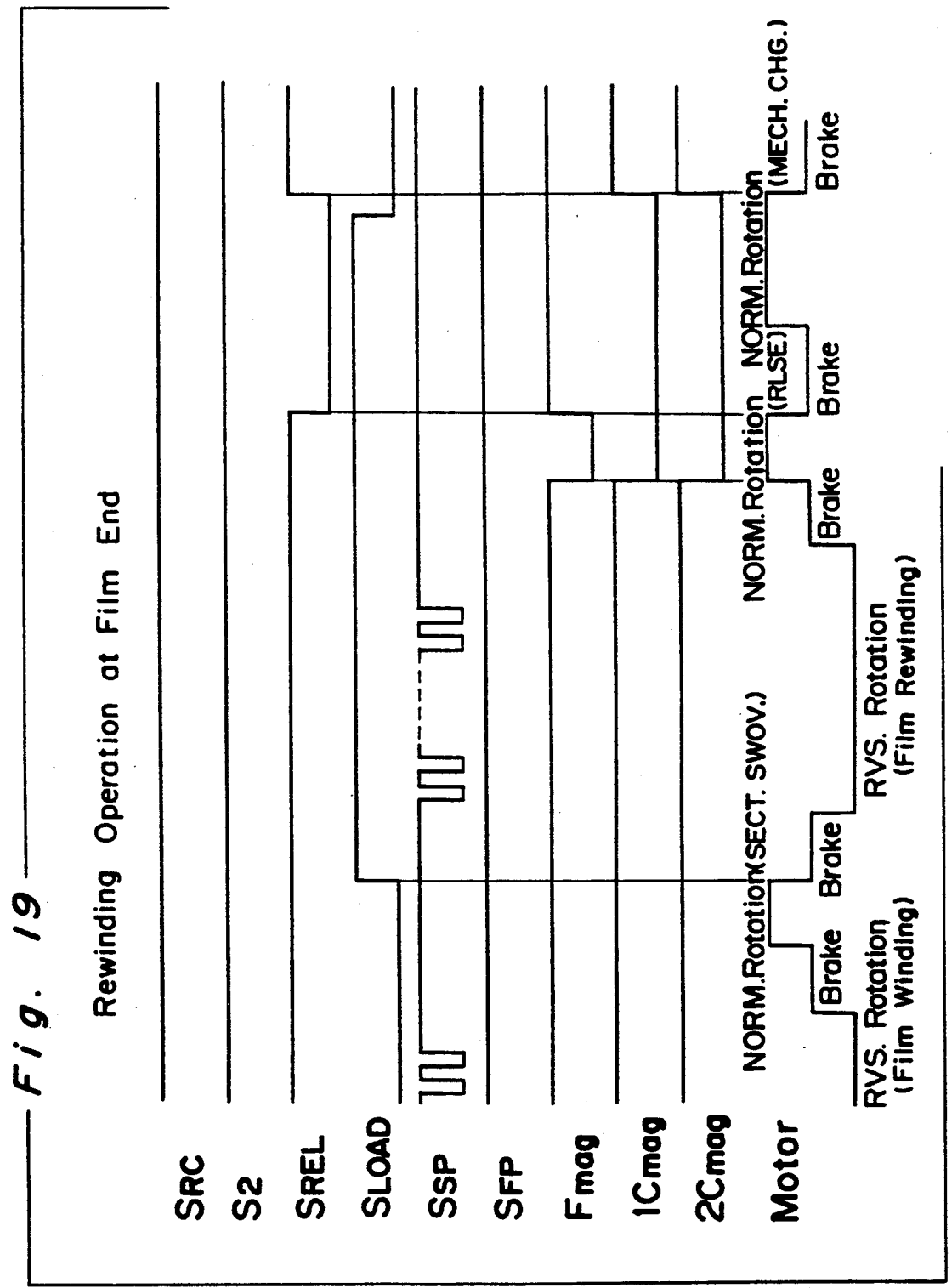
FIG. 19 is a time chart of the camera according to the embodiment in an automatic return operation.

FIG. 19 shows a time chart of the camera according to the embodiment in an automatic return operation.

During winding the film after completion of the release and the cocking operation in the normal release sequence of the camera according to the embodiment described above, when it is judged by the microcomputer 50 that the end of the film is detected by the signal $S_{SP}$ indicated the film transporting amount, the motor 1 is stopped rotating by the electromagnetic brake. After that, the motor 1 is driven for rotation in the normal direction again to switch the section.

After the stop of the motor 1, the cam gear 13 is located at a position shown in FIG. 11, and the relation between the planetary carriers 15 and 17 is shown in FIG. 12. In this state, when the motor 1 is driven for rotation in the reverse direction, the input gear 10 rotates clockwise (referred to FIG. 17). The cam gear 13 does not rotate clockwise because of the function as one-way clutch, as described above.

Figure 17:
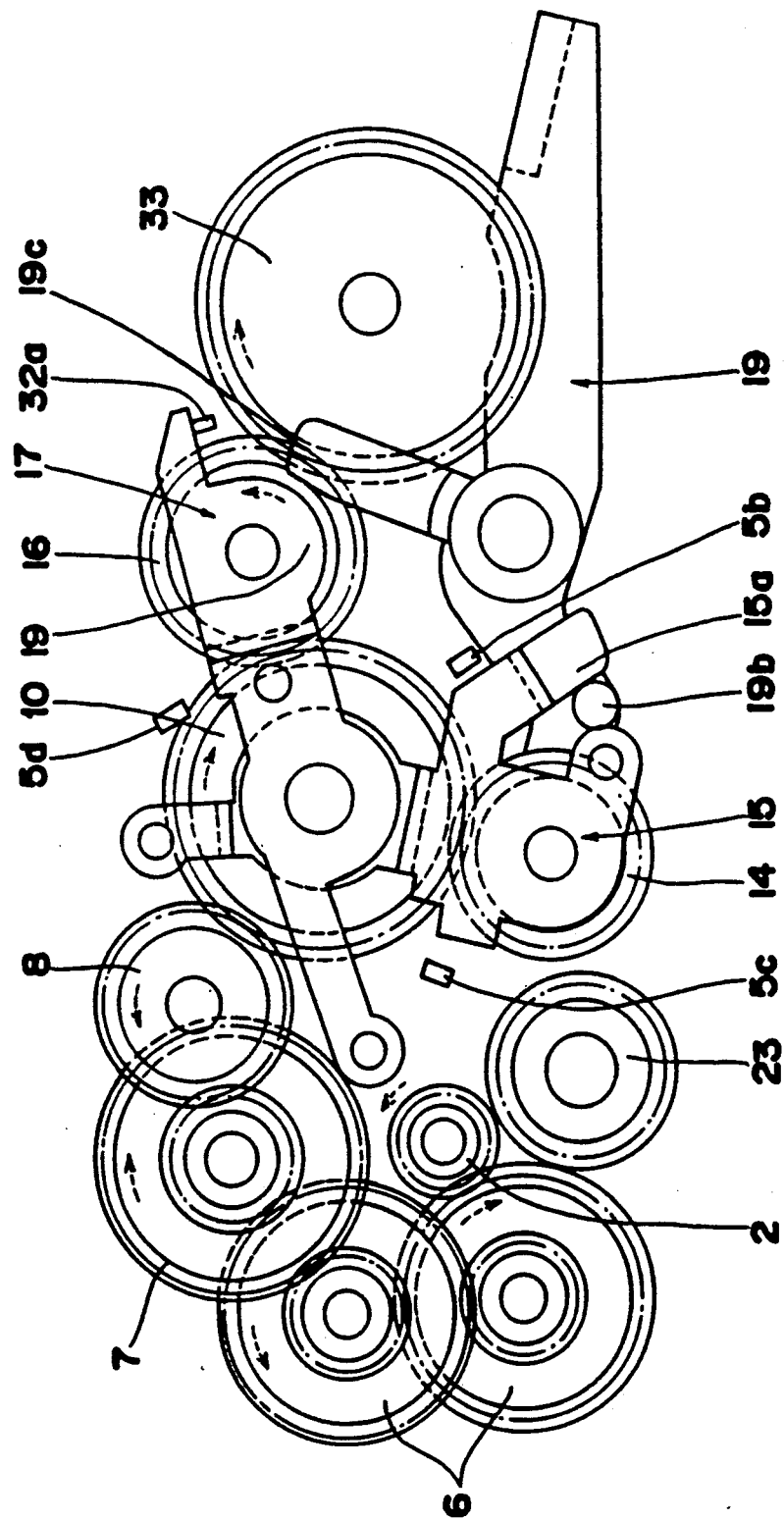

By the rotation of the input gear 10, the planetary carriers 15 and 17 rotate clockwise around the axis of the bearing 18. It is because the cocking lever 19 is in the return state that the arm portion 19c retreats from the rotary locus of the planetary carrier 17. Thus, the planetary carrier 17 rotates to the position contacting with the stopper 32a of the rewinding bed plate 5 without being prevented by the arm portion 19c as shown in FIG. 17. Then, by the contact therebetween, the rotation of the carrier 17 is stopped and the planetary gear 16 engages with the rewinding gear 33, so that the driving force is transmitted to the rewinding gear 33. Thus, the rewinding fork 38 rotates so that a photographed film is wound into the film cartridge.

When the motor 1 rotates in the reverse direction, the planetary carrier 15 also rotates clockwise around the axis of the bearing 18. However, the planetary gear 14 can not engage with the spool driving gear 23 because the pin portion 19b of the cocking lever 19 enters the rotary locus of the planetary carrier 15 so that the cam portion 15a stops moving by the pin portion 19b as shown in FIG. 17.

Then, when it is detected by the film transporting amount signal $S_{SP}$ that the film has been rewound, the electromagnetic brake is acted on the motor 1 to stop rotating. This operation corresponds to "film rewinding operation".

When the film has been rewound, the motor 1 is driven for rotation in the normal direction to execute the release operation and the mechanism cocking operation described above, resulting in stop of the motor 1. Then, when shutter blades are operated in a case where a leader of the film is stopped by the shutter blades corresponding to an exposure frame aperture, the leader of the film may be put between the shutter blades to damage the blades. Then, in this embodiment, the leading curtain magnet $1C_{mag}$ and the trailing curtain magnet $2C_{mag}$ are continuously excited until completion of the cocking operation so as not to operate the shutter blades, so that the shutter blades can be prevented from being damaged.

At this time, the planetary carrier 17 rotates counter-clockwise around the axis of the bearing 18 to release the engagement with the rewinding gear 33 (referred to FIG. 12).

However, as one example, if a rotary power in the winding direction is acted on the rewinding fork 38, the planetary gear 16 is tightly engaged with the rewinding gear 33 so that the planetary carrier 17 can not rotate counterclockwise to maintain in the rewinding state. In this state, if the release operation is executed, the film may be unintentionally wound into the film cartridge instead of winding around the spool.

Then, in this embodiment, the engagement between the planetary gear 16 of the planetary carrier 17 which becomes in a state incapable of rotating and the rewinding gear 33 is forced to release by movement of the cocking lever 19 in the mechanism cocking operation by the rotation of the motor 1 in the normal direction. Thus, this embodiment can prevent the above disadvantages.

Figure 23:
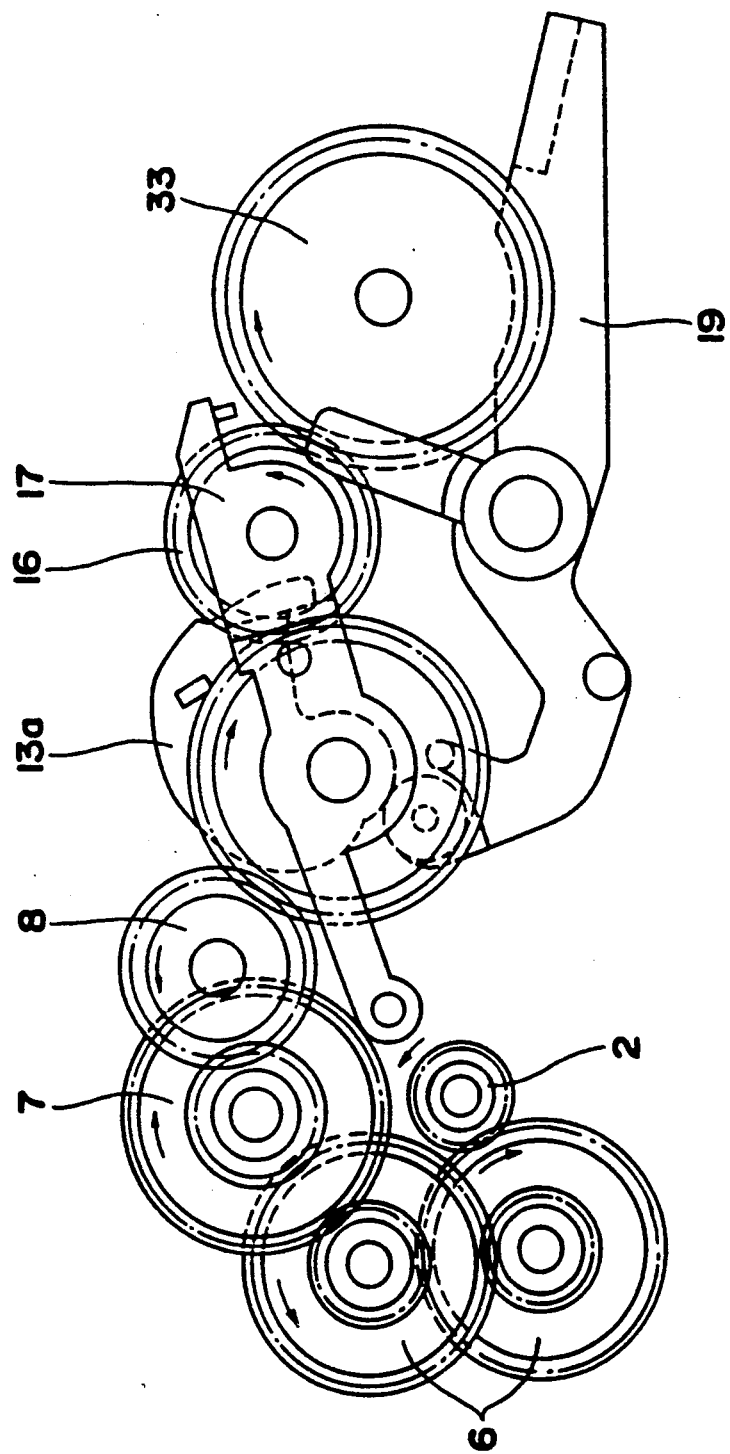
FIGS. 23, 24, and 25 are, respectively, views showing relation with respect to positions of the planetary carrier and a cocking lever winding of the film.

FIG. 23 shows a relation with respect to positions between the planetary carrier 17 and the cocking lever 19.

Figure 24:
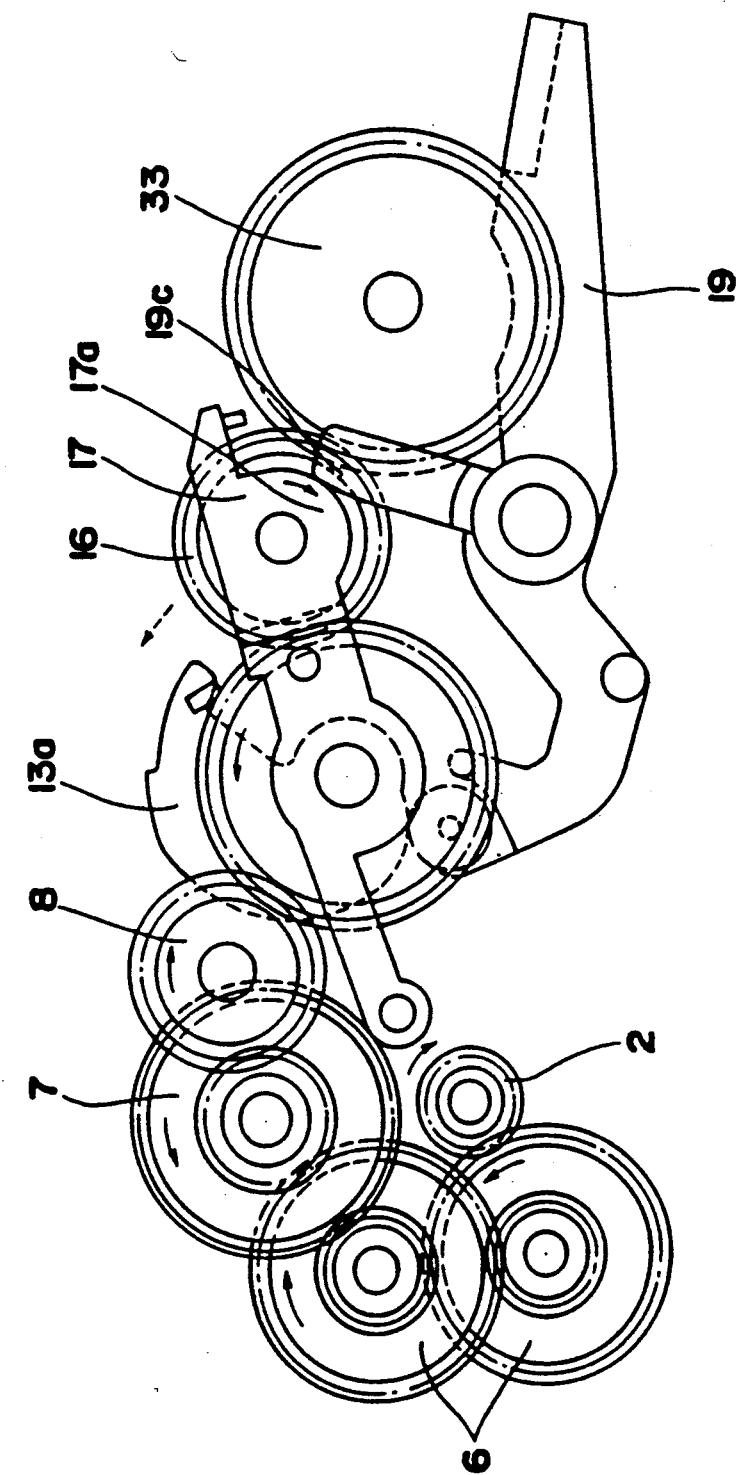
Figure 25:
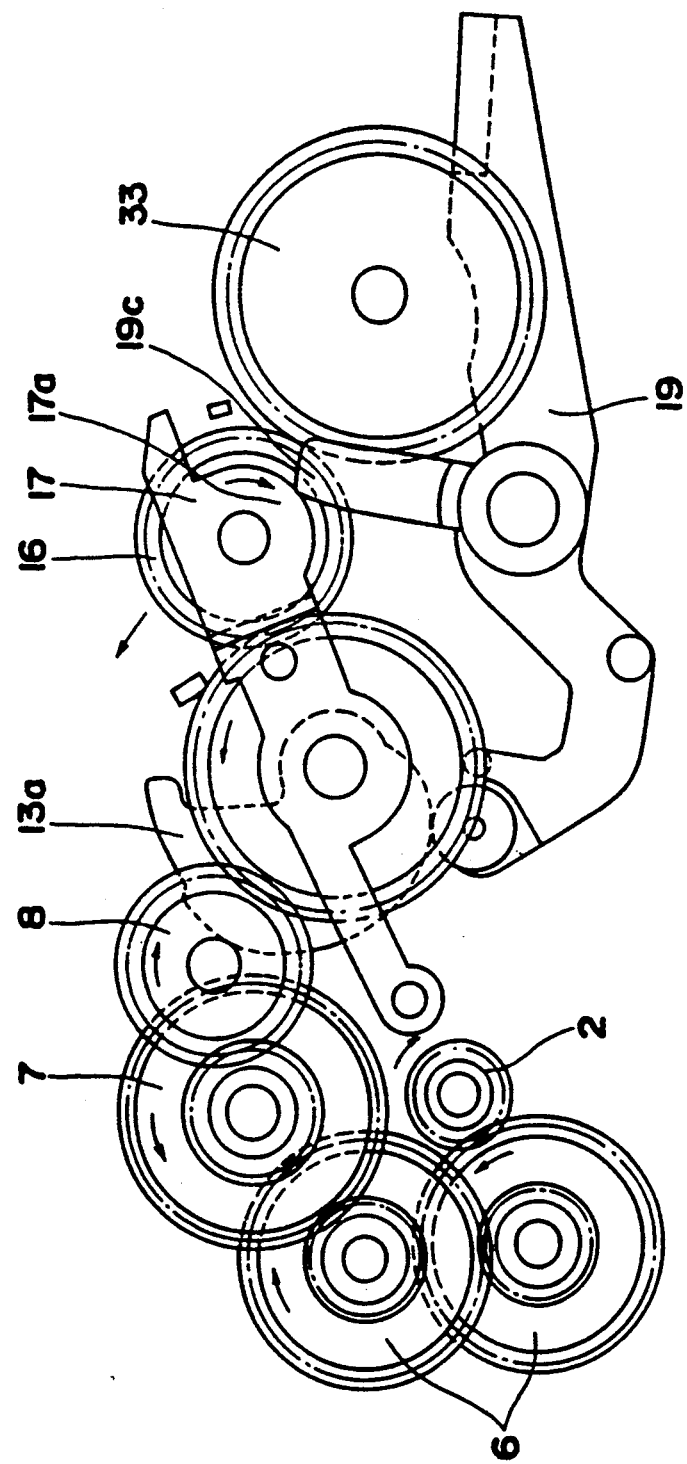

After completion of rewinding of the film, the motor gear 2 rotates in the reverse direction to execute the above release operation. At this time, if the sequential mechanism cocking operation is executed without release of the engagement between the planetary gear 16 and the rewinding gear 33, the cocking lever 19 rotates counterclockwise. In this case, it is because the planetary carrier 17 is in the rewinding state that the arm portion 19c of the cocking lever 19 contacts with the cam portion 17a of the planetary carrier 17 (referred to FIG. 24). An inclined surface is formed at the side of the arm portion 19c of the cocking lever 19. Then, by the counterclockwise rotation of the cocking lever 19, the cam portion 17a of the planetary carrier 17 is pressed by the inclined surface to finally release the engagement between the planetary gear 16 and the rewinding gear 33 (referred to FIG. 25). After release of the engagement, the planetary carrier 17 can rotate to return in the initial state.

RELEASE OPERATION IN SECTION [A] AND INITIAL LOADING OPERATION

Figure 20:
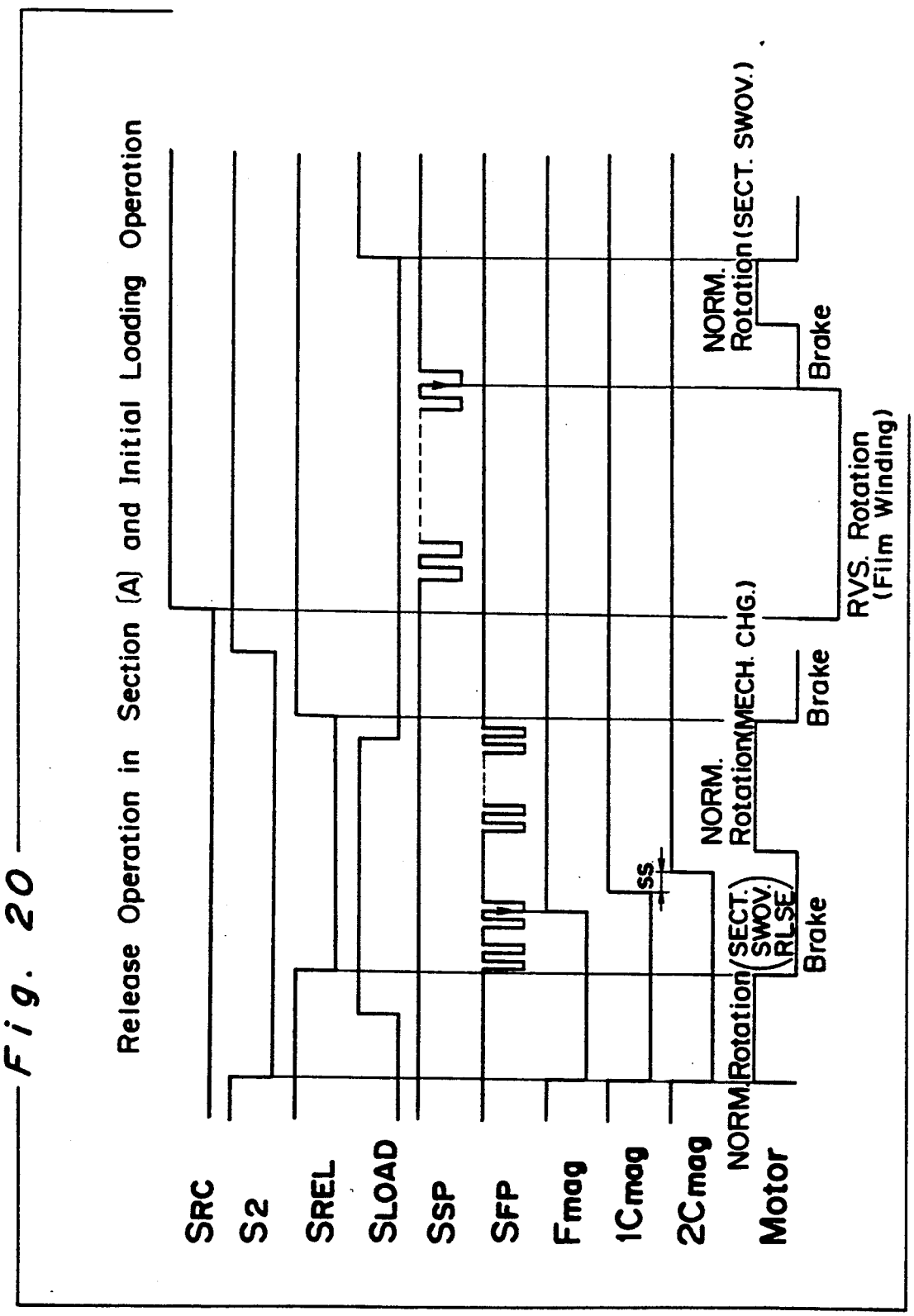
FIG. 20 is a time chart of the camera according to the embodiment in a release operation while a film is not inserted into a camera body and an initial loading operation.

FIG. 20 shows a time chart of the camera according to the embodiment in the release operation in the section [A] while the film is not inserted into the camera body and the initial loading operation.

Therefore, in order to perform the initial loading operation, the film winding spool is required to rotate for executing the initial loading operation, in the camera according to the embodiment, the cam of the cam gear 13 for performing the specified operation in one rotation is required to locate in the section [A] where the film winding operation can be executed. If the cam is located in the section [A], the initial loading operation can be executed immediately after close of the back lid, without the release and the cocking operation.

If the release operation is executed while the film is not inserted into the camera body or while the back lid is opened, it is not preferable that the film winding operation is executed. The reason is that a battery is uselessly consumed or a non-photographed film is pulled to uselessly expose. Therefore, in the camera according to the embodiment, since the release, the mechanism cocking and the film winding operation are executed by the single motor 1, the release and the mechanism cocking operation only can be repeatedly executed without the film winding operation, by driving for rotation of the motor only in the normal direction.

According to the camera of the above embodiment, in a state where the back lid thereof is opened or a state waiting for the initial loading operation, that is, where the film is not inserted into the camera body, the release operation of the camera starts to execute from and stops to the section [A] where the film winding operation can be executed, without the film winding operation. This operation corresponds to "release operation in section [A]".

In FIG. 19 showing a time chart of the camera, the reason why the cam of the cam gear 13 is stopped to the section [A] in completion of the film rewinding operation is that the sequential initial loading operation is prepared. When it is detected by a back lid signal $S_{RC}$ that the lid is opened, or detected by a film detecting signal $S_{FILM}$ that the film is not in the camera body, a sequence of the release operation in section [A] is started under an instruction of the microcomputer 50.

During the release operation in section [A], it is because the cam is located in the section [A] in an initial state that the signal condition of the release switch $S_{REL}$ is in a high level and the signal condition of the sequence switch $S_{LOAD}$ is in a low level (referred to FIG. 15).

When the release button (not shown) is depressed, the signal condition of the switch $S_2$ is in a low level to drive for rotation of the motor 1 in the normal direction. When the cam gear 13 rotates counterclockwise and the roller 20 of the cocking lever 19 drops from the mirror cocking cam portion 13a, the signal condition of the sequence switch $S_{LOAD}$ is in a high level (referred to FIG. 11). Here, the motor 1 continuously rotates in the normal direction without stop, causing to enter the sequential release operation (referred to FIG. 13).

In the embodiment, the release operation is executed without stop of the rotation of the motor 1 so that a release time lag, that is, a period from when the signal condition of the switch $S_2$ is in a low level to when the leading curtain magnet $1C_{mag}$ is turned off, in the release operation in section [A] is brought near a release time lag in the normal release operation. However, when the signal condition of the sequence switch $S_{LOAD}$ is in a high level after changing the section, the following operation can be performed in the same manner as the normal release operation: after once the motor 1 is stopped rotating by the electromagnetic brake, the motor 1 is driven for rotation in the normal direction again to execute the release operation.

In the release operation, the stop-down stopping magnet $F_{mag}$, the leading curtain magnet $1C_{mag}$, and the trailing curtain magnet $2C_{mag}$ are controlled to determine the aperture diameter of the camera and to retreat the mirror mechanism for a specified exposure control in the same manner as the above-described release operation in the normal release operation.

After the termination of the exposure, the motor 1 is driven for rotation in the normal direction again. Thus, the cam gear 13 rotates counterclockwise (referred to FIG. 14) to enter the mechanism cocking operation so that the aperture diaphragm stop-down and the mirror mechanism starts to cock. After completion of the cock thereof, the restraining lever 26 returns to the original position so that the signal condition of the switch $S_{REL}$ is in a high level. Thus, the motor 1 is stopped by the electromagnetic brake so that the cam returns to the section [A] (referred to FIG. 15).

It is because the motor 1 rotates only in the normal direction in the release operation in section [A] that the input gear 10 rotates counterclockwise. Therefore, the planetary carriers 15 and 17 continue to rotate counterclockwise (referred to FIG. 12), and then contact with the stoppers 5b and 5d of the winding bed plate 5, respectively, to maintain in the state contacting therewith.

When the film not shown is inserted into the camera body and the back lid is closed, the signal $S_{RC}$ related to the opening and closing of the back lid is in a high level, the initial loading operation is directed by the microcomputer 50, and the motor 1 is driven for rotation in the reverse direction (referred to FIG. 16). Then, the input gear 10 rotates clockwise and the planetary carriers 15 and 17 attempt to rotate clockwise. However, it is because the cocking lever 19 is in a state capable of winding the film that only the planetary gear 14 can engage with the spool driving gear 23. The resulting allows the film winding spool (not shown) to rotate to transport the non-photographed part of the film to a position where the film is exposed. This operation corresponds to "initial loading operation".

Then, when it is judged by the microcomputer 50 on the basis of the film transporting amount signal $S_{SP}$ that the specified frames of the film for the initial loading operation have been transported, the motor 1 is stopped by the electromagnetic brake.

After that, the motor 1 is driven for rotation in the normal direction, the cam gear 13 rotates counterclockwise, and thus the section switchover operation is executed. Then, when the signal condition of the sequence switch $S_{LOAD}$ is in a high level, the motor 1 is stopped rotating to become in the state waiting for the normal release operation (referred to FIGS. 11 and 15).

According to the embodiment, by the signals outputted from the switches in the specified section of the cam gear for performing the specified operation in one rotation, the motor 1 can be driven for rotation in the reverse direction by control of the microcomputer 50 to drive the specified load system. Therefore, conventional various problems can be resolved or reduced while plural works are executed by the outputted power of a single motor. That is, the section in the cam gear can be divided into any numbers, the desired number of the load with respect to each section can be set, the number of the load to be driven is not limited, each load can be independently driven, and the workload with respect to each load is not limited. Moreover, in the conventional mechanism, if the load number to be independently driven increases, a mechanism for selecting loads becomes more complex and thus it is difficult to drive the load in a limited space. However, in the embodiment, loads can be divided into the number corresponding to the sections of the cam gear and thus plural loads can be independently driven. Therefore, many kinds of functions can be executed by the driving mechanism of the camera, which is smaller and simple in construction.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein. For example, as shown in FIG. 10 (C), a holding type of a flat spring 40, instead of the friction spring 24, can be attached to the outer circumferential surface of the middle of the spool driving gear 23 so that both ends of the flat spring 40 act a friction force F on the gear 23 to obtain the same function as the friction spring 24.

What is claimed is:

1. An operating mechanism for selectively driving a first load and a second load, comprising:
   a driving device for reversibly rotating;
   an indexing mechanism for transmitting the driving force of said driving device, when said driving device rotates in one direction, to the first load under a first condition and to the second load under a second condition; and
   a selecting means for selecting the condition of said indexing mechanism, when said driving device rotates in the other direction, from the first condition to the second condition and from the second condition to the first condition.

2. An operating mechanism as claimed in claim 1, wherein said selecting means selects a number of the loading systems not more than a number which is indexed by said indexing mechanism.

3. An operating mechanism as claimed in claim 2, wherein said indexing mechanism is held in an indexed position during rotating in the one direction of said driving device.

4. An operating mechanism as claimed in claim 3 wherein said driving device drives for rotation in the other direction to execute an indexing operation by said indexing mechanism.

5. An operating mechanism as claimed in claim 4, wherein said driving device is a motor.

6. An operating mechanism as claimed in claim 3, wherein said driving device is a motor.

7. An operating mechanism as claimed in claim 2, wherein said driving device drives for rotation in the other direction to execute an indexing operation by said indexing mechanism.

8. An operating mechanism as claimed in claim 7, wherein said driving device is a motor.

9. An operating mechanism as claimed in claim 2, wherein said driving device is a motor.

10. An operating mechanism as claimed in claim 1, wherein said indexing mechanism is held in an indexed position during rotating in the one direction of said driving device.

11. An operating mechanism as claimed in claim 10, wherein said selecting means selects a number of the loading systems not more than a number which is indexed by said indexing mechanism.

12. An operating mechanism as claimed in claim 11, wherein said driving device drives for rotation in the other direction to execute an indexing operation by said indexing mechanism.

13. An operating mechanism as claimed in claim 12, wherein said driving device is a motor.

14. An operating mechanism as claimed in claim 11, wherein said driving device is a motor.

15. An operating mechanism as claimed in claim 10, wherein said driving device drives for rotation in the other direction to execute an indexing operation by said indexing mechanism.

16. An operating mechanism as claimed in claim 15, wherein said driving device is a motor.

17. An operating mechanism as claimed in claim 10, wherein said driving device is a motor.

18. An operating mechanism as claimed in claim 1, wherein said driving device is a motor.

19. An operating mechanism as claimed in claim 18 wherein said driving device drives for rotation in the other direction to execute an indexing operation by said indexing mechanism.

20. An operating mechanism as claimed in claim 19, wherein said indexing mechanism is held in an indexed position during rotating in the one direction of said driving device.

* * * * *